US011175984B1

(12) United States Patent
Lercari et al.

(10) Patent No.: US 11,175,984 B1
(45) Date of Patent: Nov. 16, 2021

(54) ERASURE CODING TECHNIQUES FOR FLASH MEMORY

(71) Applicant: Radian Memory Systems, Inc., Calabasas, CA (US)

(72) Inventors: Robert Lercari, Thousand Oaks, CA (US); Craig Robertson, Simi Valley, CA (US); Mike Jadon, Manhattan Beach, CA (US)

(73) Assignee: Radian Memory Systems, Inc., Manhattan Beach, CA (US)

( * ) Notice: Subject to any disclaimer, the term of this patent is extended or adjusted under 35 U.S.C. 154(b) by 127 days.

(21) Appl. No.: 16/707,934

(22) Filed: Dec. 9, 2019

(51) Int. Cl.
*G06F 11/10* (2006.01)
*G06F 9/30* (2018.01)
*G06F 11/30* (2006.01)
*G06F 11/07* (2006.01)

(52) U.S. Cl.
CPC ...... *G06F 11/1068* (2013.01); *G06F 9/30029* (2013.01); *G06F 11/0772* (2013.01); *G06F 11/0784* (2013.01); *G06F 11/3037* (2013.01)

(58) Field of Classification Search
CPC ............. G06F 11/1068; G06F 11/3037; G06F 11/0784; G06F 9/30029; G06F 11/0772
USPC ........................................................ 714/763
See application file for complete search history.

(56) References Cited

U.S. PATENT DOCUMENTS

| 5,568,423 A | 10/1996 | Jou et al. |
| 5,652,857 A | 7/1997 | Shimoi et al. |
| 5,668,976 A * | 9/1997 | Zook .................. G06F 7/726 703/24 |
| 5,860,082 A | 1/1999 | Smith et al. |
| 6,134,631 A | 10/2000 | Jennings, III |
| 7,096,378 B2 | 8/2006 | Stence et al. |
| 7,339,823 B2 | 3/2008 | Nakayama et al. |

(Continued)

FOREIGN PATENT DOCUMENTS

WO      2009100149 A1      8/2009

OTHER PUBLICATIONS

NVM Express, Version 1.0b, Jul. 12, 2011, pp. 1-126, published at http://www.nvmexpress.org/resources/ by the NVM Express Work Group.

(Continued)

*Primary Examiner* — James C Kerveros
(74) *Attorney, Agent, or Firm* — Marc P. Schuyler

(57) ABSTRACT

This disclosure provides a memory controller for asymmetric non-volatile memory, such as flash memory, and related host and memory system architectures. The memory controller is configured to automatically generate and transmit redundancy information to a destination, e.g., a host or another memory drive, to provide for cross-drive redundancy. This redundancy information can be error (EC) information, which is linearly combined with similar information from other drives to create "superparity." If EC information is lost for one drive, it can be rebuilt by retrieving the superparity, retrieving or newly generating EC information for uncompromised drives, and linearly combining these values. In one embodiment, multiple error correction schemes are use, including a first intra-drive scheme to permit recovery of up to x structure-based failures, and the just-described redundancy scheme, to provide enhanced security for greater than x structure-based failures.

26 Claims, 11 Drawing Sheets

(56) References Cited

U.S. PATENT DOCUMENTS

| | | |
|---|---|---|
| 7,404,031 B2 | 7/2008 | Oshima |
| 7,581,078 B2 | 8/2009 | Ware |
| 7,702,846 B2 | 4/2010 | Nakanishi et al. |
| 7,710,777 B1 | 5/2010 | Mintierth |
| 7,752,381 B2 | 7/2010 | Wong |
| 7,801,561 B2 | 9/2010 | Parikh et al. |
| 7,818,489 B2 | 10/2010 | Karamcheti et al. |
| 7,836,244 B2 | 11/2010 | Kim et al. |
| 7,861,122 B2 | 12/2010 | Cornwell et al. |
| 7,941,692 B2 | 5/2011 | Royer et al. |
| 7,970,983 B2 | 6/2011 | Nochimowski |
| 7,991,944 B2 | 8/2011 | Lee et al. |
| 8,001,318 B1 | 8/2011 | Iyer |
| 8,024,545 B2* | 9/2011 | Kim .................. G06F 12/0246 711/206 |
| 8,055,833 B2 | 11/2011 | Danilak et al. |
| 8,065,471 B2 | 11/2011 | Yano et al. |
| 8,065,473 B2 | 11/2011 | Ito et al. |
| 8,068,365 B2 | 11/2011 | Kim |
| 8,072,463 B1 | 12/2011 | Van Dyke |
| 8,074,022 B2 | 12/2011 | Okin et al. |
| 8,082,389 B2 | 12/2011 | Fujibayashi |
| 8,086,790 B2 | 12/2011 | Roohparvar |
| 8,347,042 B2 | 1/2013 | You |
| 8,572,331 B2 | 10/2013 | Shalvi |
| 9,229,854 B1 | 1/2016 | Kuzmin et al. |
| 9,335,939 B2 | 5/2016 | Bennett et al. |
| 9,400,749 B1 | 7/2016 | Kuzmin et al. |
| 9,519,578 B1 | 12/2016 | Kuzmin et al. |
| 9,542,118 B1 | 1/2017 | Lercari et al. |
| 9,588,904 B1 | 3/2017 | Lercari et al. |
| 9,652,376 B2 | 5/2017 | Kuzmin et al. |
| 9,710,377 B1 | 7/2017 | Kuzmin et al. |
| 9,727,454 B2 | 8/2017 | Kuzmin et al. |
| 9,785,572 B1 | 10/2017 | Lercari et al. |
| 10,445,229 B1 | 10/2019 | Kuzmin et al. |
| 10,552,058 B1 | 2/2020 | Jadon et al. |
| 10,552,085 B1 | 2/2020 | Chen et al. |
| 2003/0028733 A1 | 2/2003 | Tsunoda et al. |
| 2003/0065866 A1 | 4/2003 | Spencer |
| 2005/0144413 A1 | 6/2005 | Kuo et al. |
| 2006/0022171 A1 | 10/2006 | Maeda et al. |
| 2007/0058431 A1 | 3/2007 | Chung et al. |
| 2007/0233939 A1 | 10/2007 | Kim |
| 2007/0260811 A1 | 11/2007 | Merry, Jr. et al. |
| 2007/0283428 A1 | 12/2007 | Ma et al. |
| 2008/0082596 A1 | 4/2008 | Gorobets |
| 2008/0147964 A1 | 6/2008 | Chow et al. |
| 2008/0155204 A1 | 6/2008 | Qawami et al. |
| 2008/0189485 A1 | 8/2008 | Jung et al. |
| 2009/0036163 A1 | 2/2009 | Kimbrell |
| 2009/0046533 A1 | 2/2009 | Jo |
| 2009/0083478 A1 | 3/2009 | Kunimatsu |
| 2009/0089482 A1 | 4/2009 | Traister |
| 2009/0089490 A1 | 4/2009 | Ozawa et al. |
| 2009/0172219 A1 | 7/2009 | Mardiks |
| 2009/0172250 A1 | 7/2009 | Allen et al. |
| 2009/0172257 A1 | 7/2009 | Prins et al. |
| 2009/0198946 A1 | 8/2009 | Ebata |
| 2009/0254705 A1 | 10/2009 | Abali et al. |
| 2009/0271562 A1 | 10/2009 | Sinclair |
| 2009/0300015 A1 | 12/2009 | Kazan et al. |
| 2009/0327602 A1 | 12/2009 | Moore et al. |
| 2010/0191779 A1 | 1/2010 | Hinrichs |
| 2010/0042655 A1 | 2/2010 | Tse et al. |
| 2010/0115172 A1 | 5/2010 | Gillingham et al. |
| 2010/0161882 A1 | 6/2010 | Stern et al. |
| 2010/0162012 A1 | 6/2010 | Cornwell et al. |
| 2010/0182838 A1 | 7/2010 | Kim et al. |
| 2010/0241866 A1 | 9/2010 | Rodorff |
| 2010/0262761 A1 | 10/2010 | Borchers et al. |
| 2010/0281230 A1 | 11/2010 | Rabii et al. |
| 2010/0287217 A1 | 11/2010 | Borchers et al. |
| 2010/0329011 A1 | 12/2010 | Lee et al. |
| 2011/0033548 A1 | 2/2011 | Kimmel et al. |
| 2011/0055445 A1 | 3/2011 | Gee et al. |
| 2011/0161784 A1 | 6/2011 | Sellinger et al. |
| 2011/0197023 A1 | 8/2011 | Iwamitsu et al. |
| 2011/0238943 A1 | 9/2011 | Devendran et al. |
| 2011/0296133 A1 | 12/2011 | Flynn et al. |
| 2011/0314209 A1 | 12/2011 | Eckstein |
| 2012/0033519 A1 | 2/2012 | Confalonier et al. |
| 2012/0059972 A1 | 3/2012 | Chen |
| 2012/0066441 A1 | 3/2012 | Weingarten |
| 2012/0131381 A1 | 5/2012 | Eleftheriou |
| 2012/0204079 A1 | 8/2012 | Takefman et al. |
| 2013/0007343 A1 | 1/2013 | Rub |
| 2013/0013852 A1 | 1/2013 | Hou et al. |
| 2013/0019062 A1 | 1/2013 | Bennett et al. |
| 2013/0073816 A1 | 3/2013 | Seo et al. |
| 2013/0111295 A1 | 5/2013 | Li et al. |
| 2013/0124793 A1 | 5/2013 | Gyl et al. |
| 2013/0166825 A1 | 6/2013 | Kim et al. |
| 2013/0242425 A1 | 9/2013 | Zayas et al. |
| 2013/0290619 A1 | 10/2013 | Knight |
| 2013/0297852 A1 | 11/2013 | Fai et al. |
| 2014/0101371 A1 | 4/2014 | Nguyen et al. |
| 2014/0122781 A1 | 5/2014 | Smith et al. |
| 2014/0189209 A1 | 7/2014 | Sinclair et al. |
| 2014/0208004 A1 | 7/2014 | Cohen |
| 2014/0215129 A1 | 7/2014 | Kuzmin et al. |
| 2015/0113203 A1 | 4/2015 | Dancho et al. |
| 2015/0149789 A1 | 5/2015 | Seo et al. |
| 2015/0212938 A1 | 6/2015 | Chen et al. |
| 2015/0261456 A1 | 9/2015 | Alcantara et al. |
| 2015/0324264 A1 | 11/2015 | Vidypoornachy et al. |
| 2015/0347296 A1 | 12/2015 | Kotte et al. |
| 2016/0018998 A1 | 1/2016 | Mohan et al. |
| 2016/0357462 A1 | 12/2016 | Nam et al. |
| 2016/0364179 A1 | 12/2016 | Tsai et al. |
| 2017/0060680 A1* | 3/2017 | Halbert .............. G06F 11/1068 |
| 2018/0203761 A1* | 7/2018 | Halbert .............. G06F 11/1012 |
| 2018/0210787 A1* | 7/2018 | Bains .................. G06F 11/1068 |

OTHER PUBLICATIONS

John D. Strunk, "Hybrid Aggregates: Combining SSDs and HDDs in a single storage pool," Dec. 15, 2012, ACM SIGOPS Operating Systems Review archive, vol. 46 Issue 3, Dec. 2012, pp. 50-56.

Yiying Zhang, Leo Prasath Arulraj, Andrea C. Arpaci-Dusseau, Remzi H. Arpaci-Dusseau, Computer Sciences Department, University of Wisconsin-Madison, "De-indirection for Flash-based SSDs with NamelessWrites," published at https://www.usenix.org/conference/fast12/de-indirection-flash-based-ssds-nameless-writes, Feb. 7, 2012, pp. 1-16.

Andrea C. Arpaci-Dusseau, Remzi H. Arpaci-Dusseau, and Vijayan Prabhakaran, "ResearchRemoving the Costs of Indirection in Flash-based SSDs with NamelessWrites," Jun. 22, 2010, pp. 1-5, published at www.cs.wisc.edu/wind/Publications/hotstorage10-nameless.pdf by Computer Sciences Department, University of Wisconsin-Madison and Microsoft Research.

Stan Park and Kai Shen, Department of Computer Science, University of Rochester, "FIOS: A Fair, Efficient Flash I/O Scheduler," Feb. 23, 2012, pp. 1-15, published at www.usenix.org/event/fast12/tech/full_papers/Park.pdf by the Advanced Computing Systems Association, Fast'12, 10th Usenix Conference on File and Storage Technologies, San Jose.

Eric Seppanen, Matthew T. O'Keefe, David J. Lilja, Department of Electrical and Computer Engineering, University of Minnesota, "High Performance Solid State Storage Under Linux," Apr. 10, 2010, MSST '10 Proceedings of the 2010 IEEE 26th Symposium on Mass Storage Systems and Technologies (MSST), pp. 1-12.

Xiangyong Ouyangyz, David Nellansy, Robert Wipfely, David Flynny, Dhabaleswar K. Pandaz, "Beyond Block I/O: Rethinking Traditional Storage Primitives," Aug. 20, 2011, published at http://www.sciweavers.org/read/beyond-block-i-o-rethinking-traditional-storage-primitives-327868, by Fusion IO and the Ohio State University.

Intel Corp, PCI-SIG SR-IOV Primer—An Introduction to SR-IOV Technology,: 321211-002, Revision 2.5, Jan. 2011, 28 pages.

(56) References Cited

OTHER PUBLICATIONS

Open NAND Flash Interface (ONFI), specification, version 2.0, 174 pages, Feb. 27, 2008.
Open NAND Flash Interface (ONFI), specification, version 3.1, 296 pages Sep. 19, 2012.
NVM Express, V. 1.2.1, 217 pages, Jun. 3, 2016.
Garth Gibson, Greg Ganger, "Principles of Operation for Shingled Disk Devices," Canregie Mellon Parallel Data Laboratory, CMU-PDL-11-107, Apr. 2011, 9 pages.
Li-Pin Chang, "Hybrid Solid State Disks: Combining Heterogeneous NAND Flash in Large SSDs," National Chiao-Tung University, Taiwan, ASPDAC 2008, 26 pages.
Hua Wangx, Ping Huangxz, Shuang Hex, Ke Zhoux, Chunhua Lix, and Xubin He, "A Novel I/O Scheduler for SSD with Improved Performance and Lifetime," Mass Storage Systems and Technologies (MSST), 2013 IEEE 29th Symposium on, May 6-10, 2013, 5 pages.
Altera Corp. et al., "Hybrid Memory Cube" specification, 2012, 122 pages.
JEDEC Standard, JESD229, Wide IO, Dec. 2011, 74 pages.
Li-Pin Chang, "Hybrid Solid State Disks: Combining Heterogeneous NAND Flash in Large SSDs," National Chiao-Tung University, Taiwan, 978-1-4244-1922-7/08, 2008 IEEE, 6 pages.
Optimizing NAND Flash Performance, Flash Memory Summit, Santa Clara, CA USA Aug. 2008, Ryan Fisher, pp. 1-23.
High-Speed NAND Flash: Design Considerations to Maximize Performance, Flash Memory Summit, Santa Clara, CA USA Aug. 11, 2009, , Robert Pierce, pp. 1-19.
NAND 201: An Update on the Continued Evolution of NAND Flash, Jim Cooke, Micron White Paper, Sep. 6, 2011, pp. 1-10.
Spansion SLC NAND Flash Memory for Embedded, data sheet, S34ML01G1, S34ML02G1, S34ML04G1, Sep. 6, 2012, pp. 1-73.
Wang et al., "An Efficient Design and Implementation of LSM-Tree based Key-Value Store on Open Channel SSD," EuroSys '14 Proceedings of the Ninth European Conference on Computer Systems, Article No. 16, Apr. 14, 2014, 14 pages.
Ouyang et al., "SDF: Software-defined flash for web-scale internet storage systems," Computer Architecture News—ASPLOS '14, vol. 42 Issue 1, Mar. 2014, 14 pages.
Macko et al., "Tracking Back References in a Write-Anywhere File System," FAST'10 Proceedings of the 8th USENIX conference on File and storage technologies, 14 pages, Feb. 23, 2010.
Ohad, Rodeh, "IBM Research Report Defragmentation Mechanisms for Copy-on-Write File-systems," IBM white paper, Apr. 26, 2010, 10 pages, available at domino.watson.ibm.com/library/CyberDig.nsf/papers/298A0EF3C2CDB17B852577070056B41F/$File/rj10465.pdf.
Bjorling, "Light NVM, the Linux Open-Channel SSD Subsystem," 15th USENIX Conference on file and storage technologies, Feb. 27, 2017, 17 pages.

\* cited by examiner

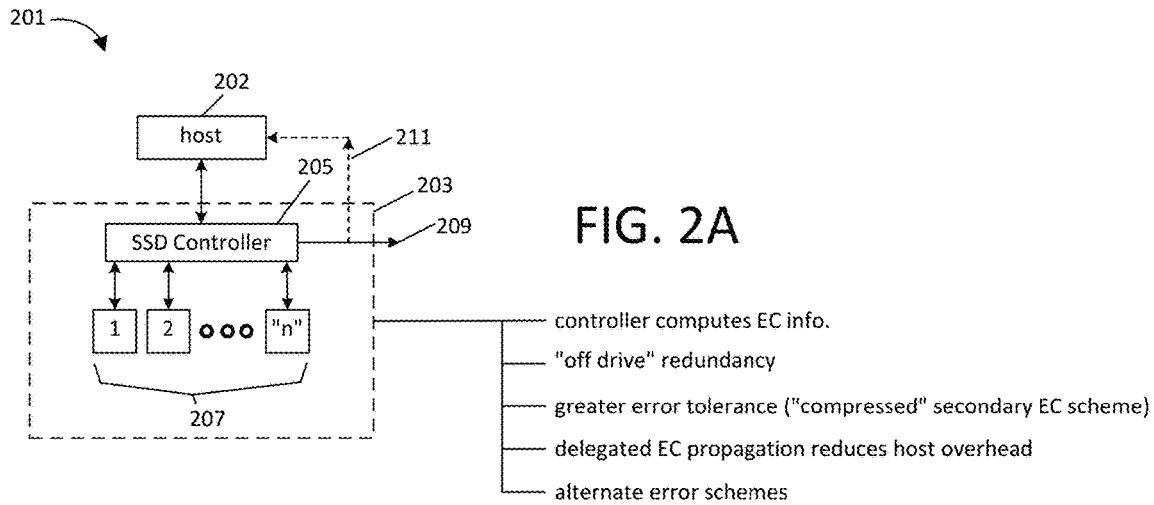
FIG. 2A
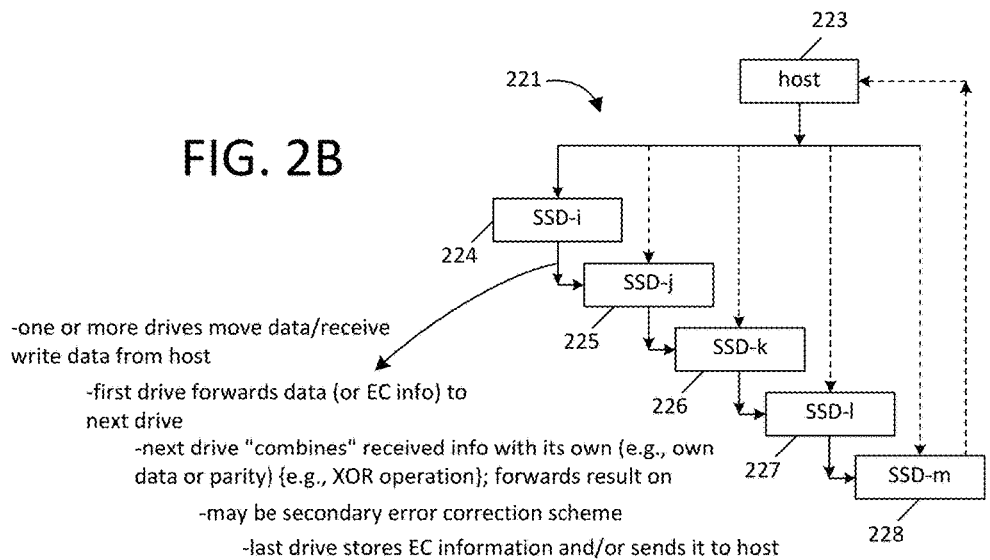
FIG. 2B
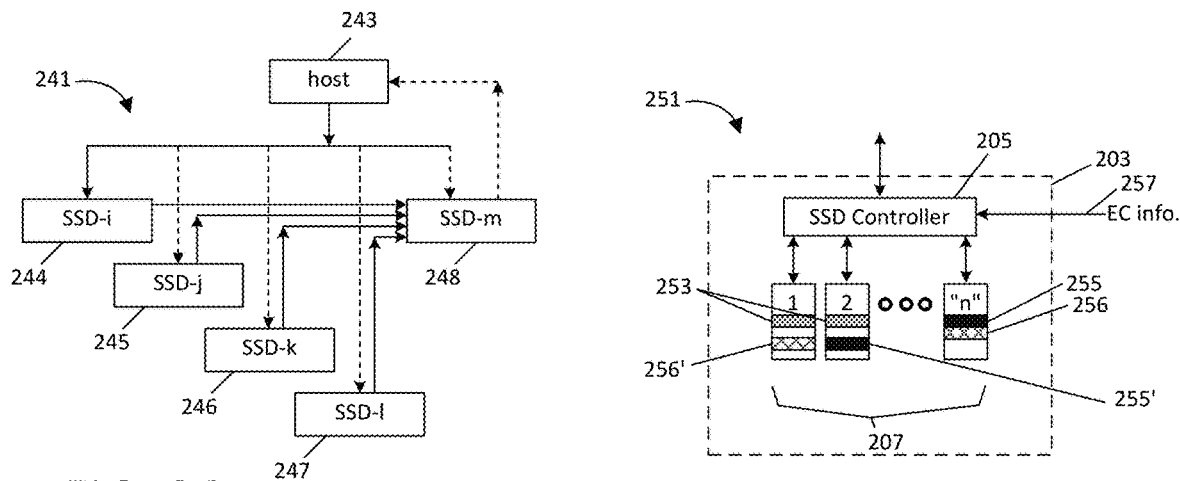
FIG. 2C
FIG. 2D

ASL LUT

| LBA Range | ASL Parameters | | | | | feature control | | | | | EC/ecc | | | |
|---|---|---|---|---|---|---|---|---|---|---|---|---|---|---|
| | seqCh | seqDie | seqEU | seqPg | sLB | rdC | wrC | nPa | nPl | ecc | mlc | alg1 | dest | alg2 | dest |
| 0-nLB$_{BD}$ | 1 | 1 | 1 | 1 | 4KB | off | off | 1 | 2 | 0 | 1 | x1 | y1 | x2 | y2 |

Host-scheduled Flash maintenance of controller identified segments

ERASURE CODING TECHNIQUES FOR FLASH MEMORY

FIELD

This disclosure relates to non-volatile data storage and retrieval within semiconductor memory. U.S. Pat. Nos. 9,400,749 and 9,542,118 are hereby incorporated by reference.

BACKGROUND

Nonvolatile memory is a type of digital memory that can retain data in the absence of power. Generally speaking, nonvolatile memory is relatively cheap, but it is also relatively slow when compared to other types of memory, such as random access memory ("RAM"). Given this disadvantage in performance, the memory industry continually strives to improve performance characteristics of nonvolatile memory, so as to enable its use as a cheaper replacement for RAM.

Many storage technologies use techniques that store some type of redundancy information that can be used to recover data in the event of an error. Generally speaking, these techniques, referred to as "erasure coding" or "redundancy" storage, process some type of underlying data to generate one or more pieces of error correction ("EC") information which is stored in addition to the underlying data; if some amount of the underlying data is lost, for example, because data becomes corrupted or because a storage unit becomes unavailable, the underlying data can still be quickly recovered. There are several different types of redundancy schemes including schemes where EC information is stored together with the data (i.e., in the same physical memory structure), and these schemes typically permit recovery of up to a certain number of bit errors. There also exist schemes which store redundancy information across multiple storage units, for example, to permit recovery of contents of one of the multiple storage units should any one of the multiple storage units become unavailable. "Redundant Array of Independent Disks" or simply "RAID" is sometimes conventionally used to refer to these latter techniques, and this term is used herein to refer to any storage technology where error recovery information and/or redundant data is stored across two or more distinct logical or physical storage resources, i.e., including but not limited to disk-based schemes, such that data can still be recovered notwithstanding loss or unavailability of one or more of these storage resources.

It is desirable to extend redundancy techniques (including RAID techniques) so that they can be used with non-volatile memory, i.e., such that these techniques can also be used with multiple storage resources each based in non-volatile memory. One relatively cheap and commonly available class of non-volatile memory utilizes asymmetric programming and erasing of storage units; flash memory and magnetic shingled drives are nonlimiting examples of these asymmetric non-volatile memory ("ANVM") technologies. With these types of memory technologies, a minimum size unit of data that must be written (or "programmed") at once and a minimum size unit of data that must be erased at once are different; for example with flash memory specifically, data is typically programmed in units of pages, depending on specific technology, and erased in units of "blocks" or "erase units" (EUs). A typical page size is about 16 kilobytes (KB) while a typical EU size might be hundreds to thousands of pages. A problem that can arise with these types of storage technologies is that entire structural units of memory, such as individual EUs, dies or other structures, can wear out over time, with the result that data and/or associated EC information can be lost. While techniques exist as mentioned for providing redundancy across structures, the asymmetric programming and erasing requirement can further complicate erasure coding schemes. Citing some specific problems that can arise with redundancy schemes for ANVM, if EC information is stored with data (e.g., in the same EU) and the EU becomes defective (as is statistically one of the more common forms of ANVM error), it may not be possible to recover data; because of the requirement for address translation, caused by the asymmetric programing/erasing framework, challenges exist in protecting data across multiple structures or drives (e.g., using RAID-style redundancy), as the need for address translation makes linking data and associated EC information difficult and substantially increases host traffic, and as substantial spare capacity must typically be devoted to provide effective error recovery capability.

Techniques are needed for improving the performance of systems rooted in nonvolatile memory, including memory characterized by one or more of the characteristics referenced above, particularly to facilitate application of redundancy techniques to ANVM. Further, techniques are needed for improving the ability of a host to gain insight into the memory configuration, to effectively permit the host to efficiently schedule host requests, e.g., such that the host can better manage communication bandwidth across the various storage resources, and so that the host can effectively provide for greater memory system customization. The present invention addresses these needs and provides further, related advantages.

BRIEF DESCRIPTION OF THE DRAWINGS

FIG. 2A is an illustrative diagram showing interaction between a host and a single drive (e.g., having a memory controller, or "SSD controller," and associated ANVM memory devices 1 thru n).

FIG. 2B is an illustrative diagram showing one embodiment for providing redundancy across drives or "SSDs" in an exemplary memory system.

FIG. 2C is an illustrative diagram showing another embodiment for providing redundancy across drives or "SSDs" in an exemplary memory system.

FIG. 2D is an illustrative diagram showing one embodiment for providing for redundancy for a single drive or SSD.

Figure 1A:
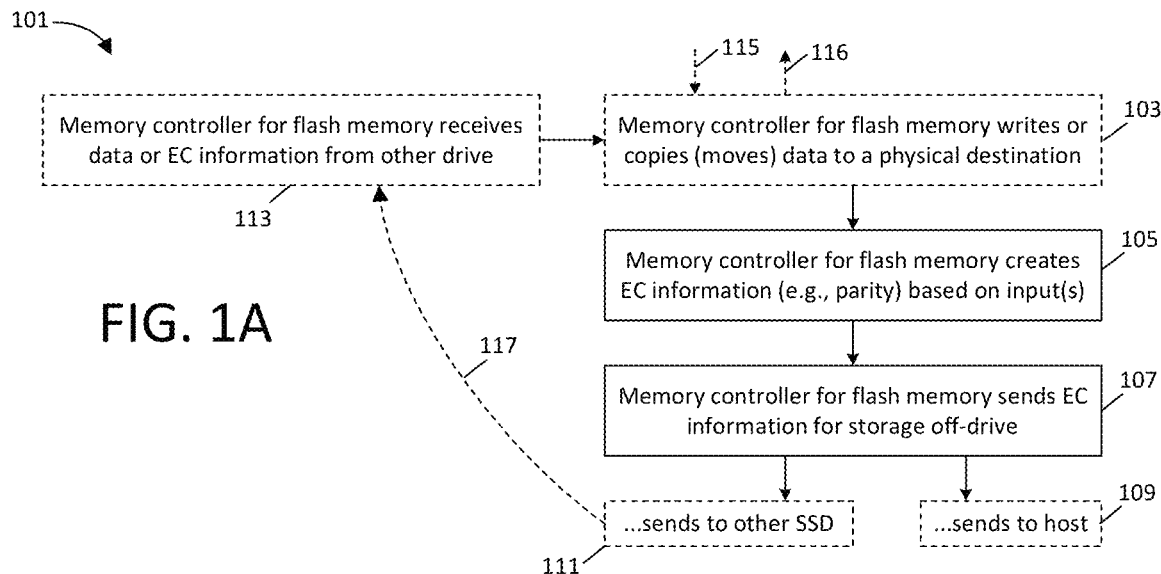
FIG. 1A is a block diagram showing functions of one embodiment of a memory controller for some asymmetric non-volatile memory ("ANVM"), and/or a system or method that includes/interacts with such a memory controller.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set forth below exemplifies techniques that can be practiced in one embodiment by a host, in another embodiment by a memory controller (e.g., within a single drive or across multiple drives), in another embodiment by a flash memory device (e.g., die or integrated circuit), or a drive (or storage aggregate having one or more drives) and in yet another embodiment by a host or memory controller cooperating with one or more other circuits. This disclosure also provides improved designs for a memory controller, host, memory devices, a memory system, a subsystem (such as a drive, e.g., a solid state drive or "SSD"), and associated circuitry, firmware, software and/or other processing logic. The disclosed techniques can also be implemented as instructions for fabricating an integrated circuit (e.g., as a circuit design file or as a field programmable gate array or "FPGA" configuration). While the specific examples are presented, particularly in the context of flash memory, the principles described herein may also be applied to other methods, devices and systems as well.

DETAILED DESCRIPTION

I. Introduction

This disclosure provides techniques for facilitating and/or providing additional redundancy for data stored in asymmetric non-volatile memory ("ANVM") structures. In one embodiment, the ANVM is flash memory such as implemented by one or more chips of NAND flash memory, formed as part of a solid state drive ("SSD," or simply "drive") having a dedicated memory controller; the memory controller can be an integrated circuit primarily concerned with controlling the operation of one or more chips of NAND flash memory (i.e., a "memory controller integrated circuit" for NAND flash memory).

One embodiment provides a memory controller for flash memory and/or a storage drive based on such a memory controller. The memory controller supports storing redundancy across drives (e.g., in memory not managed by that memory controller) by computing error correction (EC) information for data that it writes, and it transmits that EC information off-drive, e.g., in one embodiment to the host, and in a different embodiment to a memory controller for another drive. This embodiment supports many different error correction schemes. Another embodiment provides a memory system with multiple flash memory drives, each having its own dedicated memory controller (i.e., each having one or more memory controller ICs). A memory controller performing a write of data passes information on to the next drive; this information can either include the data which is being written, or it can include EC information based on the data which is being written. The next memory controller (for the next drive) then performs a linear error correction combination to generate new error correction data; for example, the next memory controller (for the next drive) can exclusive-OR ("XOR") the information received from the prior drive with data at a matched storage location, to compute parity, which it then passes on to the next drive. Such an embodiment provides a scheme were EC data is generated across multiple drives, in a manner not requiring direct involvement of the host for computation of EC information between drives (i.e., which is performed in this embodiment on a peer-to-peer basis). Note that a "write" of data, as used in this context, can include a move of data (e.g., without limitation, a "garbage collection" operation in which a memory controller for flash memory moves or copies data from a first location (for example, a mostly-released EU) to a new physical destination within the same drive, e.g., in an effort to free up the mostly-released EU so that it can be erased and prepared to receive new writes.

The embodiments introduced above facilitate a myriad of different error correction/redundancy schemes which are all contemplated by this disclosure as novel techniques. For example, one contemplated implementation uses two different redundancy schemes. Within each drive, a first redundancy scheme is used which provides for redundancy across multiple logical or physical structures within the drive; such a scheme can optionally benefit from teachings from the incorporated-by-reference documents which use 'virtual address' and 'address space layout' techniques to provide for cross-structure redundancy and zones or virtual devices (as described below), to provide for a wide variety of customization. A second error correction scheme is then applied on a cross-drive basis, e.g., where EC information for each of multiple drives is combined and used to produce redundancy for EC data (referred to herein as "superparity," i.e., as a term denoting compression of, or combination of multiple pieces of error information for respective data sets, irrespective of whether the EC information in fact involves 'parity'); such a scheme provides for space-efficient error protection against multiple failures in any given drive. Recollecting that with ANVM (and flash memory in particular), wear-based failures tend to be on a block-by-block basis, the first error correction scheme can be applied to recover a given number of failures (e.g., single block or segment only in some embodiments) within a given drive, without requiring extra-drive redundancy, while in the unlikely event that a greater number of blocks simultaneously fail within the given drive (e.g., two blocks or more in some embodiments), the second error correction scheme can be utilized to rebuild second error correction data for the drive having the errors (i.e., by retrieving the stored "superparity" and reverse-computing the EC information for the specific drive having the failures from stored or recomputed EC information from the other drives). It should be observed that this scheme utilizes cross-drive redundancy with extremely efficient storage of recovery data; such a scheme will be explained with particular reference to FIGS. 10A-11B, discussed below.

Note again that many error schemes are contemplated by this disclosure, both inside and outside a given drive, and are not limited to the use of two or more different error recovery systems in combination, as was just introduced. Each of intra-drive error correction schemes and inter-drive error correction schemes, and combinations of the two, are contemplated by this disclosure; embodiments are expressly contemplated where these various techniques are practiced just in memory, just in a memory controller, just in software, just in a drive, just in a host, just in other architectural elements, in multiple dries or other elements, or in any permutation or combination of these things.

Prior to proceeding to a further detailed description regarding various embodiments, it would be helpful to introduce certain additional terms that will be used in this disclosure.

Specifically contemplated implementations can feature instructions stored on non-transitory machine-readable media. Such instructional logic can be written or designed in a manner that has certain structure (architectural features) such that, when the instructions are ultimately executed, they cause the one or more general purpose machines (e.g., a processor, computer or other machine) to behave as a special purpose machine, having structure that necessarily performs described tasks on input operands in dependence on the instructions to take specific actions or otherwise produce specific outputs. "Non-transitory" machine-readable or processor-accessible "media" or "storage" as used herein means any tangible (i.e., physical) storage medium, irrespective of how data on that medium is embodied, including without limitation, random access memory, hard disk memory, EEPROM, flash, storage cards, optical memory, a disk-based memory (e.g., a hard drive, DVD or CD), server storage, volatile memory and/or other tangible mechanisms where instructions may subsequently be retrieved and used to control a machine. The media or storage can be in standalone form (e.g., a program disk or solid state device) or embodied as part of a larger mechanism, for example, a laptop computer, portable device, server, network, printer, memory drive or unit or other set of one or more devices. The instructions can be implemented in different formats, for example, as metadata that when called is effective to invoke a certain action, as Java code or scripting, as code written in a specific programming language (e.g., as C++ code), as a processor-specific instruction set, or in some other form or language; the instructions can also be executed by a single, common processor or by different (remote or collocated) processors or processor cores, depending on embodiment. Throughout this disclosure, various processes will be described, any of which can generally be implemented as instructions stored on non-transitory machine-readable media. Depending on product design, such products can be fabricated to be in saleable form, or as a preparatory step that precedes other processing or finishing steps (i.e., that will ultimately create finished products for sale, distribution, exportation or importation). Also depending on implementation, the instructions can be executed by a single computer or device and, in other cases, can be stored and/or executed on a distributed basis, e.g., using one or more servers, web clients, or application-specific devices. Each function mentioned in reference to the various FIGS. herein can be implemented as part of a combined program or as a standalone module, either stored together on a single media expression (e.g., single floppy disk) or on multiple, separate storage devices. Throughout this disclosure, various processes will be described, any of which can generally be implemented as instructional logic (e.g., as instructions stored on non-transitory machine-readable media), as hardware logic, or as a combination of these things, depending on embodiment or specific design. "Module" as used herein refers to a structure dedicated to a specific function; for example, a "first module" to perform a first specific function and a "second module" to perform a second specific function, when used in the context of instructions (e.g., computer code), refers to mutually-exclusive code sets. When used in the context of mechanical or electromechanical structures (e.g., an "encryption module," the term "module" refers to a dedicated set of components which might include hardware and/or software). In all cases, the term "module" is used to refer to a specific structure for performing a function or operation that would be understood by one of ordinary skill in the art to which the subject matter pertains as a conventional structure used in the specific art (e.g., a software module or hardware module), and not as a generic placeholder or "means" for "any structure whatsoever" (e.g., "a team of oxen") for performing a recited function (e.g., "encryption of a digital input"). "Erasure coding" as used herein refers to any process where redundancy information is generated and/or stored, such that underlying information used to generate that redundancy information can be recovered if a memory device or unit of memory is off-line or otherwise inaccessible. "Host-supplied" address means an address supplied by the host (but not necessarily assigned by the host), for example, provided in connection with a host-issue request; for example, this term encompasses an address provided with a read request which seeks specific data (e.g., the address may have been originally assigned by the memory controller, depending on embodiment). "EC information" as used herein refers to information relating to error correction values or the location or existence of error correction values; it for example can encompass single or multi-bit parity values or other forms of error correction codes or data and/or it can encompass an identifier, link or address that points to one or more of these values; as non-limiting examples, it can refer to a result of an XOR operation performed on two pieces of multibit data, or a notification that EC values have been stored in a location (i.e., such that the host or a memory controller for a different drive can then request or access those values). "Superparity" and/or "master error correction information" as used herein refer to redundancy information premised on a combination of multiple sets of EC values, regardless of whether those values are in fact parity values (e.g., the term refers to a master data representing compressed or combined redundancy protection for any type of EC information). "RAID" as used herein refers to a redundancy scheme that is tolerant to one or more independent devices or storage structures being offline or otherwise inaccessible by permitting recovery from other independent devices or storage structures that are not offline or inaccessible, for example, encompassing a situation where M page- or other-sized sets or groups of data are received or stored and where L storage locations (or segments, e.g., respective virtual or physical structural elements) are used to store that data (i.e., where L−M≤1) to permit recovery of each of the original M pieces of data notwithstanding that at least one (and potentially 2, 3 or more) of the L respective structural elements is offline; for example, the term RAID as used below is not limited to a disk-based scheme, and can encompass RAID4, RAID6 and other redundancy schemes. "Redundancy information" as use herein refers to information transmitted by a memory controller to a host, another drive, or another destination outside of a drive in which the memory controller resides for purposes of providing redundancy; for example, in one embodiment, this term can encompass mirroring newly-written data (or data to be written, copied or moved) to a different drive, which then calculates parity based on two pieces of data—in another embodiment, this term can encompass EC information based on newly-written data (or data to be written, copied or moved), e.g., which is then transmitted to the host, a different drive, or another off-drive destination.

Having thus introduced some illustrative capabilities provided by various techniques describe herein, this description will now proceed to discuss a number of illustrative embodiments in additional detail.

II. Use of a Memory Controller/Drive to Facilitate Intra- or Inter-Drive Redundancy FIG. 1A shows techniques 101 performed by one embodiment of a memory controller for some asymmetric non-volatile memory ("ANVM"), and/or a system or method that includes/interacts with such a memory controller. A memory controller for ANVM, such as flash memory, writes or copies (moves) data to a physical destination, as represented by numeral 103. As referenced earlier, such a write of data can in some embodiments be performed as part of a garbage collection operation in which a memory controller frees up an erase unit ("EU" or "block") of physical memory by relocating one or more remaining valid pages of data to new storage locations; once the EU has been completely released, and all active data has been relocated elsewhere, that EU can then be erased. In one embodiment, a garbage collection operation is performed as a traditional memory controller maintenance function, while in another (i.e., as taught in the incorporated by reference documents), the host schedules or cooperates with the scheduling of garbage collection, for example, issuing express "copy" commands to fractionally relocate valid data in a manner that does not collide with host-queued read and write requests. The write in question can also be performed as part of a scheme which relocates "cold" data (i.e., data which might not be a candidate for garbage collection, i.e., few pages of a block have been released, and an EU still is mostly in active use), to avoid concentrating garbage collection operations into a subset of blocks in a given memory die or drive. It is also possible for the write to be performed in fulfilment of a host write request, i.e., where the host provides data and requests that the memory controller write that data into memory. Per numeral 105, the memory controller creates EC information based on the data that is to be written. This EC information can be any desired type of error correction information, created using any suitable error correction algorithm. For example, in one embodiment, the memory controller simply performs an exclusive-OR ("XOR") function between multiple data sets including the new write data (e.g., the XOR can be between multiple pages- or LUNS-worth of data from a destination block in which the new write data will be stored), it can be between new and old data for a given logical, virtual or physical address, it can be between data at common address offsets relative to virtual, logical or physical structures within a given flash drive (or respective flash drives), or it can be performed on some other basis. As indicated by function block 105, an XOR operation used in this manner can be said to generate one or more parity values based on multiple data sets. Note that in other embodiments, any desired mathematical function is used to generate error correction information, e.g., in one embodiment, a linear error correction code generating function is used (an XOR operation is one example of a linear function of this type), while in another embodiment, a non-linear function is used. Note also that it is not required that EC information be generated right away, e.g., in another embodiment, the memory controller computes the EC information on a delayed basis, for example, only after it has filled a given logical, virtual or physical block or structure of memory. Per numeral 107, at some point, the memory controller then sends the generated EC information for off-drive storage; this EC information can be sent either unsolicitedly (e.g., automatically, as each write operation is completed, or as a virtual, logical or physical structure is filled, or at some other milestone), or it can be read or transferred by a received explicit request for the EC information, i.e., to transmit that EC information to the host (109) or to another SSD (111). In some embodiments, once the EC information is calculated by the memory controller, the memory controller sends the host a message which either provides the EC information or provides an identifier, such as address information, which then permits the host to read or trigger transfer of the EC information (at a time of the host's choosing) in response to an explicit host request.

In one embodiment, the memory controller for flash memory receives as inputs one or more of (a) data or EC information from another drive, per function block 113, and/or (b) per numeral 115, new write data from a host, and/or a host-originated request that will result in a write. Also, the memory controller for flash memory can transmit computed EC information to a host (i.e., as represented by numeral 116), or to another drive (i.e., as optionally represented by numeral 117), optionally with an index that links/identifies matched, underlying data, storage locations and/or EC values. Revisiting the discussion earlier, to the effect that in one embodiment, multiple drives can communicate via peer-to-peer communications, numerals 113 and 117 together denote that a given drive can receive data (or an EC information input) from a first adjacent drive (i.e., as implied by box 113), it can operate on that received data (for example, by optionally computing EC information based on both the received data/EC information input and other data/EC information) to generate new EC information, and it can pass that newly generated EC information to a second adjacent drive, via conceptual path 117. Note that this daisy chaining between drives is optional for many embodiments.

Figure 1B:
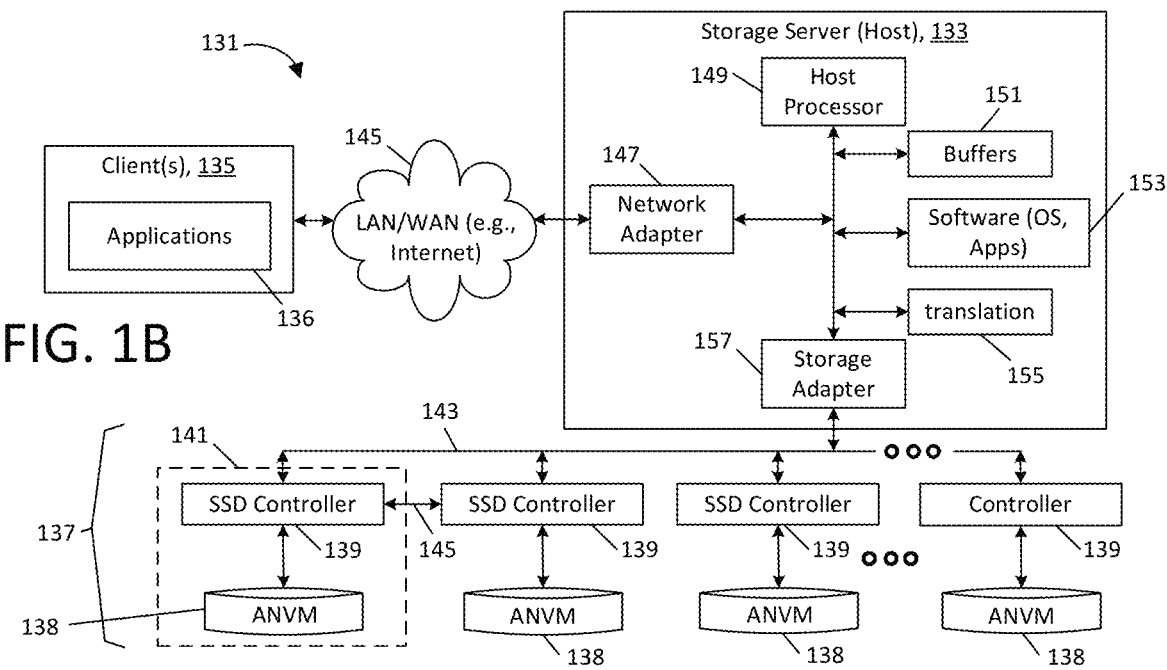
FIG. 1B is an illustrative diagram showing an exemplary storage system.

FIG. 1B illustrates an exemplary storage system 131 having multiple ANVM drives. In particular, a storage server operates as a host 133 and receives requests for data or to store data, and optionally, requests for processing that data, from one or more clients 135. These clients each have respective applications 136 which generate the respective data-related needs. The clients can each be desktop or laptop computers, smart phones, pads or other devices, virtual machines, or other types of digital systems. Each client 135 sends requests to the storage server/host 133 and receives responses via a network, e.g., a local area network (LAN) or a wide area network (WAN) 145 such as the Internet. The storage server, in turn, manages plural drives, each of which can optionally be an SSD (e.g., a flash based drive), such as drive 141. As seen in FIG. 1B, each drive has its own dedicated memory controller 139 (e.g., a cooperative memory controller and/or pseudo-expositive memory controller), labeled as "SSD controller" in the FIG., either bundled together as a single assembly or drive, or in a manner detached from memory (i.e., as a separate device); for example, drive 141 is seen to include a SSD controller 139 and a flash memory 138. Note that in some designs, each drive can include more than one controller, e.g., with partitioned memory management functions or tasks. To simplify FIG. 1B, a dashed-line box is shown only for drive 141. The SSD controller 139 can be a NAND flash memory controller and the flash memory 138 can have one or more NAND flash memory devices (i.e., chips, dies or packages). FIG. 1B indicates that any number of ANVM drives can be present, i.e., four are illustrated in the FIG. with ellipses indicating there can be a greater or fewer number of such drives. In one embodiment, only a single SSD is present (e.g., SSD 141) in a storage aggregate, while in another embodiment, two or more such drives are present. In yet a third embodiment, the various drives can be of heterogeneous types, e.g., either comprising ANVM drives of different types (e.g., other than NAND flash), or including other types of non ANVM drives (e.g., volatile memory drives such as one based on, without limitation, DRAM or magnetic media). Arrows 145 indicate that, if optionally desired, memory controllers 139 for the respective SSDs can be configured for peer-to-peer access.

In this regard, one embodiment provides for cross-drive error protection. The memory controller for a given drive, such as SSD controller 139 for drive 141, writes data into the ANVM that the particular memory controller controls. As referenced earlier, the given drive then transmits something to either the host or the other drives to provide for redundancy. In one contemplated implementation, as referenced earlier, the SSD controller 139 transmits EC information to the host 133, with the host electively either storing that EC information, transmitting it to another drive, or processing it (e.g., to derive superparity). In another contemplated implementation, the SSD controller 139 for drive 141 uses a peer-to-peer channel 145 (or system bus 143) to send a copy of its write data (or the computed EC information) to another memory controller for another SSD. That second memory controller then uses this received information to compute further EC information, for example, by linearly combining it with similar EC or data information for a matched memory location within that drive; in a relatively simple embodiment, the drive simply XORs the received information with the data found at the matched memory location, and then forwards the resulting EC value(s) on to the next drive, which performs a similar operation. Exemplifying this operation, in one implementation, each of the depicted drives XORs like-order data written to matched memory locations (e.g., the third drive XORs its data with the result of an XOR between the first two drives, and so on), with the final drive then generating a parity result that enables recovery of any given data value (from one of the drives) should one of the matched locations experience error. The final drive can either store the resultant parity (e.g., the final drive might be a fifth drive which simply stores redundancy for four other drives) or forward it to the host for storage elsewhere. The host can also perform this same type of EC combination, i.e., simply by receiving EC information returns from each drive and matching EC information together for corresponding locations. To reverse engineer a given set of data from a single drive, the host in one embodiment simply reads the data from a set of matched storage locations (save the one that experiences error), it recovers the corresponding EC information, and it XORs all of these pieces of data together to exactly recover the corrupted data. Not all embodiments discussed herein use this relatively simple, optional error correction scheme, and linear combination functions other than based on XOR operations can be can also or instead be used in some embodiments.

In identifying matched memory locations, and generating EC information which spans drives in the manner just exemplified, a number of configuration options exist. In a simple case, where the EC information is the result of a linear combination of sets of respective data and/or associated EC information, the memory controller and/or host can be configured to identify a virtual, logical, or physical address offset or other index for each drive in order to identify matched underlying data and/or EC information. For example, where EC information is calculated on the basis of physical address, each memory controller (or the host) would simply obtain data/EC information for a given address offset (e.g., channel1, die3, plane 1, EU24, page 7, etc.) and would combine this data/EC information with similar data/EC information from one or more other drives having exactly the same address offsets (e.g., channel1, die3, plane 1, EU24, page 7, etc.). For logical or virtual addressing, or other forms of index, the same type of operation is performed, but on the basis of this addressing (note that in such an embodiment, when a given memory controller reports back EC information, it also advantageously reports back the corresponding logical or virtual address or other index for the associated underlying data, i.e., which permits the host for example, to identify matched logical and/or virtual storage locations for the EC information it receives). As these statements imply, the memory controller for a given drive can optionally apply address translation (e.g., a flash translation layer or FTL) at a level below the indexing scheme. For example, as described by the incorporated by reference documents, in a virtual scheme, the memory controller can transparently remap a virtual structure corresponding to a portion of a host-supplied address to one or more dedicated physical structure (e.g., a virtual "block" can be mapped to one or more physical blocks in a manner transparent to the host, e.g., where each of the one or more physical blocks are associated with only one virtual block).

As will be discussed further below, address space layout (ASL) and virtual block device (VBD) techniques from the incorporated by reference documents can also be used to define zones or VBDs for one or more of the depicted drives. For example, a first zone in one drive can be configured to have no redundancy, while a second zone in that drive can be configured to use internally-stored EC codes only, and a third zone in that drive can be configured to use multiple redundancy schemes, including one rooted in first EC information stored on the drive and one rooted in second EC information stored off the drive; a second drive can be configured differently, for example, having only one zone matched for cross-drive redundancy purposes to the third zone in the first drive (e.g., with cross-drive error protection being applied by the first/second drives to this respective third/first zones only). The memory controllers 139 depicted in FIG. 1B can optionally be provided with VBD/ASL information for memory of the other drives, or provided with zone-by-zone direction information, with each drive then forwarding information on to the next drive (or the host) in a manner that identifies matched zone and address (and consequently, whether, by inference, the error protection scheme for a given matched zone is to be applied for matched storage locations).

The host depicted in FIG. 1B is rooted in a storage server 133 that includes a host processor 149, which uses various buffers 151 under the auspices of the host software 153 to schedule and manage memory operations, including both memory transactions and, in some embodiments, memory maintenance operations. Each drive, such as SSD 141, is seamlessly managed as part of a storage aggregate 137, with the storage server/host 133 managing scheduling for all drives so as to avoid collisions between drive maintenance and storage-server-directed reads and writes. In this regard, the storage aggregate and the host can be bundled as the storage server, but this is not required for all embodiments. The storage server has a storage operating system that implements a file system to organize the stored data as a hierarchical structure of logical data containers (e.g., volumes, logical units, directories and/or files) on electronic and/or magnetic storage media. It will be understood by those skilled in the art that this description may apply to any type of special-purpose computer (e.g., file server or storage serving appliance) or general-purpose computer embodied as, or having, a storage server or portion thereof, or even to a virtual machine. Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements. The host in this embodiment maintains a local translation table (e.g., virtual address translation table) 155 so as to access files which can be fragmented in multiple memory locations and potentially multiple drives. The storage server/host also optionally employs policy-based space allocation, supporting data- and media-characteristic-aware data placement across the entire storage aggregate 137. The storage server communicates with the clients 135 via a network adapter 147 and with the storage aggregate 137 via a storage adapter 157 (although it is also possible to have all communications performed via network adapter or otherwise remotely over a network such as a WAN or LAN).

In some implementations, the client(s) can issue packets including file-based access protocols such as the Common Internet File System (CIFS) protocol or Network File System (NFS) protocol over TCP/IP when accessing information in the form of files. In other implementations, the client(s) can issue packets including block-based access protocols such as the Small Computer Systems Interface (SCSI) protocol encapsulated over TCP (iSCSI) and SCSI encapsulated over FC (FCP) when accessing information in the form of LUNs or blocks. Also in some implementations, the storage adapter includes input/output (IO) interface circuitry that couples to SSDs (e.g., 141) over an IO interconnect arrangement, such as a conventional high-performance Fibre Channel serial link topology, NVMe over fabric, Ethernet, Infiniband, TCP/IP, or indeed, using any desired connection protocol.

The depicted storage server manages flash memory using a log-structured copy-on-write file system, optionally in a manner that obviates need for an extensive FTL layer on the side of the SSD and that better distributes wear, as described in commonly owned U.S. Pat. No. 9,400,749 (incorporated by reference). This is to say, in one contemplated embodiment, each flash-based drive such as drive 141 advantageously has a memory controller that implements operations where either the host or a controller specific to the given drive performs maintenance, and/or the memory controller sends requests to perform maintenance to the host, which then explicitly commands requested maintenance in the given drive request on a fractional basis in a manner where request issuance is scheduled at a time of the host's choosing, e.g., so as to not collide with queued/upcoming data accesses and/or other operations planned for the given drive. The memory controller IC for each drive also advantageously computes EC information as referenced elsewhere herein, optionally enabling the storage server/host to provide for cross-drive redundancy. Depending on system architecture, host software manages interaction with each such memory controller. This architecture provides for host-memory-controller cooperation in managing NAND flash memory-based storage devices in direct-attached and/or network-attached storage environments. For example, each flash-based drive has a respective controller that also serves to provide information to the host regarding each subdivision of the memory managed by that controller. The storage server (in this case, the host) can manage wear distribution across multiple drives to help lessen wear to any one area of memory; for example, in the context of the wear-aware writes, the storage server can collect wear metrics for all flash memory managed as well as for other types of nonvolatile memory, if present, and can redistribute cold data using explicit requests to each of the drives that call for a given drive to transparently move data at a specified address (i.e., without sending that data to the host) or to transfer that data between drives (e.g., optionally using peer-to-peer communication). The storage server can combine bitmaps from multiple drives and can allocate if desired new writes to a single drive only if needed to better distribute wear or conversely, provide for bins (i.e., distinct SSDs) with differently managed wear parameters as different endurance groups. Advantageously, the host can also electively direct writes of data based on policy, for example, in a manner that avoids fragmentation or that groups certain types of data together based on read-write characteristics. In one embodiment, each SSD memory controller 139 is rooted in a configurable architecture that depends on host capabilities, policies, or other considerations. For example, in such an architecture, if the host processor does not support host-assignment of addresses for new writes, the host configures each SSD memory controller to perform this function and to report back assigned logical, virtual (ideal) or physical addresses as described earlier.

FIGS. 2A-2D are used to introduce a number of exemplary redundancy schemes for data stored in ANVM.

FIG. 2A shows a first configuration 201 of a storage system having a host 202 and an SSD 203. The SSD has an SSD controller 205 which can be configured as a memory controller IC, as introduced earlier. The memory controller IC manages a number of memory dies, in this case, flash memory dies 1-n. These dies are collectively designated by numeral 207 in FIG. 2A. As was introduced above, the depicted SSD controller 205 computes EC information in association with data it writes somewhere into memory dies 207. In addition to optionally storing that EC information on-board SSD 203, the SSD controller transmits that EC information (i.e., EC values, or a link thereto or a storage address for such EC values) to an external destination, as represented by arrow 209. That external destination in some embodiments is either a different drive or the host (i.e., as represented by dashed-line return arrow 211). As noted by the right-side of FIG. 2A, this basic architecture supports schemes: where the memory controller computes EC information (i.e., and then sends that information somewhere else); where the memory controller/drive supports "off-drive" redundancy, i.e., where a host or other drive receiving EC information can apply or provide that information to recover lost or erroneous data in the depicted drive; where multiple levels of redundancy are supported (e.g., two different redundancy schemes are used, one producing first EC information ("P") and a second producing second EC information ("Q"; note that three or more different levels of redundancy can also be supported); where EC information forwarding can be delegated to drives, i.e., reducing host-overhead; and, where alternate error schemes can be supported (e.g., based on striping across logical, virtual or physical data structures, either within a drive or across drives, as described earlier).

FIG. 2B is used to show one possible implementation 221 where forwarding of EC information is performed drive-to-drive. The depicted system includes a host 223 and a number of SSDs 224-228; this FIG. shows five SSDs, but it should be appreciated that there can be any number of SSDs. Each SSD in turn has its own set of one or more dedicated memory controller ICs, as has been described earlier, each to control one or more ANVM chips on the respective drive. In this FIG., it is assumed that a memory controller writes respective data to each drive (e.g., such as left-most drive 224). This embodiment can be configured to provide relatively straightforward cross-drive error protection (each drive can also optionally provide purely internal error protection, for example, to recover one or more corrupted bits and/or segments of data being read, e.g., using conventional techniques). In this embodiment however, when drive SSD-i (224) writes data, either pursuant to a received write request from the host, or from a move command from the host (this will be discussed further below), or as a part of a transparent garbage collection operation, the drive also transmits a copy of the data being written, or computed EC information, to the next, adjacent drive, i.e., to SSD-j (225), together with physical address or other index associated with the write destination. The next drive SSD-j then performs an exclusive-OR (XOR) operation with data found at a matched location (or other indexed location) in that drive (e.g., "channel 3, die 2, plane 0, EU233, page 193") and so on, with each structural value in this example representing an offset at a respective level in a hierarchy of physical structures within each SSD. In turn, SSD-j sends the result of its XOR operation to the next drive (SSD-k, 226) with an address/index, which similarly performs an XOR operation with data at the matched address location/index in that drive, and this process is then repeated for drive SSD-1 (227). Finally, the result is sent in the same manner to drive SSD-m (228), which simply stores the data, essentially storing parity or another linear error correction code on the basis of a stripe of matched data. In the event that error is detected, the error is reported to the host by the drive which experiences the error together with the address/index, and the host then reads information the information stored by every other drive at the same physical address/index (save the drive which experienced the error). By reading this information and performing an XOR operation of each received value, the host thereby recovers the lost data, e.g., notwithstanding the error. Note that if physical addressing is used as the index, when space is ultimately erased (e.g., an erase unit is erased), the location being erased can be subject to the same cascading/forwarding scheme (i.e., to effectively "zero out" contribution of the data being erased to parity stored by drive SSD-m and/or the host). It should also be noted that a number of options/variations exist to this basic scheme; for example, instead of performing XOR by physical address, the same process can be performed for logical or virtual address (e.g., with each drive reporting data/parity with that logical/virtual address, and each ensuing drive in the chain performing address translation to obtain and XOR the received value with its corresponding data (or with "all 0s" if the corresponding address has not yet been written to); with such an embodiment, depending on configuration, it may not be necessarily to forward data/EC information each time there is a data move, or to process released storage locations that are being erased, i.e., in configurations which keep the same logical address (but merely change physical location of the data, transparently to the host, and rewrite an FTL pointer to that information), the logical address and the data presumably stay the same. In other embodiments, even where error protection is on the basis of logical or virtual addressing, new error information is propagated in the manner described initially; for example, U.S. Pat. No. 9,400, 749 (incorporated by reference) shows a cooperative memory controller where a host-supplied address have individual subfields, e.g., for die number for example, that map to structures at a corresponding tier within the memory hierarchy (e.g., to physical structures). In such a case, a new destination address may be partly physical (e.g., with address remapping/translation being performed at any desired level, or not at all, depending on configuration); also, as disclosed in that US Patent, the host itself can perform garbage collection on a fractional basis, by sending move requests to a memory controller (at a time of the host's choosing, interleaved at a suitable place amidst upcoming read and write requests), where those requests optionally explicitly specify source and destination address for a move. FIG. 2B also indicates a number of notable features of this embodiment in the margin: There is an operation where one or more drives either move data or receive new write data from a host request; A first drive (receiving a write) forwards that data (or EC information) to the next drive in the chain; The next drive combines received information with its own data or EC information (e.g., it performs an XOR function or other linear combination function), and forwards the resulting result on, cascading it to the last drive which either stores final EC information (or, if the last drive in a given configuration is used to store data, the EC information can also be sent to the host, e.g., for storage elsewhere); The described error scheme can be in addition to other redundancy schemes which are applied, including without limitation, to recover data and/or EC information within a given drive or across drives. Other applications and benefits are also contemplated.

FIG. 2C shows yet another implementation 241, with a host 243 and SSDs i-m, the latter respectively numbered 244-248. In this case however, instead of forwarding information to the next drive (as was the case with the embodiment in FIG. 2B), each drive forwards its data (or EC information) directly to the last SSD 248, which then simply XORS that data with any existing contents of an indexed location, e.g., as denoted by an index value/identifier that accompanies the inter-drive transmission; such a scheme has the advantage that SSD-m may already have existing parity information for a data stripe spanning drives SSDs-i,j,k,l, i.e., instead of cascading information, any new data being moved/written to a destination for any drive may simply be XORed with parity values already kept by drive SSD-m for the indexed locations (these values would be initialized, e.g., at "0s" if none of the drives had existing data at the corresponding address location). In a contemplated variation where existing data is being overwritten, by physical overwrite or virtual mapping, the new data can be XORed with the existing data prior to erasing the existing data, and the result can then be sent to the parity drive (where it is XORed with the existing EC data), such that a new result replaces the existing EC data, thereby maintaining the EC data for the entire stripe. Once again, depending on configuration, any of logical, virtual or physical addressing may be used or other forms of index may be used to link redundancy information and/or underlying data.

FIG. 2D is used to introduce an error protection scheme within a single (e.g., any given) SSD. This embodiment 251 features the SSD from FIG. 2A (designated using numeral 203). As before the memory operations in ANVM are controlled by a SSD controller (e.g., a memory controller IC) 205. The memory controller IC handles actions necessary for controlling the memory array and memory cells; in the case of NAND flash for example, these operations can include program-verify (PV) operations (see U.S. Pat. No. 9,400,749 for a discussion of PV operations), cold data relocation, garbage collection, wear leveling, control over programming, resetting (erase) and read voltages, swapping of reserve "spares" in to take the place of defective blocks (i.e., that wear out over time), plane control including without limitation, multi-plane operations, thermal annealing and many other operations, depending on the specific memory design. In the depicted embodiment, the SSD controller manages performance of the appropriate combination of these functions by issuing commands to one or more of flash memory dies "1-n" (represented by numeral 207). The depicted SSD controller manages at least two different error protection schemes. For a first error protection scheme, the SSD controller 205 writes data into one or more physical storage locations 253 and computes associated error correction (EC) information using a first error correction algorithm; it writes this data into slot 255 (i.e., into a different memory device as part of a stripe) or alternatively into slot 255'. The FIG. notably denotes several options, including (a) a situation where both data and its EC information are written into the same die, and potentially even into the same erase block (e.g., in "die2"), (b) a situation where the memory controller stripes related or unrelated data across dies 1-(n-1) and writes associated EC information into die "n" (e.g., into a fresh die, with the EC information being a simple XOR or other linear combination of the striped data), again, with virtual, logical or physical addressing or index used to link EC information and/or underlying data; (c) a situation where data is striped across dies "1-n" and where EC information is written on a round-robin basis also into dies "1-n" at a related or unrelated storage locations (e.g., for example, EC information for a first data stripe is written into die1, EC information for a second data stripe is written into die2, and so on—this round-robin storage of EC information is represented by numerals 256 and 256' in the FIG.). The depicted SSD 203 in this embodiment also uses a second error correction algorithm, pursuant to which it generates second EC information which it sends off-drive, as has been described earlier.

In the case of the example presented in FIG. 2D, it is assumed that there is a structural failure and that it is desired to recover data. As noted earlier, for many ANVM types, especially flash memory, failures tend to be in the form of EUs marked as bad blocks, meaning that the EU (and/or a die having that EU) fail as a unit as a random event. As presented earlier, a storage location in an EU typically cannot be written to unless the entire EU is first emptied and erased, and it is notoriously well-known with flash memory that the technology has an associated endurance limit that varies according to generation, vendor and design, i.e., typically on the order of hundreds to tens of thousands of write cycles; as the endurance limit is reached, the EU starts experiencing errors. Errors can be of multiple forms, including inability to write data correctly (i.e., a predetermined number of PV cycles fails to correctly write data), read-disturb errors, and other types of errors. If an error occurs in "die2" in the depicted FIG. and EC information is stored in die "n," depending on the error correction scheme employed, the error is usually fully recoverable; for example, if the error correction scheme is one premised on a linear combination of each data entry in a stripe across dies, and the EC information is in another die (e.g., die "n"), the data in "die2" might be fully recovered simply by linearly combining that data which is available for the stripe with its associated EC information. However, depending on the error correction scheme and the error involved, the error might not be recoverable within the SSD. For example, if two different blocks for a data stripe in this example experience error, it might be that the error correction scheme (depending on the scheme employed) is not robust enough to permit full error recovery. [Note that it is possible to employ for example RAID6, which might permit recovery of two failed blocks, and techniques that might permit recovery of more than two blocks within the drive, using conventional techniques.] Also, if a structure becomes unavailable (e.g., an EU or die) which stores both data and the associated EC information, this might also create a situation where errors cannot be fully corrected within a drive (e.g., if the "round-robin" scheme discussed earlier is employed and a die is lost which coincidentally stores both data and the associated EC information, or for other schemes which store data with or near its EC information). To address this situation, the "second" error correction scheme is used in this embodiment to recover from errors which are not recoverable on-drive. To this effect, the EC information which was sent off-drive is recovered via path 257. Several examples of how this can be done will be presented below.

In a first example, the "second" error correction scheme is different than the first error correction scheme (used intra-drive) and permits recovery if a second block of data is lost. For example, using a convention that will be repeated below, in a manner akin to RAID6, the first error correction scheme generates EC information "P" (which is stored on-drive in this example) while the second error correction scheme generates EC information "Q" (which is stored off-drive in this example). The memory system thus has L segments of information which are used to recover M segments of the underlying data stripe, where L–M=2 in this example; thus, in this example, because interrelated error correction algorithms are used (e.g., dependent on each other), loss of any two blocks or segments still permits complete recovery of underlying data. Note that schemes where L–M is greater than 2 are also contemplated by this disclosure. Generally speaking, because random failures in practice tend to occur at different times, for many memory implementations, a scheme where L–M=2 is more than adequate in terms of providing on-system failure recovery.

In a second example, the "second" error correction scheme is used to protect the first error correction information (i.e., the EC information generated using the "first" error correction algorithm). For example, if EC information obtained on the basis of a "data stripe" is written on a round-robin basis into memory 207, and a structure is lost which contains both data and EC information, the second error correction scheme may be used to recover the lost EC information (and thus, the lost data as well). For example, given the assumption of a round-robin placement of the first EC information, it is statistically unlikely that a random-structural failure will impact both data and its associated "on-drive" EC information. For such an embodiment, the EC information (as contrasted with the underlying data) is combined across-drives (i.e., by the host, or by another drive or drives) using the scheme described earlier, i.e., by linearly combining a "stripe" of EC information across drives; for example, returning briefly to the example presented by FIG. 2B, if EC information is based from drive-to-drive and "XORed" with counterpart EC information, it then becomes possible to recover the EC information for any given drive by recalculating (or reading if still stored on drive) the EC information for each available drive and computing the missing EC information from "superparity" stored by the host or the final drive. Considering an example where the SSD of FIG. 2D has four dies 207 and on-drive EC information is stored on a round-robin basis (e.g., in a common EU with the underlying data), only one out of every four random structural failures will produce a data error not fully recoverable using the on-drive error correction information; added security in this example is provided by a capability to recover from this unlikely error using a relatively greater number of processor cycles to re-calculate lost EC information, i.e., by (a) retrieving "superparity," e.g., from the host or "SSD-m" using the example of FIG. 2B, (b) reading (or re-computing) the second EC information for each available drive (e.g., EC information from each of SSD-j, SSD-k and SSD-l if it be assumed that drive 203 from FIG. 2D hypothetically corresponds to SSD-i (224) in FIG. 2B), (c) linearly combining (e.g., XORing) these available pieces of information to recover the lost EC information for drive 203, and (d) using that underlying data which is available (i.e., for dies 1 . . . n, not including "die2" together with the now-reconstituted lost EC information for drive 203) to fully recover the lost data (i.e., which in this example was stored in "die2" of drive 203).

It is once again noted that these various error correction schemes are offered as examples only, and that many underlying error protection schemes and combinations of such schemes can be employed by those having ordinary skill in the art. As will be appreciated by those having ordinary skill in the art, by storing EC information for ANVM off-drive, in the manner described, one may provide for enhanced security and reliability for ANVM. Furthermore, such techniques can be facilitated and/or enhanced using one or more of (a) zone/VBD specific customization, (b) indexing of EC information using virtual, logical and/or physical addressing, (c) virtualized addressing techniques, and (d) a cooperative and/or expositive memory controller, each as described herein and in the incorporated by referenced documents.

Figure 3A:
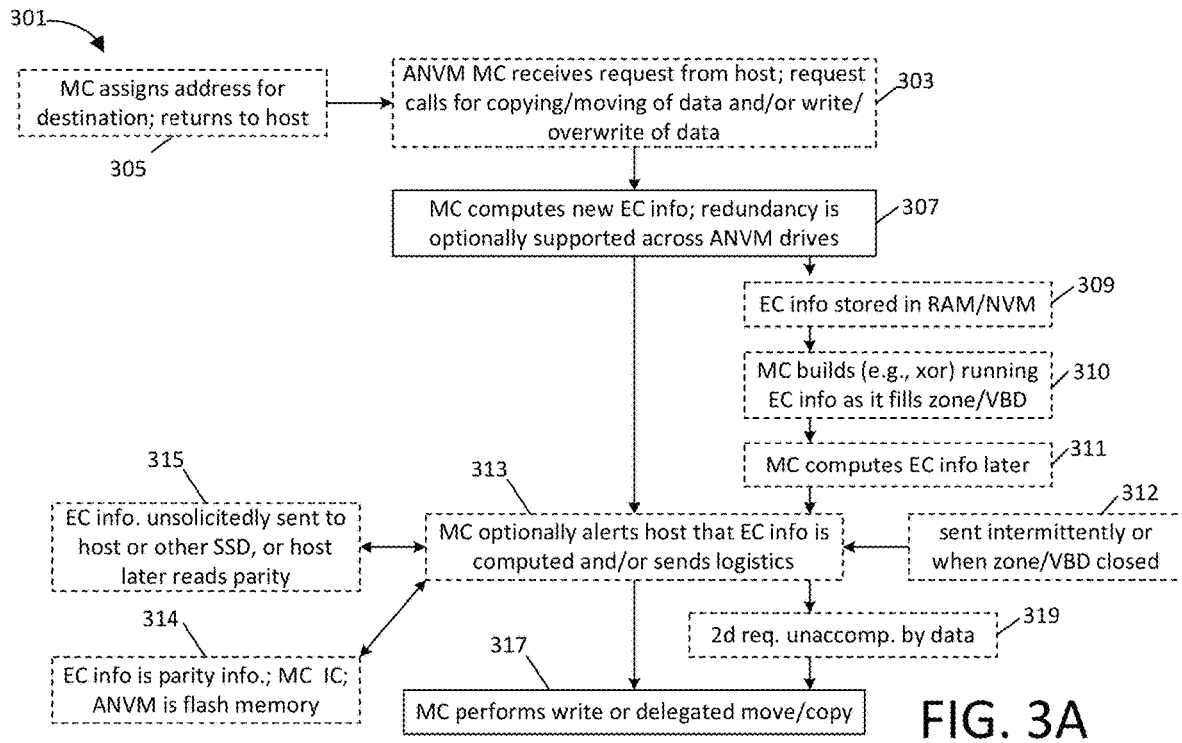
FIG. 3A is a block diagram showing functions associated with providing redundancy for an exemplary SSD rooted in ANVM.

III. Specific Variations; Use of a Cooperative and/or Pseudo-Expositive Memory Controller, and Related Exchange Protocols FIG. 3A is a block diagram showing some techniques 301 that can be practiced by a memory controller for ANVM in accordance with one embodiment. As indicated by numeral 303, the memory controller in this embodiment can once again move or write data, optionally in response to a request from a host. If pursuant to a host-issued request, that request can be a request that causes the memory controller to copy or move data from one location to another (e.g., with locations optionally being specified by the host, as detailed in the incorporated by reference documents) or that causes the memory controller to write data (or overwrite data) at a particular location. Note that although the term "overwrite" is used, this refers to an optional feature where a host uses a host-supplied address (typically a logical address, included with the request) where the host wishes to modify data at that address. However, as noted earlier, in typical operation, a memory controller for ANVM typically does not replace data at a physical location but instead reads existing data from a first physical location, replaces/modifies that data, and then rewrites the data (as modified) to a new, different physical location (i.e., because of the program-erase asymmetry referenced earlier, in many memory systems, particularly with conventional flash memory addressing schemes, the host-supplied address is not changed, but the memory controller typically cannot rewrite a particular storage location without first erasing a larger block, and so, it typically finds a new physical location, supplanting a first logical-to-physical mapping for the host-supplied address with a second); this specific operation is not required for all embodiments, e.g., per numeral 305, for some contemplated embodiments, a memory controller assigns an address, reports that address back to the host, and the host then uses the assigned address directly for future reads. Such an assigned address can be a physical address but it can also be an "idealized address" that denotes a virtual location (i.e., that is then mapped by the memory controller to a physical storage resource). For example, as is variously explained in incorporated by reference U.S. Pat. Nos. 9,400,749 and 9,542,118, an address can designate or have one or more subfields that designate virtual structures (e.g., |virtual block device|virtual channel|virtual die|virtual array|virtual block or EU|virtual plane|virtual page|, or any combination or permutation of these), with the memory controller then mapping each virtual element to one or more physical structures. Any addressing scheme including without limitation the ones discussed above are possible and/or contemplated; in one specific embodiment, a host issues a write request with accompanying data and specifies a virtual block device ("VBD") such as "VBD-A," with the memory controller then assigning a specific address value (e.g., "VBD-A/virtual-die-B/virtual-plane-C/virtual-EU-D/virtual-page-E," etc., with each of these subfields represented by specific portions of the assigned address value (it is also possible for the host to specify any general resource, such as a die or other hierarchical structure (virtual or physical) with the memory controller then directly assigning a specific address for subfields corresponding to one or more other levels of the hierarchy). As explained in the incorporated by reference document, U.S. Pat. No. 9,542,118, a modulo division system can optionally also be used, such that these address fields are not required to fall on (be demarked by) respective, mutually-exclusive bit fields, such that a non-power of two number of structures for different tiers in the memory's structural hierarchy can be used without gaps in assigned virtual address space. Note that this example is not limiting; e.g., the host can use physical addressing in some embodiments, or some respective bit fields can denote physical addressing (i.e., addressing a specific die) while others denote logical or virtual addressing (with address translation applied respectively at one or more structural levels, optionally on an independent or dependent basis for each structure addressed at another tier in the hierarchy), or addressing on another basis (such as gap-based addressing) can instead be used. Designs are also possible where the memory controller reads an entire erase block's worth of data, modifies some amount of that data, erases the erase block and then rewrites the same original erase block which sourced the data (i.e., such that a specific physical address is read, erased, and then rewritten with the same logical data), though this would be unusual for ANVM.

The memory controller, optionally a memory controller integrated circuit (IC) to control flash memory, automatically computes EC Information in connection with the data being moved or written per numeral 307, as was referenced earlier. Note that in some detailed embodiments, the memory controller is programmable, e.g., it has a mode register, and EC computation and/or associated options (e.g., EC information type or format) is specified by a writable value, or can be turned on/off according to programmed register value, optionally for an entire drive or on the basis of specific zones or VBDs. Per numeral 313, in the depicted embodiment, the memory controller at some point optionally alerts the host; such an alert, per numeral 315, either unsolicitedly conveys the EC information or a derivative directly to the host, or it conveys some type of information which enables the host to later read the EC information at a time of the host's choosing or to trigger a peer-to-peer transfer operation for EC values. For example, the alert can convey an address (either corresponding to the memory controller's internal RAM or in ANVM) which the host can then use to directly read the EC values; in some embodiments, as noted elsewhere herein below, the host can also direct the memory controller to directly transmit the EC values to another location, for example, directly to another storage drive, by an explicit command which specifies both source EC values to be transmitted as well as a destination address (e.g., a specific drive, or a specific logical, virtual or physical address in a specific drive).

Numerals 309-314 indicate several further optional operations/features. Per numeral 309, in one embodiment, EC information as it is computed by the memory controller can be stored in memory accessible to the memory controller (that is within the drive, such as in RAM internal to the memory controller IC, or in NVM/ANVM within the drive); in one contemplated embodiment, this EC information is stored in the ANVM memory managed by the memory controller just as if it were data written by the host (or alternatively, in a protected area reserved for EC information), with the host optionally reading that information using a standard read request. Per numeral 310, in one embodiment, the memory controller builds running EC information, for example, conducting incremental operations that linearly modify existing EC information as the memory controller fills a structural unit (virtual or physical); as noted earlier, in one embodiment, simple parity is used as a linear EC process, e.g., the bit values of data at multiple storage locations are simply XORed together or the bit values of data are XORed with existing EC information. Still further, per numeral 311, it is also possible for the memory controller to defer computation of EC information to a later time, e.g., performing the calculation in a manner covering multiple writes, such as only once a zone is filled, or responsive to an express host request to perform this computation. As indicated by numerals 312 and 313, the EC information can be sent to the host (or another drive) intermittently (e.g., at each write, at each time when a block is filled, each time a zone is filled, after a data burst, or at some other milestone), and the memory controller can either directly transmit the EC values to the host or provide the host with some type of message that permits the host to read or otherwise direct the transfer of that information at a time of the host's choosing (e.g., in a manner interleaved by the host amidst upcoming read and write requests, so as to not collide with other queued host requests that are to be issued to the same drive or a different drive). Per numeral 314, in contemplated versions of this embodiment, the ANVM can be flash memory, such that the memory controller is a memory controller tasked with controlling flash memory, and the EC Information can take the form of parity information; optionally also, the memory controller can be in the form of an integrated circuit ("IC") (as alluded to earlier).

The memory controller then performs the operation in question. As indicated by numeral 317, in one embodiment, a move or copy operation can be effectuated as a delegated move/copy operation, i.e., responsive to an express host request, data is retrieved by the memory controller from a first location (e.g., a first physical location) and is rewritten to a second location (e.g., a second physical location) without sending the data to the host. This differs from most conventional host-involved operations where a host typically reads data via a first request (e.g., via a read request to a first memory controller for a first drive) and then writes data via an independent, second write request issued to a memory controller (e.g., for a second drive). Note that there are several prominent examples of move/copy operations, including without limitation the following: (1) a garbage collection operation, that is, where a memory controller wishes to reset (erase) an erase unit of ANVM so that that erase unit can again receive programming, and where, to preserve data, data which is still valid (i.e., still in active use in servicing reads) must be moved out of that erase unit to a new physical location; (2) a cold data relocation operation, that is, where some erase units are experiencing disproportionate wear, because other erase units have data that is never or rarely modified (i.e., these latter erase units have tended to not be garbage collected because a large percentage of their pages remain in active use)—by detecting cold data and forcing a move of that data, the memory controller can ensure more even wear for the memory it manages and can avoid concentration wear leveling in a subset of memory space; (3) an operation where data is modified and/or partly overwritten (e.g., a memory controller is instructed to overwrite a logical address, or performs some type of atomic operation on existing data or performs an operation where only a small portion of data is being replaced), and where the memory controller must then find a new physical location); and (4) an operation where for a given structure (e.g., die, zone, VBD, etc.), the memory controller is swapping in a reserved structure to take the place for actively used space; other examples are also possible. As discussed in the incorporated by reference documents and elsewhere herein, it is expressly contemplated that these activities can be fractionally managed by the host, depending on embodiment, with the host initiating address-delimited (or otherwise specified) operations, page-by-page, or block-by-block, by express request; such an operation permits the host to break up maintenance and/or schedule bits of maintenance at a time of the host's choosing, thereby avoiding conventional issues where a host seeking to read or write data finds a memory controller "offline" (i.e., conducting drive-wide maintenance manifested as an extended sequence of garbage collection operations). While these operations in many embodiments are effectuated responsive to a single, explicit host request, in other embodiments, these operations can be performed sua sponte and transparently by the memory controller (e.g., the memory controller acts transparently to the host, for example, to detect and relocate cold data). In other embodiments, per numeral 319, a second request is received from the host (e.g., the memory controller performs some type of processing pursuant to a first request, stores a result in internal RAM, and is triggered by a second host request to write or commit the processing result to memory, to send information to the host or to send information to another drive).

Figure 3B:
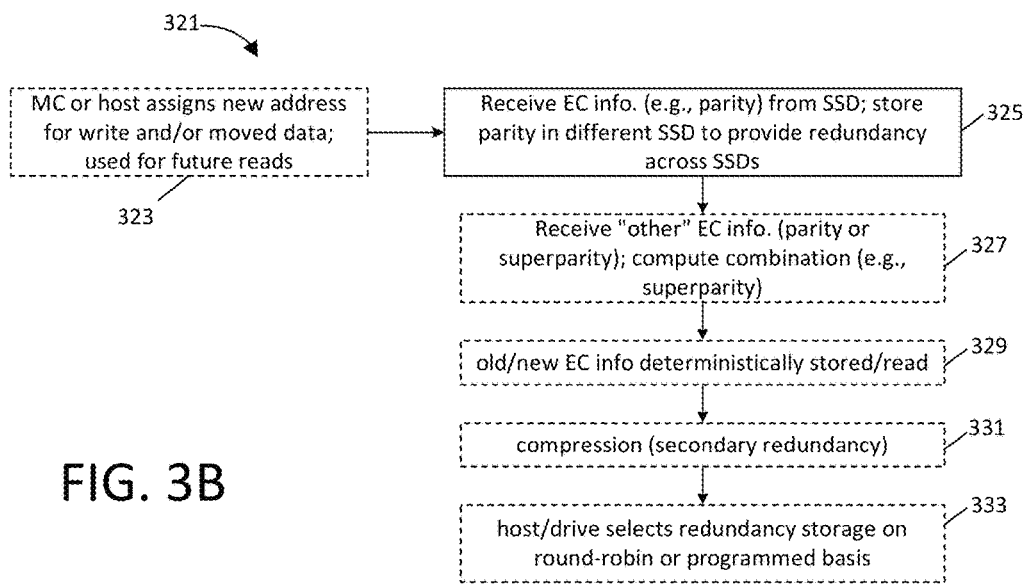
FIG. 3B is a block diagram showing functions performed by a recipient of EC information, e.g., a host, or an exemplary second SSD, in supporting the provision of redundancy for a first SSD (e.g., such as an SSD implementing the functions from FIG. 3A).

FIG. 3B shows related techniques 321 that might be applied in one embodiment by a host, storage server or system, e.g., in interacting with a SSD and/or memory controller for ANVM. As indicated by numeral 323, either the memory controller or the host supplies an address, for example, a source and/or destination address for data moved by a memory controller, or an address at which new or modified data is to be written. This address can be host-supplied, for example, with a host-issued write request or a copy/move request from/to a particular source/destination, but it is also possible as described earlier to have the memory controller assign an address and report it back to the host (e.g., the host can optionally specify a destination zone with the memory controller assigning a specific virtual or physical address within that zone). As but one nonlimiting example of this, a host might issue a write request (optionally specifying a general structural destination) and the memory controller might assign a specific logical, virtual or physical address from among available locations, with that specific address being reported to the host and the host then subsequently using the address sent back to it for purposes of directing future read commands. Per the discussion earlier, a host might add the reported address to its virtual address translation tables so as to direct read requests to the pertinent data at the pertinent drive, zone, VBD, etc. Per numeral 325, the host at some point in this embodiment receives (unsolicitedly or by read) EC information from the memory controller for a pertinent SSD; in this example, as indicated by the FIG., the EC information is parity information, but this is not required for all implementations (and as noted earlier, the EC information can instead include a link that "points" to a location where the reporting drive has stored EC codes). As further indicated by numeral 327, in the depicted embodiment, the host is to provide for redundancy across drives, and to this effect, in connection with receipt of EC information from one drive, the host can select a different drive in which the received EC information or some by-product thereof will be stored. For example, briefly turning to FIG. 7, numeral 701 designates some exemplary (non-limiting) information return formats for information sent to the host by the memory controller, and as indicated by a first example, an information return can include EC information and a drive identifier, which the host can use to ensure that redundancy information is stored in a different drive (i.e., other than the one that sourced the EC information); again, this specific operation is not required for all embodiments.

In one embodiment, the host uses received EC information sets for multiple drives to calculate master error recovery information (i.e., "superparity" as defined earlier). For example, as indicated by numeral 327 in FIG. 3B, the host in one implementation receives EC information from a given ANVM drive; this EC information might be the result of a new data write or a move of data as referenced earlier. In one exemplary operation, rather than recollecting EC information from other drives and newly computing superparity, if a linear error computation mechanism is used, the host can simply retrieve preexisting superparity for a "stripe" of data in question and it then XORs the new EC information with the preexisting superparity. Alternatively, per numeral 333, the host can read EC information for matched virtual, logical or physical storage locations in other drives (i.e., depending on the addressing scheme used to index the EC information), and it freshly computes new superparity by linearly combining these various pieces of EC information. In such embodiments, the host/system can be configured to deterministically store EC information/superparity, per numerals 327/329. As per the examples given earlier, if it is first assumed that there are four drives and that EC information is being computed on the basis of a data stripe (e.g., for a given "corresponding" or matched structures in a given drive), the host can be configured to receive new EC information from a first one of the four drives and it might then read existing EC information for matching structural elements or addresses in each of the other three drives and linearly combine (e.g., XOR) these four pieces of information together, to compute superparity which is then stored in another (i.e. fifth) drive. In this example, loss of any one of the five drives does still provide a situation where the host can recover EC information for each of the four drives. Thus, if a two block error occurs in a given drive, though statistically unlikely, and the errors impact a data block (i.e., associated with a data stripe) and corresponding EC information, the system is able to re-calculate the lost EC information from the master parity. Note that as indicated by numeral 333, in several embodiments, the memory controller for a given SSD optionally computes EC information within a drive and stores this EC information on a round-robin basis and then also optionally protects that EC information across drives using a superparity process; the memory controller can optionally also be configured to compress second EC information, as indicated by block 331 (e.g., to compress multiple pieces of information QA-QD and recover a second data segment, as referenced earlier).

Figure 3C:
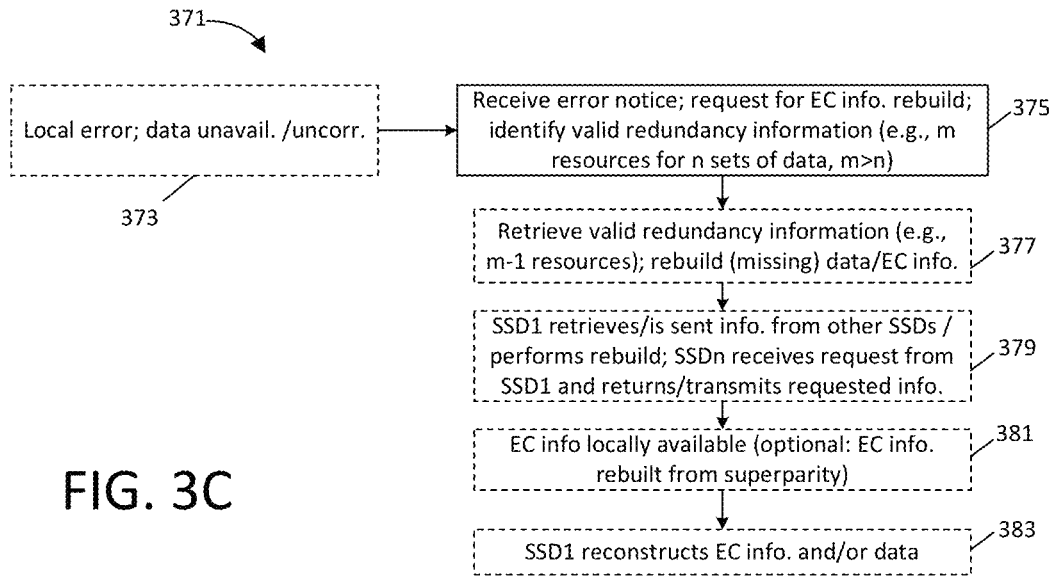
FIG. 3C is a block diagram that shows some functions associated with rebuild of lost data, e.g., for a subset of resources in a given SSD.

FIG. 3C shows a block diagram 371 associated with error recovery and rebuild. As represented by a dashed-line block 373, it is assumed that there is some type of local error (within a drive) that is uncorrectable using any existing error recovery information within the drive. In one hypothetical, the error in question can be a data error, while in another hypothetical, both data and associated error recovery information can be impacted. Per numeral 375, the drive experiencing the error ("SSD1") sends an error message to the host (or a drive which stores cross-drive redundancy information); as a response, firmware operating on the receiving processor begins a process of rebuilding the data and/or missing error recovery information. As first steps, the receiving processor (i.e., of the host or drive storing redundancy information) (a) identifies valid redundancy resources, for example, by identifying an index such as a virtual, logical and/or physical address used to access recovery information, and by identifying each other drive (other than the drive which experienced the error) which has information pertinent to the rebuild, and (b) then retrieves those redundancy resources, for example, by reading the pertinent data from memory using the pertinent index, issuing a related request to the indicated drives for pertinent information returns, and so forth, per numerals 377 and 379. As was described earlier in connection with FIG. 2B, in one embodiment, data is striped across multiple drives, and cross-drive redundancy information simply represents a linear combination (e.g., XOR) of the data from each drive; In such an embodiment, the processor for the host or drive which stores redundancy information simply combines these pieces of information by XORing them together, i.e., to exactly recover the missing data. As indicated by the FIG., the missing data is then simply sent to the drive which experienced the error (e.g., to be reconstituted and rewritten into memory). This information can also be sent directly to the host, depending on embodiment. As indicated by function blocks 381 and 383, for embodiments where EC information for multiple drives is protected by "superparity," the processor for the host or drive which stores redundancy information retrieves "superparity" and requests EC information for each drive (other than the one that experienced the error) and similarly linearly combines these pieces of data together to recover the missing EC information, which is then sent to the error-encumbered drive. With the rebuilt EC information now available, and presumably any other needed data resources also available (e.g., from a data stripe subsisting across multiple physical structures), the affected drive then simply reconstructs the missing data. Note that for each described embodiment (a) all processing can instead be performed by the host (e.g., with the host internally re-engineering EC information and/or data), (b) any information returns can be sent to the host or to a pertinent one of the drives, depending on configuration, and (c) the erroneous data, after being reconstituted, can optionally be rewritten back into memory, for example, at a new free physical location, with the memory controller and/or host optionally assigning/specifying a new address for the reconstituted data.

Figure 4A:
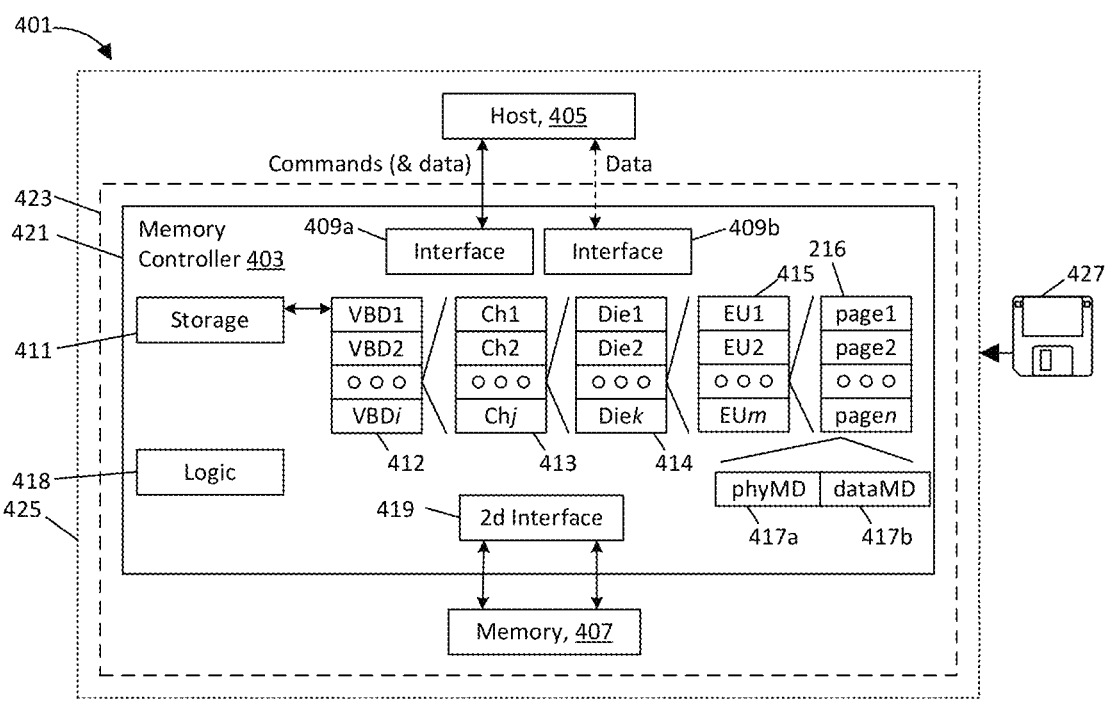
FIG. 4A is an illustrative diagram of a system having a memory controller integrated circuit (IC) 403, a host 405 and a memory 407.
Figure 4B:
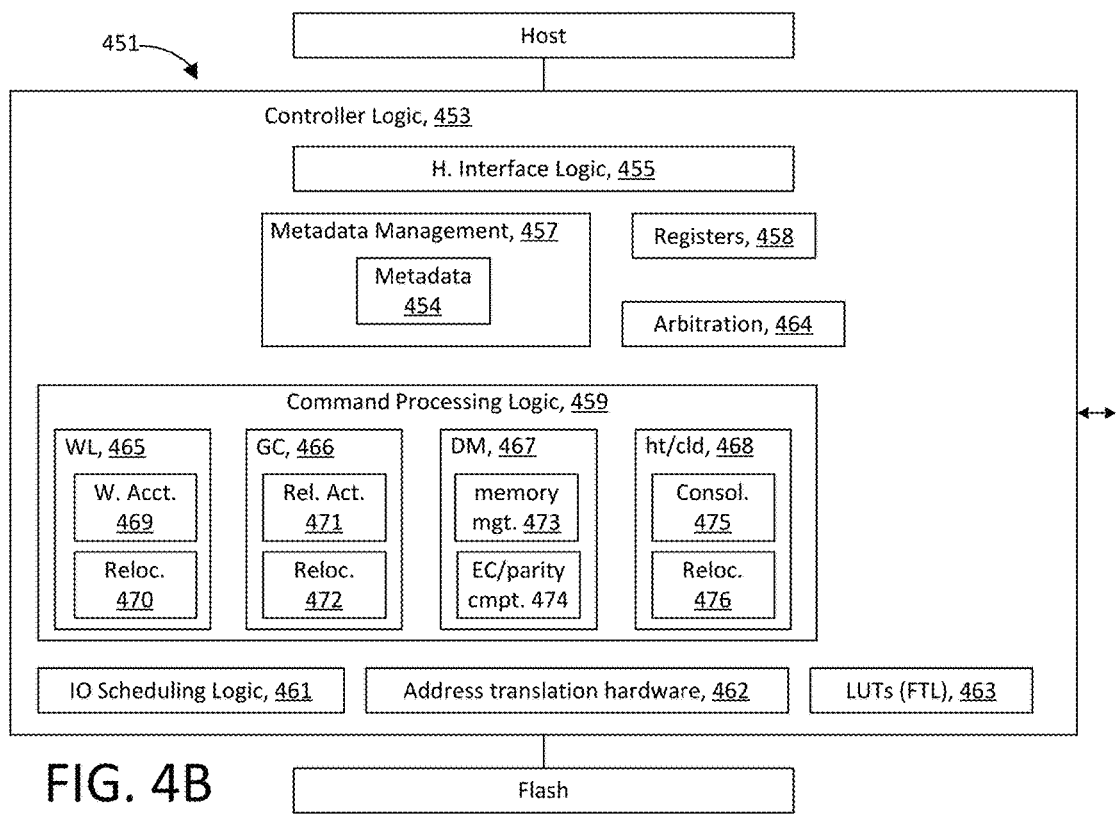
FIG. 4B is a block diagram of memory controller logic used in supporting cooperative functions. Such logic for example can transmit various information to a host and/or other drives such as by way of nonlimiting example, metadata, EC information, and various signals relating to providing redundancy and error recovery, as more fully outlined below.

FIGS. 4A-4B will now be used to provide some additional detail as to the construction and operation of one memory controller suitable for use in controlling ANVM, based on a memory controller that uses metadata to monitor structure-by-structure status, and that cooperates with a host to notify a host when maintenance is needed (and thus permits the host to then fractionally command maintenance by explicit request that is scheduled/queued for issuance at a time deemed suitable by the host). As noted earlier, such a memory controller is generally described in additional detail by the incorporated by reference documents, especially U.S. Pat. No. 9,400,749. Such a memory controller includes logic for unsolicitedly transmitting various information (including EC information) to a host and for responding to host queries with various information returns. While advantageous to many of the embodiments described herein, use of a "cooperative" memory controller design that provides these functions is generally not required for all embodiments.

FIG. 4A illustrates an embodiment of a storage system 401 and associated memory controller 403, host 405 and memory 407. In the illustrated embodiment, the memory controller is structured to cooperate with the host 405 in the control of the memory 407. The memory controller 403 has at least one first interface 409$a/b$ to exchange requests and data with the host. Although two such interfaces and corresponding transmission paths are seen in FIG. 4A, these interfaces may be combined (e.g., with communications occurring via a packet-based transmission scheme). The requests generally relate to operations in memory such as read and write operations, although requests can also be directed to the memory controller 403 to assist in memory maintenance functions. In one embodiment, the requests and signaling protocol are compatible with one or more standards, for example, with Non-Volatile Memory Express (NVMe) or the Small Computer System Interface (SCSI) (in the case of commands) and Peripheral Component Interconnect Express (PCIe) or Serial-Attached SCSI/Serial ATA (SAS/SATA) (in the case of signaling formats). The memory 407 generally has one or more arrays of memory cells and array control circuitry that may support one or more planes, banks, dies, channels or other physical and/or logical structural elements depending on design. Each array in turn has one or more subdivisions of memory cells for which subdivision-specific state and/or other information will be tracked by the memory controller 403. The memory controller in such an embodiment tracks state information for each (physical and/or virtual) unit or subdivision of memory in a hierarchy managed by the memory controller, optionally at each level, as well as metadata for data (e.g., hot/cold status, age, read frequency, back references and many other types of information, as discussed more fully in the incorporated by reference documents). Note that this information can advantageously be applied in defining VBDs (for example, as discussed by incorporated by reference U.S. Pat. No. 9,542,118); for example, hot/cold status can be used by the host and/or memory controller for an affected drive to steer data written to the drive to one zone/VBD or another within the drive; "data stripes" and associated EC information can also thereby be segregated on the basis of metadata (e.g., hot/cold status). The inverse of this principle is also true, e.g., it may be desired in some applications to ensure like-diversity of hot-cold status in any given zone/VBD or data stripe, so as to equalize error likelihood, balance bandwidth, or for other reasons. In embodiments where the memory is flash memory and the memory controller a flash memory controller, each VBD can be defined on a customized basis to include (and be demarked by) one or more physical and/or virtual channels, dies, banks, arrays, planes, erase blocks or units (EUs) or write units (i.e., physical pages of memory cells).

The memory controller tracks subdivision-specific metadata using internal storage 411. In one embodiment, this storage can be volatile memory such as synchronous random access memory (SRAM) or other internal RAM; in another embodiment, this storage can be non-volatile memory, for example an internal flash array. This same RAM can be used for the memory controllers various data processing operations including temporary storage of either write or move data or EC information codes/parity information. As denoted by reference numeral 413, the internal storage retains information for each subdivision of the memory governed by the memory controller, in this case, for one or more logical, virtual or physical subdivisions of the memory 407. In embodiments where the memory 407 is a NAND flash memory, the storage retains information for each VBD, channel, die, EU, and physical page of the flash memory (e.g., VBDs 1-i, channels 1-j per VBD, dies 1-k per channel, EUs 1-m per die, and pages 1-n per EU, as variously indicated by reference numerals 412-416) for all flash memory managed by that memory controller; these numbers i, j, k, m, n do not have to be homogeneous throughout the flash memory, e.g., one VBD can span 4 channels while another can span 1, and similarly, the number of dies per channel, EUs per die and pages per EU can vary throughout the memory. For example, depending on manufacturer and design, there can be 128-256 pages per EU, with each EU corresponding to a substrate well, and each page corresponding to an independently controlled wordline for memory cells tied to that substrate well. The data tracked for each subdivision can be of two types, as denoted by numerals 417a and 417b, including information regarding the physical state of the (virtual or physical) hierarchical elements of the memory, for example, wear of a memory location, whether constituent elements are erased (rendered writeable) or have been released, the need for various types of maintenance (417a) and information regarding the data stored in that location, for example, logical address, back references, data age, hot/cold status, EC information/parity (417b); when data is moved between locations, the data metadata (417b) associated with the data can optionally be moved to or otherwise associated with a new table location to correspond to the new destination, whereas the state metadata (417a) describing state of the memory location itself stays associated with the old memory location, as it describes state of that particular location. Note that in other embodiments, the various metadata (417a/417b) does not move, but is rather stored in two tables with the logical to physical (L2P) mapping of one of those tables being changed. The memory controller also has logic 418 that performs various functions, e.g., it is operable to send to a host either some or all of the "raw" information retained in the storage 411, or derived or processed information based on that storage 411. This logic for example can include circuitry within the memory controller adapted to respond to host requests seeking specific metadata; alternatively, this logic can also include circuitry that applies pertinent filters or comparisons and that notifies the host when a tracked metric meets an assigned threshold. This information or an alert representing a particular condition can be transmitted to the host via the at least one first interface 409a/b, via a dedicated connection or via a backplane connection. As will be shown below, the logic 418 can also comprise circuitry and/or instructional logic to assist with offloaded functions from the host, and perform various other functions cooperatively, as will be discussed below. The logic 418 also performs functions such as address translation (e.g., at any one or more structural tiers within the memory) and write and read (i.e., data access) control and/or address assignment and various maintenance operations, and it sends commands to memory via a second interface 419 in order to accomplish these various functions.

Several configurations are also represented by the embodiment of FIG. 4A. First, per numeral 421, the memory controller 403 can once again be designed as a standalone integrated circuit, with the host 405 and the memory implemented as one or more discrete integrated circuits (e.g., the host in the form of a host processor). Second, as represented by dashed-line box 423, the memory controller 403 can instead be co-packaged or otherwise combined with the memory 407 as a storage drive (SSD) or other type of storage subsystem. It is also possible (as represented by dotted-line box 425) to combine the memory controller 403, the host 405 and the memory 407 as a single system, for example, a network-attached storage system or a storage system adapted for connection with another digital system (e.g., via a USB, PCIe, SATA, NVMe, Ethernet or other standard signaling protocol). Finally, as represented by reference numeral 427, cooperative management functions can be embodied as instructions stored on non-transitory machine readable media, for example, for use in controlling a host processor, memory controller or other circuit. That is, software or firmware can be used to control actions of a host, memory controller or other circuits.

It was noted earlier that in some embodiments, rather than immediately sending redundancy information to the host (or other memory), the memory controller can hold the calculated redundancy information for future processing, and/or can calculate the redundancy information on a delayed basis. There are various circumstances under which this can be quite useful, e.g., for some EC information schemes, delayed processing and/or transmission architecture permits the memory controller to save space, command overhead and/or processing cycles by accumulating redundancy information for many writes prior to sending the information to the host or another drive. In addition, in systems in which there are many zones, VBDs, drives or available alternative locations in which to store data, this permits the host to flexibly decide at a later time where redundancy information should be placed; as a non-limiting example, if there are alternate destination choices, one of which has an upcoming write or read operation scheduled by the host, the host can select a different one of the alternate destination choices, so that both operations can be performed concurrently (i.e., without waiting for verified, time-consuming programming of data in a given array, as is conventional for flash memory). To perform this destination selection, as but one example, the host can issue a second request to the memory controller with an identifier for the EC Information operand (e.g., if the memory controller supports multiple such operands in flight) and a destination address to which the memory controller is to directly transmit the EC information in question. This can also be done in the reverse, e.g., in another embodiment, the memory controller transmits the EC values (e.g., via the command links seen in FIG. 4A) to the host, which the host then later uses to "place" the EC values or a derivative thereof at a place of the host's choosing. Various options will also occur to those skilled in the art which are contemplated by these techniques, including but not limited to, (1) waiting until the RAM used for redundancy information is full, and only then writing/transmitting the redundancy information off-drive, (2) using a cache management strategy to transmit only "evicted" (i.e., old) redundancy information off-drive, and/or (3) transmitting the redundancy information to one of several alternative destinations, selected by the host, optionally based on various performance ends. As noted earlier, in many implementations, the host can advantageously interleave its various requests with other data access or maintenance operations so as to not violate any type of memory device performance constraint; for example, the host can schedule and/or send requests such the redundancy information is written to a drive or subset thereof (e.g., VBD) at a time when the host has no upcoming and/or competing requests for that drive and/or subset. Stated in another manner, the host schedules and/or launches requests at a time, given the intended destination, that is suitable for the host, given various activities queued/schedule by the host for the various zones, VBDs drives and other structural elements in the memory.

FIG. 4B shows a block diagram of a flash memory controller 451, for example, used as controller 403 from FIG. 4A; more particularly, FIG. 4B is used to show how logic functions can be implemented using hardware and firmware logic 453. This logic 453 supports a number of optional processing features. In one embodiment, this memory controller uses this logic to perform many traditional flash controller functions (e.g., management of an FTL and associated search trees). This is to say, while one advantage of a cooperative memory controller is the substantial reduction of FTL layer functions, this is not required for all embodiments. In another embodiment, the memory controller 451 implements comprehensive cooperative functions that help reduce the need for complex FTL processes, as referenced above. As noted earlier, the memory controller 451 can use the various identified structural elements to maintain hierarchy-specific information for all units of memory governed by that memory controller.

For the embodiment of FIG. 4B, logic 453 is seen to have a number of basic function blocks, including interface logic 455 to interact with the host using packetized commands and responses, logic 457 used for local metadata management, registers 458 for storing ASL tables and FTL information and other operational parameters (as will be described below), command processing logic 459 used for query processing and other management functions, IO scheduling logic 461 used to manage memory transactions (e.g., program and erase operations) and arbitration logic 464 (e.g., in embodiments where the memory controller is configured for peer-to-peer operation or cache-based techniques access as introduced earlier). As noted earlier, even in an embodiment where it is desired to substantially reduce the FTL layer, a memory controller can still optionally implement some address assignment and/or translation, on the basis of a given structural level and structures being accessed at other structural levels. The metadata management logic 457 maintains locally-stored information in the form of metadata 453, as mentioned, for each unit of memory of the memory device; this information can include things such as previously-computed EC information pertinent to data stored in that unit. In one embodiment, this metadata can also include information on data or memory structure state, and it can include reverse mapping information (e.g., physical-to-logical mapping information) for various purposes. The memory controller as discussed above can use address translation hardware 462, predicated on customizable parameters (e.g., with a modulo operation being applied through multiple levels of the memory's structural hierarchy), and can also build FTL tables as necessary and store these in internal memory, per numeral 463. The FTL tables can be built in a manner dedicated to each resolved unit address for a given level of the structural hierarchy (e.g., each die), and updated for certain maintenance functions, such as data relocation, unit erase, garbage collection, defect management and other functions.

To provide another example of limited address translation, where structures can be remapped at one or more specific tiers or levels of a flash memory hierarchy, the memory controller can be configured to identify a block error and to transparently remap the subject data over to reserved memory space. Because such reassignment might affect only a very small portion of data written to memory, the memory controller can advantageously keep track of this reassignment using either the pertinent FTL table or metadata 463, depending on embodiment. For example, future reads specifying the remapped erase unit, page or other structure are intercepted by the memory controller logic using locally-stored metadata 463 and redirected to the proper physical location in memory for defective blocks. This scheme presents yet another option that permits a memory controller to be freed from having to implement extensive search trees to find physical locations based on supplied logical addresses, i.e., the memory controller need only maintain a per-die FTL (or FTL for some other structural level in the memory's structural hierarchy) and track defective memory reassignments, which ultimately become stale as the memory controller progresses through erase operations, garbage collection and updates of data (the latter being directly written to new pages or erase units). Note that such address translation can be kept very simple if the memory controller simply allocates remapped space to a reserved erase unit or other structure using a like assignment, or conversely, remaps a first physical page in a given erase unit to another physical page in the same erase unit.

The command processing logic 459 receives commands from the host directed to general configuration of memory operations and for queries. Generally speaking, this logic manages and updates the metadata 454 and runs queries on the metadata, returning information to the host as appropriate via the host interface logic 455. The returns to the host can be immediate returns to synchronous commands and immediate or later responses (or alerts) to asynchronous commands. Exemplifying some command options, the command logic can (a) serve information up to the host drawn from metadata 263 for use in wear aware writes, (b) assist with wear leveling (WL), garbage collection (GC), data management (DM), hot/cold management, (c) service queries for EC information and/or EC information computation or transfer, or (d) assist with servicing of other functions in memory.

An exemplary memory controller can assume varying levels of host support in a manner that can be customized to any specific memory system design. That is, memory controller 441 possesses dedicated logic infrastructure to perform WL, GC, DM and hold/cold specific functions (465, 466, 467 and 469, respectively), each of which can be tailored to a specific level of interaction with the host pertinent to the specific implementation. Similarly, the memory controller 451 also possesses logic to perform erasure coding as part of logic 459 (e.g., as part of data management logic 467). Depending on the desired level of interaction, the memory controller 451 helps avoid the need for remote storage and retrieval of large address translation tables and the use of complex search trees, e.g., address translation can be performed using a greatly simplified address translation table or omitted in the memory controller entirely. In addition, the configured level of cooperation can advantageously permit a host to directly assume scheduling of many flash management functions that might interfere with (i.e., compete with) host-directed writes, such as garbage collection, data relocation, wear leveling and so forth. That is to say, an architecture will be described below that permits a memory controller to serve sophisticated information to the host to assist with this scheduling. This, combined with less FTL overhead, provides for faster, more consistent flash response, and facilitates multiple drive storage aggregates based on solid state (flash) drives (SSDs) as well as mixed or heterogeneous systems that combine SSDs with other memory types.

Note that this is an example only, e.g., the architecture described herein can optionally also support a traditional FTL design, or memory controller management of complex functions.

To assist with host scheduling of flash management tasks, the memory controller can have firmware or hardware logic (or both) dedicated to specific types of host commands and host queries. In the embodiment of FIG. 4B, this structure is illustrated as optionally including logic to assist with wear leveling (WL), garbage collection (GC), data management (DM), hot/cold data relocation, and other functions, but other functions or logic can also or instead be used. To support these functions, the memory controller uses command processing logic 459 to manage space allocation and space reclamation, and otherwise to service host calls for the return of management data. For example, this command processing logic can identify for the host available (i.e., available, erased) address space, candidates for erase (released space), candidates for data relocation and garbage collection (e.g., based on low page utilization), assistance with cold data location (e.g., wear leveling), or more general functions.

For both embodiments that use wear-aware writes as well as those that do not, the memory controller can include wear leveling logic 465. That is, to account for a limited number of flash memory P/E cycles (typically on the order of tens to hundreds of thousands of cycles for NAND flash), the logic on board the memory controller can be designed to track wear as part of metadata 454 and to provide this information to the host. If over time, certain units of memory are determined from erase counts to represent disproportionately high or low wear relative to overall memory, wear leveling can then be performed. Note that for embodiments where wear-aware writes are used, wear leveling can be highly localized, i.e., performed as a data relocation option simply to redistribute cold data. The memory controller 451 can generate alerts when predetermined wear thresholds are reached, and can otherwise perform low level queries relating to wear leveling. In support of the techniques presented by this disclosure, the wear accounting logic 469 can keep a changing-list of erase units, ranked in order of coldest data, least wear, greatest wear or in another manner. In one embodiment, this logic can be prompted via an explicit host command to synchronously compile such a list or to asynchronously notify the host of erase unit identity any time a wear metric (e.g., an erase count) exceeds a programmably-defined value. Then, when and as wear leveling is scheduled by the host, the host issues a command to the memory controller to relocate cold data and erase the old space (e.g., using relocation logic 470), thereby redistributing that space into a pool of available space used for active writes (and potentially more frequently-cycled data). Note that in an embodiment where the host directly addresses physical or idealized space and performs wear-aware address assignment, distribution of wear can be inherently minimized as part of the write process. However, disproportionate wear can still occur for data that is held for a long time and which is therefore deemed "cold;" that is, cold data can keep erase units out of circulation while other erase units are more frequently recycled. The memory controller architecture presented in this embodiment supports memory controller cooperation with wear management through the use of "limited" data relocation and wear leveling processes (e.g., "fractional operations" directed only to specific address ranges within flash) as well as (if pertinent to the implementation), the scheduling and management of more extensive wear leveling, e.g., for entire flash devices or across multiple flash devices or drives.

A copy-on-write process can result in retaining old pages in flash memory that are stale. This is because, in the case of NAND flash memory, a given erase unit can have other pages that are still in use, and the old page location typically cannot be reused until the entire associated erase unit is recycled. Over time, substantial portions of flash memory can be locked up simply because a small fraction of space in many respective erase units is still in use. This situation can occur whether the host or the memory controller performs address translation. To address this, the memory controller of FIG. 4B therefore uses garbage collection logic 466 to assist with functions of periodically consolidating data. That is, the garbage collection logic can track information pertinent to whether an erase unit is mostly stale or is still efficiently being used and can process host queries relating to this information. One form of this tracked information is page utilization information, e.g., where the memory controller stores information indicating whether each page in a given erase unit is available (erased but not yet written), has valid data (cannot be written to without an erase), or is released (a page with stale data that cannot be rewritten until it is first erased). Garbage collection involves accounting for released pages, for example, using release accounting logic 471 to track the mentioned page utilization information for each page (or other logical unit) for each erase unit (EU); EUs with relatively few used pages can have those pages consolidated with pages from other erase units having similarly low page utilization, with the then-concentrated valid date being rewritten to a new destination. In an embodiment where the memory controller tracks this information, the memory controller can compute an extent of page utilization (e.g., 10% valid data) and can provide this information to a host with erase unit identity to permit the host to decide which EUs should have data consolidated and moved. The host can then schedule any resultant operation in a manner that does not compete for needed read data elsewhere in the subject memory. Note that "page utilization" as used herein generally refers to the extent to which pages of a given erase unit are valid (in use) or are stale or not in use. For example, if most pages in a given erase unit were stale or unused and only a few pages had valid data, the extent of page utilization in the given erase unit would be low. Conversely, if most pages in an erase unit were in active use, the extent of page utilization for the given erase unit would be high.

Once again, providing this structure in a memory controller is optional. In other embodiments, the host can command data relocation, wear leveling and so forth and can perform accounting necessary to such purposes. In other embodiments, as just referenced, this is done by the memory controller or on a joint basis by the memory controller for a given drive and the host, working together.

In an embodiment where the host cooperates with the garbage collection task, the host can query the memory controller using a command, with processing of the command performed in cooperation with the release accounting logic 471. In more detailed embodiments, the release accounting logic can be designed to perform low level inquiries, for example, to return a list of EUs where page utilization falls below a specific threshold (e.g., 50%). This type of function can also be managed as an asynchronous task, e.g., the host can request that the memory controller alert the host if at any time an erase unit that has been written-to (or that has just had a page released) experiences less than a threshold level of page utilization; in this regard, the release accounting logic 471 tracks explicit page release with each command information update, and can perform any processing necessary to alert the host in response to any asynchronous queries. The release accounting logic 471 also has circuitry and/or firmware that performs other forms of processing, for example, optionally providing a list of "the 10 best" candidates for garbage collection in order of page (under)utilization. In another embodiment, some or all of the data relocation functions can be managed by the memory controller, for example, with relocation logic 472 being delegated specific tasks by the host (such as the identification of erase units to the host for relocation of data, or relocation of data in response to a host-specified target memory address). Once relocation has been performed, with respective metadata updated and associated physical pages are released, the full erase unit is reclaimable. In one embodiment, this is performed by the host, which issues an explicit EraseBlock request for an address-specified erase unit—logic 459 processes this command and, once the command is completed, returns the freed erase unit to a pool of available erase units for future data allocation.

Data management logic 467 can support optional functions such as idealized addressing, address assignment, zone and/or VBD definition and management, and so forth. Module 473 performs functions associated with data integrity and managing structures (virtual, logical or physical) in the memory. Module 474 in this embodiment handles EC information computation, retention and rebuild/recovery of EC information or underlying data, and/or notification or relay of EC information, as appropriate.

Hot/cold data management can be performed by tracking data-specific metadata for the various structural elements of memory, ostensibly to provide a form of wear leveling. In one embodiment, the memory controller optionally uses processes that periodically look for "old" data (that is, logical addresses that have not been written to for a long time, or that alternatively have a low read frequency), and remaps the stored data to a different memory location to effectively help distribute lifetime degrading memory rewrites throughout memory managed by the memory controller (or throughout a particular VBD), using processes similar to those described earlier; for example, the memory controller sends a notification to the host, which the host then uses to schedule a data move request, and then—at the scheduled time—issues that request to the memory controller to move the data from LBA x to LBA y, optionally all without the data ever having been sent to the host. Consolidation logic 475 can identify hot data, cold data, or other information (e.g., EUs having disparate hot/cold data characteristics), with relocation logic 476 being used to respond to host commands and to update stored metadata (in the manner previously described).

As operations are performed in memory, whether as part of a management operation (such as data relocation) or in servicing write or read requests, relayed as one or more associated commands from the memory controller to a selected memory device, IO scheduling logic 461 detects completion of the command. Pertinent information is added by metadata management logic 457 to the stored metadata 454, and the host is then signaled with any completion codes and/or information returns as necessary. For example, if a data relocation operation has been performed, the metadata 454 can be updated with new information for both source and target blocks of memory, and new EC information can be generated, stored and/or sent to the host or another drive, as pertinent to the embodiment.

Reflecting on the structures shown in FIGS. 4A and 4B, or otherwise described above, a host and memory controller for a drive can interact in cooperation with a wide variety of tasks. Many of these tasks, including without operation, a garbage collection operation, a data aware (e.g., cold data) relocation or placement, a host commanded move or copy operation, and an erase operation, just to name a few examples, can trigger EC information computation functions as introduced earlier. Advantageously, use of a cooperative memory controller and host, as just described, and as described by U.S. Pat. No. 9,400,749, can facilitate a wide variety of cross-drive error correction processes and associated management of error correction processes, in a manner where data and error correction information is intelligently indexed, processed and placed, all in a manner that minimizes impact to needed host read/write bandwidth.

Figure 5A:
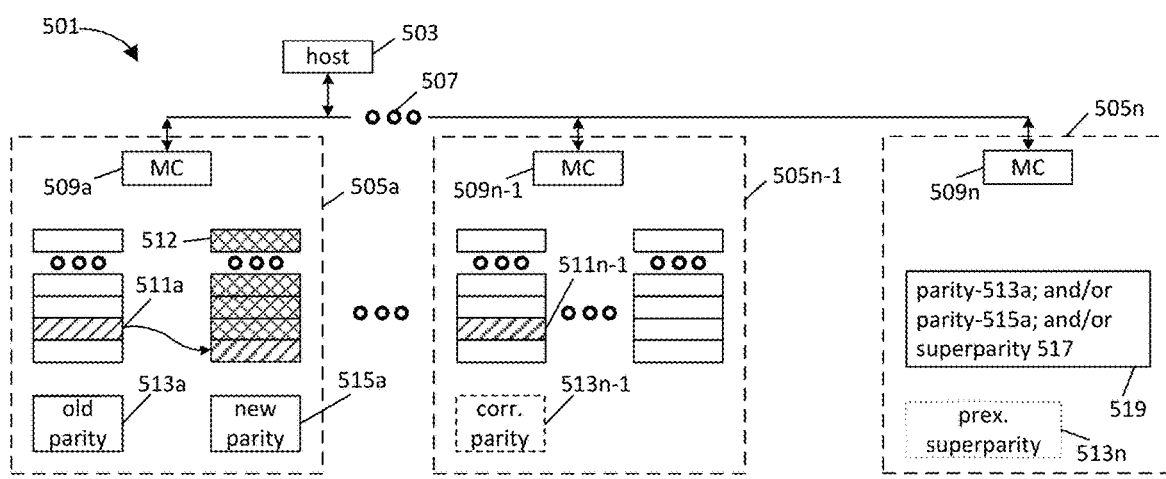
FIG. 5A is an illustrative diagram showing actions of a memory controller for ANVM in moving data 511a to a new physical destination (e.g., in connection with a garbage collection operation).
Figure 5B:
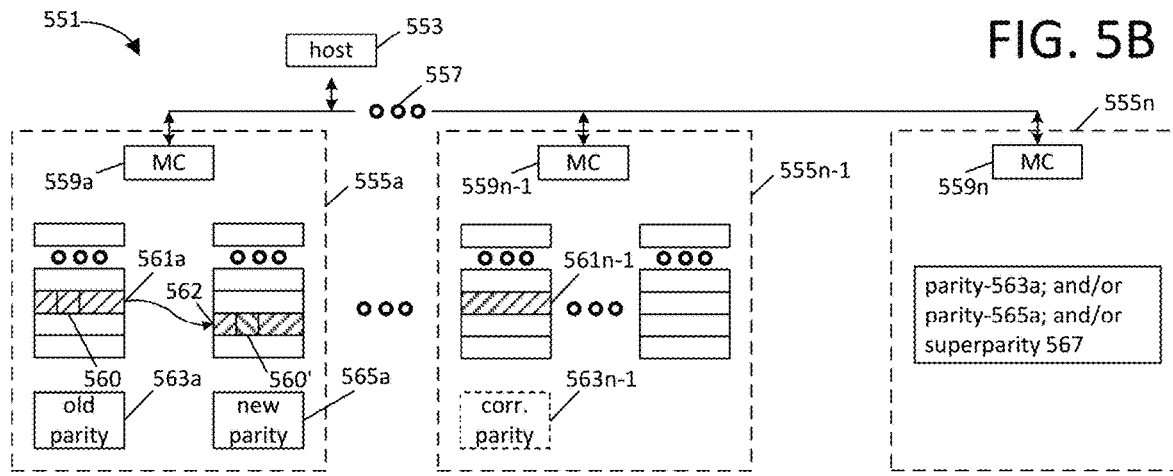
FIG. 5B is an illustrative diagram showing actions of a memory controller in overwriting some data at location 560 in a manner where other related data 561a is moved together with the overwritten data to a new physical destination.

FIGS. 5A and 5B are used to additionally explain some of the data move/copy/write operations a memory controller may be called upon to perform in some of the embodiments discussed herein and associated redundancy operations of a host.

More specifically, FIG. 5A is used to explain data move/copy operations and some exemplary redundancy operations. These operations are generally referenced by numeral 501. A host 503 is seen coupled to one or more storage drives (SSDs) 505a-to-505n+1 by one or more busses 507. The one or more busses can feature multiple busses that are each a point-to-point connection, but it is also possible to have point-to-multipoint connections (e.g., Px2P, Px3P, Px4P, Px5P, etc.) or a bus which is shared on a multidrop basis across all of the SSDs. Any bus communication topology can be used depending on embodiment, such as one compliant with USB (e.g., USB3.0), SATA (e.g., SATA3.0), PCIE, and so forth. Each drive or SSD is seen to have a dedicated set of one or more memory controller integrated circuits (as introduced earlier) 509a . . . 509n+1.

For purposes of FIG. 5A, it is assumed that data at storage location 511a is to be moved to a new storage location 512 in the same drive 505a. Note that the operation in question could also move data to a different storage drive, and that for purposes of this discussion the operation of FIG. 5A also applies equally to such a transfer between drives. It could be that this move is performed in connection with a garbage collection operation in which it is desired to erase one or more erase units, and the move is being performed so as to free an erase unit for purposes of ensuing erase; such a garbage collection operation can be performed/triggered by either the memory controller or host. For example, it could be that the memory controller identifies the need for garbage collection and alerts the host via backchannel request, and the host issues an ensuing address-delimited move request specific to location 511 (i.e., as described further above and as more fully described in commonly-owned U.S. Pat. No. 9,400,749). It could also be that the host has commanded overwrite of data at a given host-supplied address (e.g., logical address) and that this host-supplied address was mapped to location 511a, and whether by host-specification or as a result of memory controller address assignment, overwritten data will now be stored in location 512 with location 511a being later erased.

In one example, data that is to be written into location 512 might be new data supplied by the host as a replacement for data at the host-supplied (e.g., logical) address; in this case, a number of options exist, depending on implementation. In one embodiment, discussed further below, the memory controller performs an XOR operation between new and old data, and it keeps old data in location 511a and writes the new data to location 512. For example, the memory controller can prepare a new physical space corresponding to zone transparently to a host, with the host seeing a seemingly unchanging frontier. When and as the new physical space is filled, the memory controller simply swaps the new space in for the old, and erases the old physical space, permitting recycling of that space in a manner that is transparent from the host's perspective. Such an embodiment is described below in connection with FIG. 6. In this case, the old data remains on hand and can be used to reconstruct new data using computed EC information until the old space is erased. These features are not required for all embodiments.

Regardless of specific implementation, some data is to be placed by the memory controller into new physical location 512 and the memory controller in this embodiment should be understood to compute new EC information such as parity 515a; such an operation depending on implementation might require a memory controller to read location 511a to obtain old data and to retrieve old parity information 513a, as just exemplified, but such is not required for all embodiments or all types of operations. New parity data 515a can be sent to the host or another drive (e.g., either immediately or on a deferred basis as previously discussed). As a further alternative, the memory controller can be configured to compute the new parity 515a in a manner that combines data from new neighboring storage locations, such as those seen as cross-hatched at the right side of drive 505a in FIG. 5A, with an XOR being taken across multiple data values (e.g., within a common EU, or "matched" addresses or structures) and the newly written data. Note again that while parity is used as an example of a linear redundancy scheme in this embodiment, there are many examples of other EC information/algorithms that can be used in other embodiments. In exemplary operation, the memory controller is configured to move data and compute EC Information/parity, as appropriate, without sending move data to the host; it simply reads data from location 511a and rewrites that data to location 512 using respective commands from memory controller to memory and computes new parity information 515a under the auspices of suitable memory controller firmware. The new parity information can optionally be computed in one implementation using an XOR operation between moved data alone and old parity information 513a for a structure in question (e.g., representing parity for the cross-hatched storage locations at the right side of drive 505a and absence of prior data at location 512). Each storage location (such as locations 511a or 512), depending on embodiment, can be a structural unit (logical or physical) such as a page, logical unit number (LUN), zone, die, VBD, erase unit, or some other unit of data or memory cells; for example, storage location 511a depending on implementation might represent a zone. In yet another example, old parity information 513a and new parity information can each represent a "running EC code," e.g., the memory controller is "filling up" a set of storage locations (represented by cross-hatched locations at the right side of drive 505a and location 512) and, each time new data is written to a structure (e.g., as data is being written into location 512), the memory controller updates parity by performing an XOR between new data and old parity information 513a; as previously discussed, the new parity information 515a can be immediately sent to the host (or a host-specified or programmed destination), it can be sent to the host on an intermittent basis, it can read by the host or transferred pursuant to a later-host-issued read/transfer request, or sent to the host only once all of a set of location (e.g., an entire erase unit, zone, die, VBD or other logical or physical structure) is "full." As noted, in contemplated embodiments, it is possible to cause the drive 305 to direction transfer the new parity information 515a to another drive (for example, 505n+1), for example, on a programmed basis or responsive to an explicit, later-issued host request for such transfer, or to be exchanged using remote direct memory access, by network transfer and/or peer-to-peer transfer.

The embodiment of FIG. 5A in one implementation is configured to provide/support redundancy across all of drives 505a . . . 505n+1. In one example, where 505a corresponds to a first of five drives, parity information can be stored in the fifth drive (i.e., SSD 505n+1, where "n"=4). To this end, new parity information 515a in each of the examples set forth above will be transferred in some form to drive 505n+1, such that if any drive becomes corrupted or unavailable, that parity information may still be recovered. In one example, new parity 515a is simply transferred (directly between drives or through the host 505) to drive 505n+1, and the new drive simply stores this information or associated EC information. In other examples, however, the host 503, or the new drive (505n+1) computes "superparity," that is, redundancy data 519. As introduced previously, in one embodiment, new parity information 515a is provided to the host 503 which computes superparity information 517 by performing an XOR operation with parity information from other drives (for example, corresponding parity 513n from drive 505n, or preexisting superparity information 513n+1); the host then writes the new superparity information (represented by numeral 519) to drive 505n+1. It should be observed that such an operation protects multiple different data sets against loss of any one of them; for example, in an implementation where there are five drives or SSDs, such that where the host writes data into four drives and stores associated parity in the fifth drive, lost parity data can be recovered as long as only one drive is unavailable. It is also possible to use other schemes that tolerate loss of more than one drive (or associated structure), e.g., as noted earlier, it is possible to protect data and/or EC information stored in four drives such that loss of any two drives still does not affect data recoverability (in this case, the error correction schemes would involve two different error correction codes, as introduced earlier). In a contemplated variant, instead of having the host compute superparity, one of the drives (e.g., drive/SSD 505n+1) is coded so as to do this—it receives parity information such as new parity 515a and corresponding parity 513n from the various drives (or preexisting superparity already stored by the SSD 505n+1), and is configured to perform an XOR operation in the place of the host. Once again, in contemplated variants of this embodiment, and the other embodiments described herein, a mathematical operator other than an XOR operation is used to linear combine EC information and/or parity values or their derivatives. Many such exemplary variations will occur to those having ordinary skill in the art.

Also, note that in some embodiments, drive 505n+1 can be used to store host-provided write data in addition to EC Information/parity information. For example, to cycle which of drives/SSDs 505a ... 505n+1 is used to store redundancy data on a round robin basis, such that for one "data stripe" or set of associated storage locations, drive 505n+1 is used to store parity/superparity, while for another data stripe or set of associated storage locations write data is stored in drives 505n-505n+1 and EC information/parity information is stored in drive 505a (e.g., in this case, the operation is as described above except that the various drives are also exchanged or rotated on a round-robin basis in terms of their roles from a system perspective).

FIG. 5B is used to discuss a second operation, with features generally represented by numeral 551. It is here assumed that a host 553 wishes to modify data at a specific LUN or LBA, represented by numeral 560 in this FIG. It is here assumed that such modification requires a log structured write operation, i.e., location 560 cannot be simply overwritten, and the memory controller is required to retrieve all data at location 561a by read command to an appropriate memory device in drive 555a, to modify data (560) representing a subset of location 561a, and to write the complete data set as modified to new location 562, e.g., using a write command to a memory device in drive 555a. Once again, this operation is completed in this embodiment without sending the data retrieved from location 561a to the host 553. Here again, the host communicates with multiple drives 555a ... 555n+1 using one or more busses 557, each of which may be a point-to-point or multidrop bus, and each of which has a respective set of one or more memory controllers 559a ... 559n+1.

The EC Information/parity operations in the case of FIG. 5B are analogous to those described above for FIG. 5A. The memory controller(s) 559a, in association with the move/write of data from location 561a, performs an XOR or other mathematical operation to concatenate new data (e.g., at location 562 following modification of data at location 560) with old data from location 561a, to create new EC Information/parity information 565a, which it at some point sends to the host 553, to another destination (such as a network destination or other memory) or to another ANVM drive 555n+1 (as previously discussed). Note many variations will occur to those having ordinary skill in the art, e.g., it is once again possible to use other types of EC schemes besides parity. As yet another alternative, it is possible to store just error correction (i.e., protection) codes (i.e., without separate storage of underlying data), using schemes which permit full recovery of data from the error protection codes, which are reconstituted using redundancy information as necessary; in such an embodiment, for example, the error protection information is effectively combined with the underlying data using some algorithm, to a point where stored codes combine both data and associated error protection. Other schemes are also possible. Regardless, as before, it should be observed that the host 553 and/or drive 555n+1 use new EC information 565a or a derivative thereof to provide redundancy across drives, in the same manner as discussed above. For example, depending on implementation, new parity information 565a can be combined with corresponding parity information 563n, and used to produce superparity information 567.

Figure 5C:
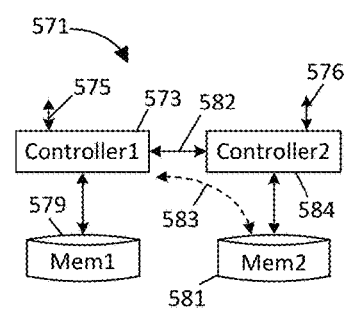
FIG. 5C shows transfer of data and/or EC information (e.g., parity information), directly from a first memory controller 573 for one drive 579 to a second memory controller 584 for another drive.

FIG. 5C is used to further elaborate on peer-to-peer operations as introduced earlier. More specifically, FIG. 5C depicts two SSDs/drives, each having a controller 573/584 and respective memory 579/581 managed by that controller. As indicated further by numeral 582, each of the drives is interconnected by a peer-to-peer bus to permit drives to directly transfer information as might be commanded (575/576) by a host; other embodiments do not feature such a bus but permit drives to send requests to one another via a multidrop communication bus or via a network interface. To this end, during system configuration, the host in this embodiment publishes to all controllers (e.g., controllers 573/584) routing information usable by each controller to directly access each other controller via a peer-to-peer bus, such as illustrated in the FIG. As commanded by the host, or as programmed by the host (e.g., into an ASL register as will be discussed more fully below) each drive can thereafter send data to another drive pursuant to a move or copy, or EC information, without having to pass that data through the host. As a first example, it is assumed that controller1 573 has performed hot/cold data analysis and has determined (according to host-specified parameters/thresholds) that "hot" and "cold" data is inappropriately mixed together in a particular unit in its memory hierarchy, and it signals the host to this effect. The host then determines, based on information sent to it by controller1 (i.e., associated metadata) that the "hot" data should instead be stored in memory2 581, which is part of a different drive and is managed by controller2 584. The host therefore transmits a command to controller1 to transfer the "hot" data directly to controller2, via peer-to-peer bus 582. Accordingly, controller1 573 sends a command and associated data and metadata via peer-to-peer bus 582 to controller2 584; as pertinent to the embodiment, the host can relay via controller1 573 logical, virtual or physical addresses or another form of index for memory2 581 that is to receive the data, which controller2 584 can then parse to a VBD, channel, die, or other structure, optionally using modulo-based addressing, as introduced in the incorporated by reference documents; the data is then written to (i.e., moved to) memory2 581 as indicated by path 583, i.e., without ever being sent to the host. Controller1 573 and controller2 584 then update their stored metadata to reflect the transfer and any associated release of old storage locations. In a second example, this transfer can optionally be of redundancy information, as referenced earlier; the host for example can send a request to controller1 573 that specifies a different drive (i.e., managed by controller2, 584) or can program controller1 573 to automatically transfer EC information to the other drive (i.e., with any appropriate information headers). Accordingly, when and as controller1 573 receives this request, it draws EC Information/parity information out of its internal RAM (or other storage), or computes it, and transmits the data as part of a peer-to-peer exchange via bus 582 to controller2 584 or other structure specified by the host; controller2 then interprets this LBA or structure according to its ASL table (as will be discussed below) and writes the associated data into memory. If desired, the second drive (i.e., via controller2 and connection 576) can transmit a confirmation to the host. Note that optional arbitration logic in each controller (see FIG. 4B, discussed above) provides a mechanism for avoiding competition between the peer-to-peer bus 582 and the connections to the host (575/576); in one embodiment, this mechanism simply determines whether an addressed drive or structure is already busy, and if so, it queues received commands/requests. In other embodiments, however, a busy signal can be sent to the pertinent requester and/or a "reservation" can be sent to the requester, to permit the requester to resubmit the command/request at a later time. Once again, it should be appreciated that using such an architecture, the host can dynamically schedule a write time such that the two drives exchange data in a manner that reduces interference with host access requirements, and conversely, the host can schedule data accesses or maintenance operations for other drives and/or other structural elements (e.g., VBDs) for each memory controller in a manner that does not violate any pertinent timing constraints. Also, note that for this example, that it is possible to configure the system such that redirection of data from controller1 to controller2 can in one embodiment be performed purely on logical or virtual addressing, that is, without address translation. As an example, the host can determine that data originally sent to (and processed by) controller1 would be better stored in another drive; it supplies a set of logical or virtual identifiers to controller1, where the identifiers inform controller1 to send the data to controller2—in such an example, address resolution, translation and/or address assignment might be performed by controller2 (and not by controller), despite the fact that controller1 manages its flash memory space), with controller2 optionally sending a confirmation of its assigned address directly to the host. Note this is not required for all embodiments.

Figure 6:
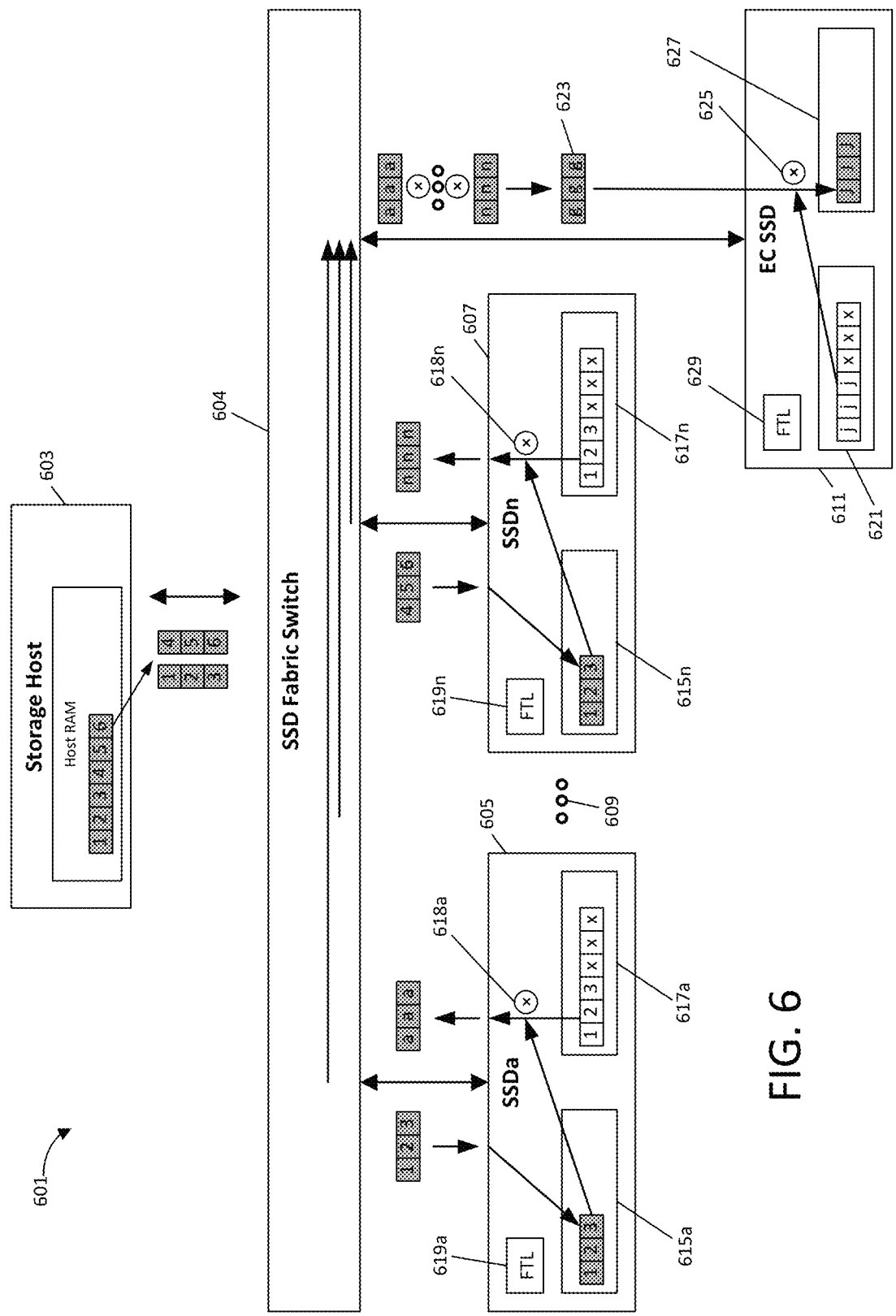
FIG. 6 is an illustrative diagram showing computation of EC information in yet another embodiment, e.g., where drives update information for zones by preparing substitute physical space in a manner that is transparent to a host.

FIG. 6 is used to describe an embodiment 601 using yet another error correction scheme, which was alluded to in the preceding paragraphs. In the depicted example, it is assumed that a storage host 603 wishes to overwrite data at a set of logical addresses 1-6 (as depicted in a block labeled "host RAM" within the storage host). It could be that this data is new write data (e.g., nothing has yet been stored at these logical addresses 1-6) or that the data represents an overwrite of one or more of logical addresses 1-6 with updated data, with some or none of the data potentially remaining unchanged relative to an earlier write. The storage host in this example uses a SSD Fabric Switch 604 to write the data to memory, with logical addresses 1-3 corresponding to a first SSD (SSDa), 605, and logical addresses 4-6 corresponding to a second SSD (SSDn), 607. Note that this striping can be extended to any number of SSDs by extension, as denoted conceptually by ellipses 609; for example, there might be four SSDs (e.g., with SSDn representing the fourth SSD and with 12 storage locations being overwritten, three per SSD). For purposes of simplifying explanation, only two SSDs are depicted in the figure. In this example, each of SSDs a-n features a zone into which the data will be written. The zone in this instance is a logical concept, being mapped for example by drive SSDa to a set of physical structures 617a. It will be recalled again that with NAND flash memory, physical locations cannot be overwritten. In this example therefore, the drive SSDa (and its associated memory controller, not seen in the FIG.) transparently write the new data (corresponding to logical locations 1-3) into a separate physical space 615a, updating a flash translation layer (FTL) 619a such that future reads to logical locations 1-3 are serviced using physical structure 615a (and not the old location 617a); note that the drive in this example also retains the old mapping information, for purposes that will be described below. In time, as a write frontier represented by location 615a is full, the drive SSDa can transparently erase the old storage locations 617a, relying on page release tables to determine when these old locations are empty or should be garbage collected, and with the host at all times "seeing" an unchanging write frontier (i.e., logical zone). In this example, to provide for error protection, the drive SSD1 performs a linear combination (e.g., XOR operation, as depicted by graphic 618a) of the old data (marked without highlighting as locations 1-3 for structures 617a) with the new data (seen in shading and written into structures 615a). The result of this operation is parity information "aaa" which in this example is returned back to the SSD Fabric Switch 604 for direct peer-to-peer provision to a SSD used to store EC information (parity), i.e., SSD 611 (seen at the lower right-hand part of the figure). Per examples given earlier, in alternate embodiments, the EC information can instead be sent to the host (i.e., in lieu of peer-to-peer communication between drives). SSDn (607) performs similar operations in this example, i.e., by writing data for logical addresses 4-6 into structures 615$n$ and by performing an XOR operation 618$n$ between that data and old data from structures 617$n$, once again, using an updated FTL 619$n$, and by sending computed EC information (parity information in this example) "nnn" through the SSD Fabric Switch to SSD 611. In a situation where no data was written previously, the XOR operation might be with all zeros as the preexisting data (or conversely, all "1's"). As represented by numeral 623, either the EC SSD (611) or the host (in alternate examples) combines the various pieces of parity information (e.g., by performing an XOR function) to obtain compressed parity information (superparity) ggg; this information can then be subjected to a further XOR operation (625) with old superparity (i.e., represented by un-highlighted values jjj, from a first physical structure 621) to create new updated superparity "JJJ" which is then stored in a new structure 627. In this case also, the EC SSD 611 has one or more memory controllers (not shown in this FIG.) which use an FTL 629 to remap logical pointers to the compressed EC data to the new destination structure 627 such that no change in logical address for the updated superparity is observed. These operations are performed for each write stripe (e.g., each logical address within matched zones, or each of multiple units within matched zones, or a logical structure extending across SSDs), and error recovery is performed by the host storage which can recompute parity for any given SSD given an associated zone or other unit address (e.g., where an error is observed, in a manner that provides an index to matched parity for other drives and associated superparity).

Reflecting on some of the principles/benefits featured by the embodiment of FIG. 6, a storage host 603 at all times perceives data stored in various SSDs and EC information as being stored in one or more logical "zones." These zones are transparently managed by the memory controller(s) for the pertinent SSD, which computes EC information for each write, and sends that EC information off-drive. In the depicted example, a peer-to-peer scheme is used to automatically, without host involvement, store updated EC information in a drive dedicated to EC operations (e.g., EC SSD 611). In the event of error reported to the storage host, the storage host can directly retrieve EC data (e.g., JJJ) by issuing a standard read command to EC SSD 611, for example, by supplying indices reported by the drive experiencing the error, with FTL 629 used to retrieve the correct compressed EC information from the correct storage location. Similarly, the storage host 603 can also issue a command to every other drive (e.g., drive SSDn, 607) to recompute EC information for that drive; each drive can do this by performing on-demand an exclusive-OR operation between data at old and new storage locations (e.g., using the old pointers as referenced earlier), with the recalculated EC information then being reported to the storage host 603. With this information, the storage host is then able to recompute EC information for the drive experiencing the error, enabling recovery (using drive SSDa as an example) of either data in structures 615a (i.e., from the provided EC information and data still retained in structures 617a) or conversely data in structures 617 (i.e., from the provided EC information and data retained in structures 615a).

Figure 7:
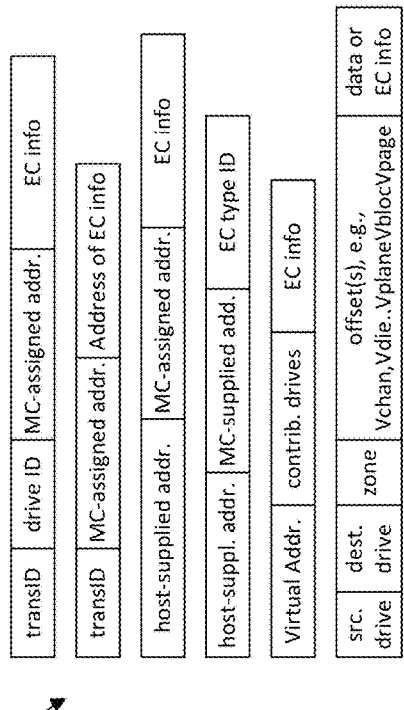
FIG. 7 is an illustrative diagram showing certain information formats which a memory controller can use to send EC-related information to a host or another drive, for example, to directly provide EC values or to provide other information (e.g., a location, address or link that may be used to later read or transfer EC values) to the host or other drive; all combinations of and permutations of the illustrated fields/data structures seen in FIG. 7 are contemplated even if not individually illustrated.

It has been mentioned for some embodiments discussed above that a memory controller for a given drive or SSD can return to the host or another drive or destination different types of information, including without limitation, host query and information returns extensively discussed in U.S. Pat. No. 9,400,749. FIG. 7 is used to show various fields and types of information 701 that can be sent by a memory controller in this manner, for example, via a command link, data link or in another manner. While four specific examples are presented, any combination or permutation of the various depicted fields is contemplated, as is the use of other fields. In this FIG., "transID" refers to a transaction ID that identifies a particular host-issued request and/or memory controller thread, "driveID" refers to a SSD-identifier (e.g., such that a host can readily identify which drive is communicating and can select "another" drive based on this information), "MC-assigned addr." refers to a memory controller assigned address (e.g., a physical or other address as described in U.S. Pat. No. 9,400,749 or an idealized address as described in U.S. Pat. No. 9,542,118), "Virtual Addr." refers to virtual or "idealized" addressing also described by this incorporated by reference document, "EC Information" referring to EC Information of the various types discussed above, "host-supplied address" refers to a logical or other address provided by the host, "Address of EC Info" refers to an address, pointer or other identifier which is provided in lieu of direct provision of EC Information/values, e.g., such that the host can later directly read EC Information/parity information using the provided address, pointer or other identifier at a time of the host's choosing, "EC type ID" refers to a designation of error correction scheme or redundancy type (e.g., "Q," using an example that will be presented below), and "Contritub. drives" refers to an optional designation of each drive that has contributed to an information return (e.g., in the case of cascaded EC information generation). Again, various other alternatives, permutations and combinations will occur to those having ordinary skill in the art, and it should be understood that many other information returns can be used. In one straightforward implementation, the indicated communications are sent in the form of one or more packets, each packet having one or more of the depicted (and/or other) fields.

IV. Specifying Error Correction Schemes for Respective Virtual Block Devices and Zones and Indexing EC Information Having thus introduced these techniques, this disclosure will now proceed to discuss design associated with a pseudo-expositive memory controller, used in connection with some of the embodiments herein, with reference to FIGS. 8A-9. Further detail regarding the design and features of such a memory controller can be obtained from U.S. Pat. No. 9,542,118. Such a memory controller supports mechanisms for virtual addressing, where portions of each host-supplied address are mapped to virtual structures, such as virtual channels, virtual dies, virtual planes, virtual blocks and virtual pages, and where each virtual structure can then be mapped by the memory controller to respective sets of physical resources (e.g., respective die sets), for example, where each value for a virtual channel is mapped to one or more physical channels, where each value for virtual die is mapped to one or more dies, and so forth. In addition, such a memory controller supports mechanisms for defining virtual block devices (VBDs) aligned along die boundaries, so as to provide performance isolation. In extension of the techniques provided herein, such a design also permits customization of error correction schemes or redundancy on an independent basis for each of multiple virtual block devices (VBDs). Each VBD can be established/configured by programming of an ASL (address space layout table) for use by the pertinent memory controller, and by linking/commonly-indexing VBDs in respective SSDs with similar error correction schemes, one can provide robust error correction on a VBD-specific, cross-drive basis.

A memory controller in one embodiment can subdivide an incoming memory address into multiple discrete address fields corresponding to respective hierarchical groups of structural elements within a target nonvolatile semiconductor memory system, in which at least one of the discrete address fields constitutes a virtual address for the corresponding physical element within the structural hierarchy. Through hierarchical subdivision, a virtual address portion of an incoming memory address is ensured to resolve to an element within the physical bounds of a larger (hierarchically-superior) structure, but may be freely mapped to any of the constituent physical elements of that larger structure. Accordingly, a host requestor may issue logical memory addresses with address fields purposefully specified to direct read, write and maintenance operations to physically distinct structures within the memory system in a manner that limits performance-degrading conflicts while the memory controller remains free, by virtue of one or more virtualized address fields within the incoming logical addresses, to virtualize localized groups of physical structures and thus mask defective structural elements and swap operational structural elements into and out of service, for example, as they wear or otherwise require maintenance.

The net storage volume of a given drive can be subdivided into discrete performance-isolated storage regions based on specified system requirements and underlying memory system geometry and performance characteristics, e.g., VBDs, with each such storage region being mapped by an independent linear range of logical addresses. Accordingly, each performance-isolated storage region or "VBD" may be presented to one or more host access requestors as an independent block device (i.e., mass storage unit having mapped logical address space) so that the nonvolatile memory system may be perceived by that host as being constituted by multiple discrete block devices or VBDs, each having its own performance characteristics and address space. In one embodiment, this address space is continuous, with addressing effectuated using active and reserved structures and modulo and/or remainder-based address resolution as more fully described in U.S. Pat. No. 9,542,118; in another embodiment, structures are only applied on a power-of-two basis, such that bit fields of the host-supplied address map cleanly to structural tiers, and in another embodiment, discontinuous addressing is used, such that the host-visible address space presents gaps that are not in fact mapped to ANVM. The mapping of the logical address space within a given VBD, referred to herein as an address space layout, or "ASL," may vary from one VBD to another (e.g., sequential addresses within logical address ranges of respective VBDs may be distributed within the structural hierarchy of the memory system in different orders) to yield configurable and varied VBD characteristics in terms of erasable segment size, endurance and I/O bandwidth, all via ASL table configuration as introduced above and discussed below. Further, multiple different address space layouts may be applied within different "subspaces" of a given VBD (i.e., discrete portions of the VBD's address range) with, for example, addresses in one subspace being sequentially applied to structural elements at different hierarchical levels of the memory system in a different order than in another subspace; for example, most significant bits of a host-supplied address can be applied for one VBD to resolve an addressed channel while the very same most significant bits, or a subset or superset of such bits, can be applied to dies selection for another VBD. Also, in a number of embodiments, system requirements specified (e.g., by a user/system designer) in terms of VBD capacity and performance metrics including, without limitation, read and write bandwidth requirements and minimum data transfer size required by the VBD, can be translated into corresponding configuration and allocation of structural elements as necessary to meet the high-level requirements, with such configuration and allocation optionally being programmed directly into the nonvolatile memory subsystem and/or corresponding VBD definition reported to a host access requestor. By this approach, a system designer can configure and allocate VBDs according to performance requirements of the application at hand without having to resort to the complex and error-prone task of allocating and configuring numerous physical resources within the nonvolatile memory system individually. As noted previously, in one embodiment, the host can dynamically readjust its subdivisions so as to periodically or on demand further optimize memory. For example, a host has the ability not only to select a write location for specific data and/or EC information, but can change its address space configuration as a general matter (i.e., as a result of machine learning and consequent storage system re-optimization).

The nonvolatile memory subsystem is presented as a flash memory device having at least one SSD and in many embodiments, multiple SSDs, each with their own respective memory controller, as indicated earlier; Each SSD can be hierarchically arranged in multiple wired signaling channels each coupled to multiple flash memory dies, with each die including numerous individually erasable blocks (EUs) distributed in one or more access planes, and with each EU including numerous pages constituted by a predetermined number of single-bit or multi-bit nonvolatile storage cells (i.e., channels, dies, erase units and pages constitute, for example and without limitation, respective hierarchical physical elements within the flash memory device). For example, in one embodiment, a memory controller within the flash memory system (e.g., within the drive or SSD) subdivides each incoming host-supplied address into respective channel, die, erase unit and page address fields, any or all of which may be virtual addresses, and resolves a commanded read or write access to a specific channel indicated by the channel address field, a specific die indicated by the die address field, a specific EU unit indicated by the EU field (including possible resolution to two or more virtual and/or physical EUs in the case of multi-plane command sequences) and a specific page indicated by the page address field (including possible resolution to two or more pages in the case of a multi-page operation). Where the memory controller maintains reserve units, for example mapping host-visible address space to reserved structural elements at a given level of the hierarchy, some limited address translation can be performed at the memory controller, e.g., by translating the address of one block in the hierarchy (e.g., EU) while preserving logical location level at other address levels (e.g., preserving page ordering within a remapped EU). Among other advantages, this architecture provides for greatly simplified address translation (e.g., which can optionally be implemented entirely in hardware or mostly in hardware with various alternative, small address translation tables being used for select structural elements in the hierarchy, e.g., for each die, facilitating configurable and predictable I/O latency, by shortening address translation time and eliminating associated complexity. As noted previously, in other embodiments, such reserved structural element units can also/instead be used to supply storage units for redundancy information, such as EC Information, as specified by the ASL information.

Figure 8A:
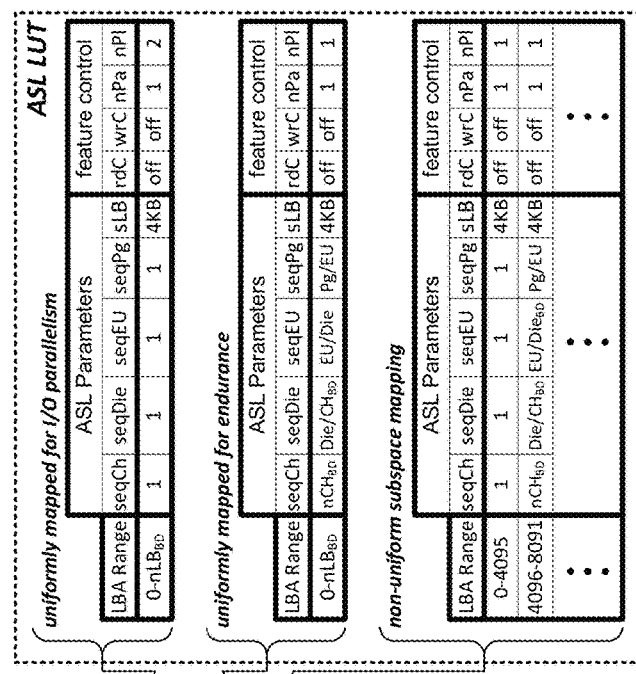
FIG. 8A illustrates an exemplary block device allocation and configuration.
Figure 8A:
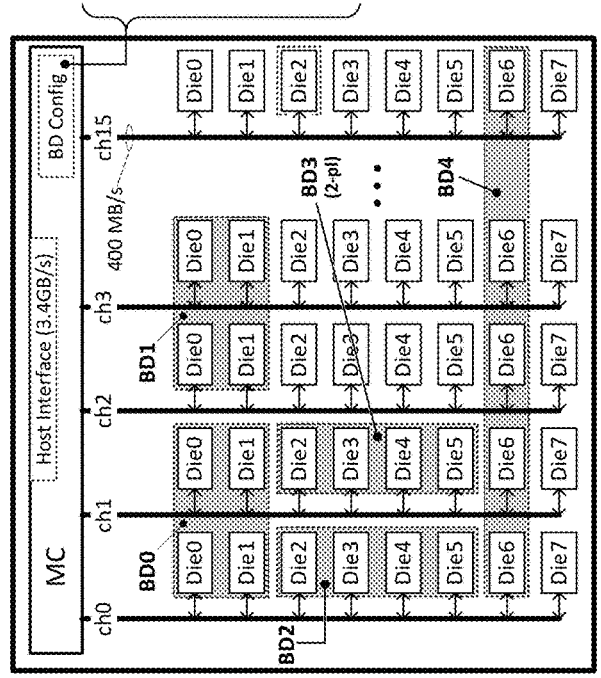

FIG. 8A illustrates an exemplary (and not necessarily complete) VBD allocation and configuration within a given drive, for example, using a block device allocator described in the incorporated by reference patent(s). As shown, five virtual block devices, BD0-BD4, are allocated, with each virtual block device being constituted by one or more flash dies that are collectively associated with one or more memory channels (i.e., in this example, the smallest allocable VBD is a single flash die). The virtual block device configuration storage (BD Config) includes a virtual block device lookup table (BD LUT) that is indexed by a virtual block device identifier (BDid which may be, for example, a namespace or other handle or identifier) and holds, for example and without limitation, a specification of the one or more channels spanned by a given VBD (i.e., "constituent channels") and the one or more dies on the constituent channels. For instance, VBD 0 (BD0) spans channels 0 and 1, and includes dies 0 and 1 on the constituent channels and thus includes four flash dies in all. VBD 1 is similarly defined as encompassing a 2×2 set of flash dies, but spans channels 2 and 3 instead of 0 and 1 and thus forms an entirely discrete storage area (i.e., no physical overlap) with respect to VBD 0. VBD 2 spans a single channel (channel 0) and flash dies 2-5 on that channel, and thus also constitutes a four-die block device, but without the channel parallelism of VBDs 0 and 1 (i.e., a 1×4 block device instead of a 2×2 block device). VBD 3 is also a four-die 1×4 block device, but is constituted by allocation of dies 2-5 on channel 1 instead of channel 0. Lastly, VBD 4 is a 16-die block device that includes a single die (die 6) on each of 16 channels—that is, a 16×1 block device. Thus, of the overall set of five allocated VBDs, four VBDs (BD0-BD3) include discrete sets of four constituent dies and thus have a 32 GB pseudo-physical storage capacity (i.e., each die includes a pseudo physical count of 2048 EUs, each containing 256 16 KB pages and thus $2^{11}*2^{8}*2^{14}$ bytes or 8 GB) and the fifth VBD (BD4) includes a discrete set of sixteen dies and thus a 128 GB pseudo physical storage capacity. Also, in this particular example, the channel and die identifiers recorded within the virtual block device lookup table correspond one-for-one with underlying physical channels and dies within the flash device as neither of those elements of the structural hierarchy are virtualized. In alternative embodiments or configurations of the flash device, either or both of those elements may be virtualized.

Continuing with FIG. 8A, each entry within the lookup table additionally includes an index to a respective set of one or more entries within an ASL lookup table (ASL LUT), with each ASL lookup table entry including ASL (address space layout) parameterizations and feature control settings for the complete or partial host-supplied address range of the corresponding VBD. In the particular example shown, ASL/feature-control parameter settings for three different VBDs are illustrated, including a uniform ASL/feature-control parameterization within VBD 0 (i.e., parameterization applies uniformly to the entire host-supplied address range of the VBD—there are no subspace definitions), another uniform ASL/feature-control parameterization with VBD 2, and another multi-subspace ASL/feature-control parameterization within VBD 4, with separate ASLs defined for each of multiple LBA ranges within the VBD, only two of which are shown. Entries for VBDs 1 and 3 are also present in the ASL lookup table, but not specifically shown in FIG. 8A.

As discussed above, the ASL parameters define the manner in which sequential host-addresses are assigned and/or distributed within the structural hierarchy of an associated VBD and thus indicate the number of pages within the same EU (i.e., "seqPg") to which sequential LBAs apply before progressing to page(s) in the next EU, and then the number of EUs to be sequentially accessed within a given die ("seqEU") before progressing to the next die, and then the number of dies to be accessed on a given channel ("seqDie") before progressing to the next channel, and so forth. The feature control parameters include, for example and without limitation, whether read caching and write caching are to be enabled (independently settable via the rdC and wrC fields of the ASL lookup table entry) for the VBD or subspace thereof, the number of pages that may be simultaneously or concurrently written to or read from within the same erase unit (nPa), and the number of erase-unit planes to be concurrently accessed in a given write or read command sequence (nPI). In general, read caching is a double-buffering construct that enables data retrieved from an address-selected storage page and stored within the flash die's page register (i.e., a buffer element that temporarily holds outbound page-read data and inbound page-write data) to be output from the flash die concurrently with transfer of subsequently selected storage-page data to the page register, and write caching is a similar double-buffering arrangement that enables concurrency during page-write operations. Thus, the read and write page caching features, when enabled, reduce net latency of a sequence of read or write operations, respectively. In general, page caching scales (e.g., multiples according to cache depth) the effective size of the page register and thus correspondingly raises the minimum data transfer size imposed on the host in a given page read or write operation. For simplicity of understanding, page caching in both the read and write directions is disabled (i.e., "off") within the exemplary ASL lookup table entries shown. Multi-page operation (i.e., nPA set to a value greater than one) and multi-plane operation (nPI set to a value greater than 1) likewise raise the minimum data transfer size between the host and memory controller in order to perform (i.e., proceed with) programming. In the specific examples shown in the ASL lookup table of FIG. 8A, multi-page operation is disabled at least within VBDs 0, 2 and 4, and multi-plane operation is disabled at least within VBDs 2 and 4. By contrast, dual-plane operation (nPI=2) is specified for VBD 0, thus doubling the number of concurrently written pages (a VBD characteristic referred to herein as a "frontier width") as compared to a physically-comparable VBD (e.g., VBD 1) configured for single-plane operation.

Still referring to FIG. 8A, the singular values ('1') recorded for addressing parameters within the ASL lookup table entry for VBD 0 dictate that logical or virtual addresses are to be distributed widely through the structural hierarchy of the flash device with, for example, each page of a sequentially addressed set of four pages (and thus a sequential range of 16 LBAs given the sLB=4 KB logical block size setting) being read or written within a different one of the four constituent dies of the VBD, thus effecting 4× ("multiplied-by-four") parallelism in the page read or write operation and thus approximately a 4× bandwidth increase over a configuration that directs four sequential page read or write accesses to the same erase unit within a given die. In actuality, the dual plane setting within VBD 0 doubles the number of concurrently accessed pages within each of the four constituent flash memory dies of VBD 0, thus establishing an 8-page frontier and thus read and write bandwidths that are approximately eight times the baseline single page read and write bandwidths of a given flash die. By contrast, VBD 1 which otherwise constitutes the same 2×2 die-layout as VBD 0, is configured with a deep (rather than wide) address space layout and with only single-plane access throughout its associated logical or virtual address range. Thus, pages falling within a sequential address range for VBD 1 are mapped to physical pages within an EU until the end of that EU is reached (i.e., "Pg/EU"), with the logical or virtual address range thereafter continuing through the physical pages of a next EU and then the next until the final EU (EU/Die) within the die has been traversed, with the LBA range thereafter continuing through the pages and EUs of the next die on the same channel before carrying over to EUs and dies on an adjacent channel. In general because the frontier is very narrow (i.e., a single page and thus as narrow as possible in the exemplary flash memory die shown), only a single EU unit is impacted by each page write operation and thus, despite the relatively low write bandwidth (i.e., 16 $KB/t_{PROG}$ in contrast to the $8*16$ $KB/t_{PROG}$ bandwidth achieved by the 8× wider frontier in VBD 0), write-induced wear resulting from, for example, storage of a 16 MB host segment, will occur in only a relatively small number of EUs and dies—four 4 MB EUs within the same die in this example—in contrast to the storage of each of the 1024 16 KB pages within a respective one of the 1024 EUs of VBD 0 (i.e., each of the 256 erase units within each of the four dies is written to and thus worn to some degree). Conceptually, while the total page wear is equivalent in both VBD die configurations (the same number of pages is written), the wear within narrower-stripe-frontier (i.e., deeper, but lower bandwidth) VBD 1 is concentrated within a much smaller number dies (and potentially EUs as well). This scheme tends to reduce garbage collection, and thereby reduces write amplification, and by that increases endurance, as compared to wider, higher-bandwidth VBD 0. In general, all these considerations are made available to the user/system designer in configuring the VBDs, as the designer is able to directly, or with the aid of the virtual block device allocator, specify ASL and feature-control parameters that strike a design balance between endurance and bandwidth requirements of a given application, potentially configuring multiple VBDs having widely varying performance characteristics within the same flash memory device, as illustrated by VBDs 0-4 in FIG. 8A.

Concluding with FIG. 8A, the ASL lookup table includes multiple entries (and thus multiple subspace definitions) for VBD 4, with an initial entry specifying a 4K LBA range (0-4095) mapped for high I/O bandwidth (i.e., 16-pages as the write frontier spans all sixteen of the flash dies within the VBD) and another entry specifying a subsequent 4K LBA range mapped for endurance (single-page size frontier). One or more other subspace definitions (not shown) complete the address range mapping of VBD 4.

Note that the definition of VBD is advantageously used in some embodiments in a manner tied to the way in which EC Information is managed across drives. For example, VBDs in other drives matching the 2×2 channel/die configuring of BD0 and/or BD1 from FIG. 8A can be effectively matched to a VBD in the depicted drive, e.g., for purposes of superparity (or other master redundancy), as introduced earlier. In addition, use of EC Information, and/or one or more specific redundancy algorithms can optionally be made to vary by VBD within a given drive, and to match corresponding VBD in a different drives. For example, it is possible to use a redundancy scheme for data in BD0 but not BD1, or to use different redundancy algorithms for each BD, and to replicate these definitions in other drives so as to provide for compatible EC Information processing.

Figures 8B, 9:
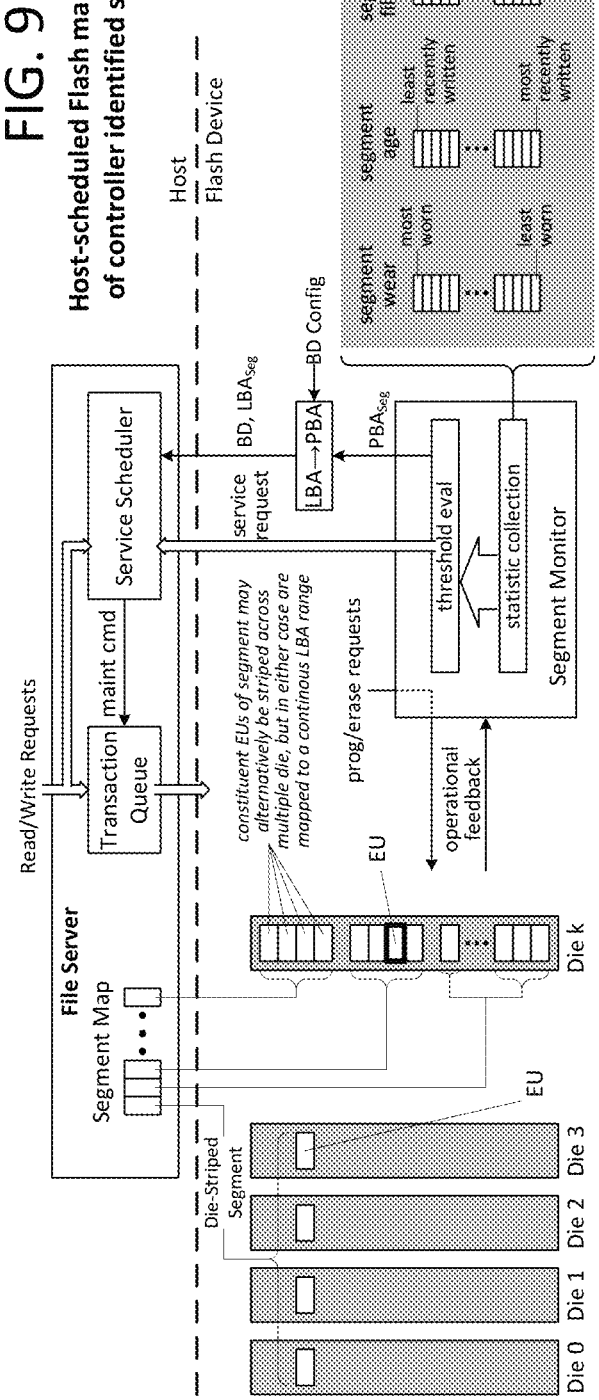
FIG. 8B shows an address space layout ("ASL") lookup table ("LUT") with configurable per-virtual drive parameters for erasure coding and/or error correction. The configurability of "virtual block devices" or "VBDs" represented by FIG. 8B may be used to provide for zone-specific error protection (and zone-specific algorithms) and also to configure like-zones in respective drives to provide for cross-drive redundancy and offloading of cross-drive EC functions from a host to multiple drives (e.g., using a peer-to-peer scheme as contemplated for some embodiments).
FIG. 9 demonstrates an exemplary sequence of maintenance operations coordinated between a flash memory controller and a host; use of virtualized addressing as represented by the FIG. facilitates, for some embodiments, die-base, block-based (EU-based) or even page-, LUN- or other segment-based redundancy schemes, as discussed further below.

FIG. 8B provides another view of an exemplary ASL look-up table, similar to the one discussed above in connection with FIG. 8A. However, the right side of the table further includes an entry for erasure coding, which specifies for a first erasure coding algorithm of "x1" and an optional destination of "y1" and a second erasure coding algorithm of "x2" and an optional destination of "y2." Each algorithm setting can be configured so that a value of "0" means that no erasure coding algorithm is to be used, and similar, these teachings are extensible to more than two such algorithms. Each erasure coding algorithm setting can correspond to a different error correction scheme, and each destination can be configured to cause the memory controller for the VBD in question to send EC information to a specified drive (or to a specified different VBD within a given drive), with a value of "0" once again being interpretable to cause the memory controller to store EC information in the same VBD. Note that while one VBD is indicated, the ASL LUT advantageously includes a similar entry for each VBD, permitting designation of different EC algorithms and/or destinations (or no redundancy/error protection at all) per VBD. The specified destination, y1 or y2 as the case may be, identifies to the memory controller where the redundancy information is to be stored/sent, potentially to the host itself or to a host-visible or reserved storage location in the same or a different VBD, or potentially a different drive (e.g., using the peer-to-peer structure referenced above). Using such a structure, a memory controller can be configured to store/transmit redundancy information in a configurable manner (e.g., established by a host configuration command, for example, issued during a set-up mode); because the host has visibility into memory allocation (i.e., VBD definition) beneath such a memory controller, and beneath similar memory controllers for different SSDs, the host can schedule and manage parallel concurrent operations in respective structures, managed as independent units, free from the constraints imposed by latencies associated with flash memory and other NVM latencies. Note that FIG. 8B also shows an additional feature under "feature control" used for some embodiments, namely, ability to configure a given VBD for use as single-level memory (e.g., SLC), dual level memory cells (DLC), tri-level memory cells (TRC) or quad-level memory cells (QLC); for example, a hypothetical entry of "1" in this table might indicate that memory otherwise capable of QLC operation is being operated "virtually" as DLC memory (e.g., MLC value='1'), which the ASL table essentially managing that memory as doubly-deep memory with additional supported levels treated as additional memory space. In alternate embodiments, such a field can have other uses (e.g., a memory capable of QLC operation might be operated as DLC memory only, with additional supported cell storage states not used dependent on ASL configuration); other operations or configurations are also possible FIG. 9 demonstrates an exemplary sequence of operations coordinated between a flash memory controller for a given drive in one embodiment and host to enable host-scheduled maintenance of flash-device-identified units of data, and more specifically segments in this example. These operations may be performed independently for each SSD that is part of the storage aggregate/subsystem. The memory controller/drive, using the "cooperative" techniques and associated exemplary logic described earlier, tracks statistics and environmental status of the memory, looking for indications that a portion of the data needs maintenance driven by a physical resource. An example of a maintenance operation might be that data has resided on a given EU (or other logical or physical structure) for a time long enough to approach a maximum estimated safe retention time (or conversely, in a manner that represents excessively "cold" storage). An event could be set to trigger at a threshold previously selected by the host and communicated to the device. Once that event has been triggered, the device identifies the segment as a logical or virtual address in which the resource resides. When the host has received the notification of the event, along with the associated segment address, length, and event type, the host may elect to handle that event in a number of ways. Host-issued instructions may garbage collect, copy, move, or discard data in a manner that best benefits the overall efficiency of the system, optionally on a fractional basis (e.g., with requests being sent for each piece of data or each individual structure that is to be erased, moved, discarded, etc. Those instructions may be mixed into (e.g., interleaved into) the overall system scheduling. Note that in contradistinction to conventional approaches (e.g., where an entire address space is garbage collected, in a device-wide operation delegated to a memory controller) that this approach permits the host to command specific maintenance operations to specific hierarchies, for example, by command to perform maintenance on a specific EU or other logical, virtual or physical structure; to this effect, the host transmits a maintenance request with a specific address (specific or structural), which the memory controller uses to perform maintenance on a host-selected or host-specified address range, conveyed by or in connection with the maintenance request. Once data has been relocated or discarded, a segment of interest (e.g., an EU) may be erased.

V. Use of Compressed EC Data to Provide Robustness to Multiple Block or Device Failures As noted earlier, for many ANVM designs, structural failures (including wear-based failures) tend to occur as independent random events, and occur on a basis of an isolated physical structure, such as a physical block (physical EU). FIGS. 10A-11B are use to describe a specific embodiment which uses two error protection schemes to provide robustness against multiple segment failures.

Figure 10A:
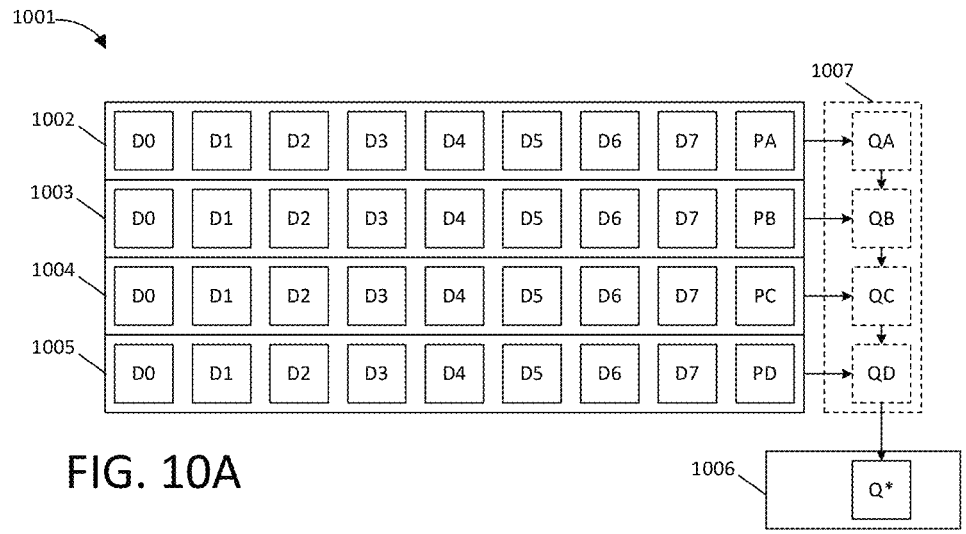
FIG. 10A is an illustrative diagram used to discuss a cross-drive redundancy scheme where error detection and correction is implemented both within each of multiple drives (e.g., based on storage of first EC information "P" within each of drives 1002, 1003, 1004 and 1005) and on a cross-drive basis (i.e., rooted in storage of second EC information Q* external to one or more of drives 1002-1005).

More particularly, FIG. 10A illustrates a first hypothetical embodiment 1001 having five SSDs 1002, 1003, 1004, 1005 and 1006. In the depicted example, a first error protection scheme is used to generate redundancy data "P" which is stored on-drive for each of these SSDs, for example, in either reserved or host-accessible ANVM (e.g., in flash memory). For example, the first SSD 1002 is shown has having eight data segments D0-D7, each of these being a segment, which are linearly combined using a first algorithm to generate "PA." [Note that each segment can optionally be a page, and that while only 8 pages are illustrated (i.e., FIG. 10A is simplified to show error protection for a single virtual, logical or physical data stripe), for each drive, there may be many thousands to millions of such data stripes for, with only one is illustrated in the FIG. for each drive to assist with narration.] The second, third and fourth SSDs 1003, 1004 and 1005 are thus each also shown as having eight data segments D0-D7, which are linearly combined using a first algorithm to generate "PB," "PC," and "PD" respectively. It is unlikely that any given drive will experience simultaneous failures in respective segments, e.g., each segment D0-D7 is advantageously configured (e.g., using the ASL configuration principles described above) such that these segments correspond to respective EUs or even respective dies within the given drive). In one embodiment, each redundancy segment simply represents an XOR of eight corresponding data segments, e.g., "PA" corresponds to an XOR applied across all of segments D0-to-D7, and should any one of these nine segments (i.e., D0, D1, D2, D3, D4, D5, D6, D7 and PA) become unavailable, the lost segment may be immediately reconstituted by memory controller firmware and restored.

However, as seen at the right side of FIG. 10A, a second error correction scheme is also used to also generate QA, QB, QC and QD for the four respective SSDs 1002, 1003, 1004 and 1005. The error correction scheme used to generate these "Q" values is advantageously chosen so as to be interrelated with the first scheme, such that if any two segments of ten (i.e., D0, D1, D2, D3, D4, D5, D6, D7, P and Q) become unavailable for the given drive, the two lost segments may also be immediately and fully reconstituted by memory controller firmware and restored. Note however that as will be shown below, each Q need not be retained by the corresponding drive (or for that matter, at all, although it is optional to do so). As noted earlier, structural failures (e.g., based on wear) are independent random events and thus it is very unlikely that two such segments will be lost, based on concurrent structural failures, at exactly the same time, and it is even more unlikely that multiple drives will have two or more segment errors at the same time. The depicted scheme banks on these probabilities and compresses the second error correction information Q as EC information, i.e., by linearly combining that information to create Q*, which is then stored in the fifth SSD 1006 in this embodiment; note that in contemplated variations, this "superparity" Q* may also be stored by the host, or in a network-attached resource such a non-ANVM memory, or in any other location. In one embodiment, the EC information from the second drives—QA, QB, QC, and QD may simply be XORed together to generate Q*, either by a processor for the fifth SSD 1006, or as implied by optional box 1007, by the host. Each Q for a given drive used to generate Q* may then optionally be discarded.

Figure 10B:
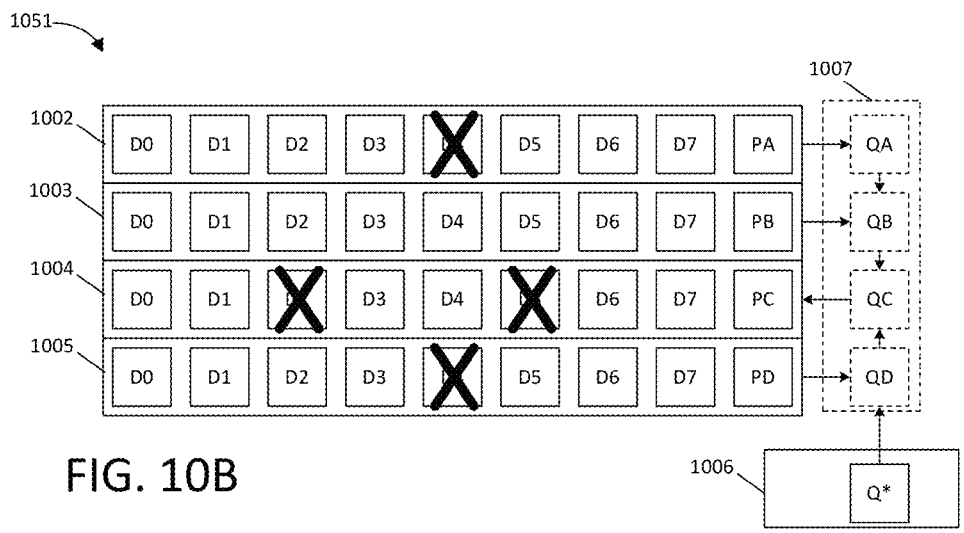
FIG. 10B is an illustrative diagram similar to the one seen in FIG. 10A, but this time, used to show error recovery, specifically, for a situation where one drive (e.g., drive 1004) experiences two or more segment errors (represented by an overlay of an "X" onto segments/data units/structures D2 and D5 in the case of drive 1004).

FIG. 10B is used to narrate failure recovery processes, with structures generally referenced by numeral 1051. These structures are once again seen to include the first four SSDs from FIG. 10A (numbered 1002, 1003, 1004 and 1005, respectively), the fifth SSD (or other storage resource 1006), and optionally the host 1007. In FIG. 10B, "X"s have been overlaid on various ones of the data segments for the respective drives to denote conceptual failures of structures containing those segments, such that data/information cannot be accurately read from those structures. In this regard, the first SSD 1002 is seen to have one failure in its segment D4, and the fourth SSD 1005 is also seen to have a failure in its segment D4. As noted above, since only one segment has failed, these SSDs (and/or the host) can immediately recreate the lost segment from uncompromised segments (e.g., from D0, D1, D2, D3, D5, D6, D7, and P) in these examples. The third SSD 1004, however, is seen to have two lost segments, hypothetically including segment D2 and segment D5, which is assumed to be a very unlikely occurrence. The affected SSD (1004), the fifth SSD 1006, and/or the host (represented by 1007 in this example) therefore recall Q* for purposes of recovering both lost segments of data within SSD 1004. Because a double failure as depicted is a statistically unlikely event, the second error recovery scheme is premised on a small likelihood that any two or more drives will experience two or more segment errors at exactly the same time. In this depicted hypothetical, only one drive has suffered a two segment error. Therefore, SSD 1004, SSD 1006 and/or the host (a) recall superparity Q* from memory, (b) recall or recalculate QA, QB and QD from memory, (c) linearly combine (e.g., XOR) Q* with QA, QB and QD to recover QC, and (d) recover both missing segments D2 and D5 using available segments D0, D1, D3, D4, D6, D7, PC and QC. Note again that QA, QB and QD do not need to be retained or stored after initial calculation, e.g., Q* in theory occupies only one-fourth of the memory space that would be occupied by QA, QB, QC and QD collectively. Because the first and fourth SSDs (1002 and 1005) experience only one segment error in this example, their segments may be immediately recovered, and with the reconstituted segment (i.e., with D0, D1, D2, D3, D4, D5, D6, D7 and P availed), Q may be immediately recalculated for the affected drive, i.e., permitting generation anew (recalculation) of QA, QB and QD on demand in this example. The depicted configuration therefore stores far less EC information than would conventionally be required to recover from the additional segment error, but requires more processing cycles to regenerate QC (i.e., than would be needed to correct single segment errors in SSD 1002 and 1005); however, because of the much lower-likelihood of a two segment error, this is considered advantageous in terms of the much lower storage requirement for EC information, based on the ability to losslessly compress and recover that EC information (i.e., QA, QB, QC and QD in this hypothetical). Note that further lossless compression techniques may be applied at addition levels of nesting using these techniques, permitting compression of further EC information obtained from a third error correction scheme to recover from three block errors (e.g., storing R*, which can be reconstituted once P and Q redundancy data have been used to correct from 1-2 segment errors, and storing S*, T*, U*, etc., to provide for additional lossless error recovery schemes to correct for additional (unlikely) segment errors. Note also that it is expressly contemplated that any of combination of permutation of error correction schemes can be extended to recover additional segment errors. For example, in one variation, each drive (e.g., SSD 1002) can store multiple sets of error recovery information on-drive, such that up to x structural failures can be recovered on-drive, while one, two or more additional structural failures (i.e., >x segment failures) can be recovered using cross-drive redundancy as taught herein.

Figure 11A:
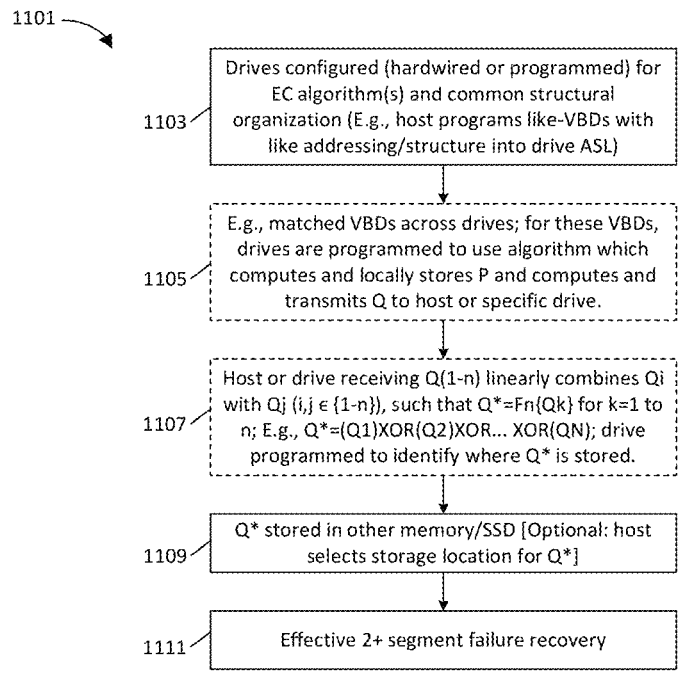
FIG. 11A is a flow chart associated with the redundancy scheme introduced by FIG. 10A.

FIG. 11A provides a block diagram 1101 showing processes associated with the error protection scheme discussed relative to FIG. 10A. Per numeral 1103, one or more drives are configured (e.g., hardwired or programmed) to use multiple error correction algorithms, with each drive advantageously having common structural organization for matched data structures; for example, as discussed earlier in connection with FIGS. 8A-9, a host can program or configure multiple drives to each have generally like-sized VBDs which are configured to a common indexing system; note that identical size and configuration of VBDs is not required for all embodiments, e.g., data from mismatched number spaces (including error codes of different sizes) can still be linearly combined and/or concatenated for example by padding the smaller size value with leading or trailing zeros (or using another well-known process to appropriately resize number spaces for purposes of combination). Per numeral 1105, each VBD matched for purposes of error processing from the respective drives is programmed to use one or more corresponding error correction algorithms, including the algorithms used to generate P and Q in the example of FIG. 10A. As noted earlier, these algorithms are advantageously related such that, for ten segments D0-D7 and P and Q, any two segments can be recovered from any of the remaining eight; the algorithms are advantageously the same across drives, so that for example, QA, QB, QC and QD can be linearly combined to generate Q* and so that any one of QA-QD can be reconstituted from Q* (i.e., such that reapplication of the EC algorithm used to generate QA-QD for available drives, or drives with fully reconstituted data, can be combined with Q* to generate a missing segment of EC information). Note again that while eight data segments are illustrated, this number is arbitrary and any number (e.g., any number of two or more) is contemplated for this embodiment. Per numeral 1105, each SSD provides its generated EC information (e.g., QA-QD), as has been described earlier, either unsolicitedly, or pursuant to a host-issued read or transfer request, for purposes of this combination. As indicated by numeral 1107, the host or drive (or other resource) receiving these pieces linearly combines them to generate compressed EC information (Q*). Note also that while this FIG. uses an example of four SSDs, it is possible to have any number, e.g., 2, 3 . . . 16, etc., SSDs, with corresponding EC information combined (compressed) in this manner. As indicated by the FIG., in a specific embodiment, these values are combined by a bitwise XOR operation, but this is not required for all embodiments. The resultant compressed data is then stored in a manner such that it can be indexed according to the data stripe it represents, i.e., on the basis of underlying logical, virtual or physical address, or indeed, on the basis of any index that can effectively be used to associate Q* with the underlying data that it represents. As indicated by numerals 1109 and 1111, it is contemplated for some embodiments that the compressed EC information Q* can be stored in some other memory, an SSD, or by the host, that the host can dynamically select a destination from among multiple choices (e.g., based on current bandwidth available for communicating with different destinations, given current queues or network conditions), and that the depicted scheme presents an effective mechanism for recovering from wear-based failure of two or more segments of the associated data stripe (e.g., loss of two or more blocks). As noted earlier, third or higher order error recovery mechanisms can also be used to generate third compressed error correction data R*, fourth compressed error correction data S*, and so on, to provide for effective compressed storage of cross-drive redundancy information. Generally speaking, as was the case with the second redundancy algorithm used to obtain Q*, (a) each error correction algorithm is typically selected so as to be dependent on and related to the other error correction algorithm, such that (using the example case of a recovery system where there are L total segments including L–M data segments and M EC information segments, P, Q, R, etc.), all L segments may be fully read/recovered notwithstanding the unavailability of any M or fewer of the L segments, and (b) the error correction schemes are selected such each second or higher order EC segment is either stored in memory or can be fully regenerated if all data segments and lower order blocks are available (e.g., Q for any given drive is either stored in memory or can be regenerated by the given drive on demand, assuming prior correction of any error involving zero or one segments using P, R for any given drive is either stored in memory or can be regenerate for the given drive on demand assuming prior correction involving zero, one or two segments using P and Q, etc.). Again, in many embodiments, it is not required for each drive to store Q, R, S, etc. (i.e., the EC information that will be used to provide cross-drive redundancy), as long as this information can be regenerated from superparity, but it is nevertheless optional to do so.

Once again, many variations, combinations and permutations of the principles discussed above will be readily apparent to those having experience in erasure coding, and are contemplated by this disclosure even if not individually detailed above.

Figure 11B:
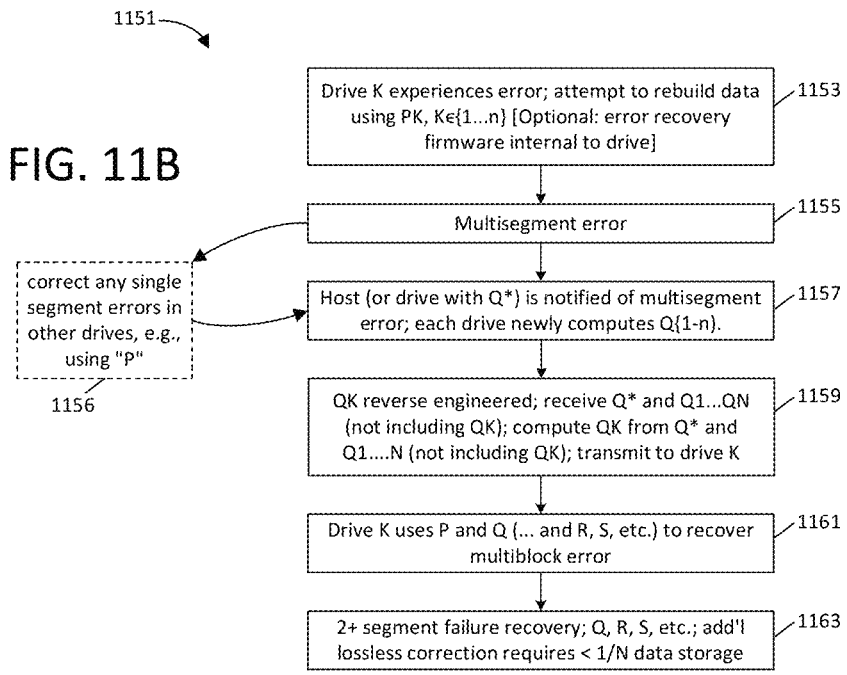
FIG. 11B is a flow chart associated with the error recovery scheme introduced by FIG. 10B.

FIG. 11B provides a flow chart 1151 that shows error recovery techniques, for example, associated with the processes discussed in connection with FIG. 10B, above. As indicated by function block 1153, it is assumed that a drive ("drive K") experiences an error; drive firmware (i.e., operating on an associated memory controller IC for the drive) attempts to recover from this error using on-board recovery information, in this case PK (where P denotes error correction information generated using the first error correction algorithm referenced in connection with the examples above, and K denotes drive K). As implied by function block 1153, in some embodiments, these techniques can also be practiced by the host (i.e., by a host processor acting under auspices of suitable firmware), such as by reading available segments including PK and performing the pertinent linear combination/error recovery process to generate the missing segment. This structure permits error recovery on a drive-by-drive basis by the pertinent SSD controller without required reliance on cross-drive redundancy.

It is further assumed for purposes of this FIG., that there is a multi-segment error for one of the drives, as indicated by numeral 1155, i.e., M (i.e., two in this example) structures experience error for exactly one SSD, such that it is necessary in this embodiment to use externally-stored EC information to rebuild the unavailable data for that SSD. For purposes of the EC algorithms discussed above in connection with FIGS. 10A-11A, it is assumed in this embodiment that any single segment errors have already been corrected (as represented by function block 1156) such that each drive/SSD other than the one that has the multi-segment error has had its segments fully recovered, and such that it is possible to recover Q for each drive/SSD other than drive K. If this recovery has not yet been performed, it is performed as a first step in the error recovery process (i.e., for each drive for which a Q is to be recalculated). [For situations where the desired redundancy is provided for three or more blocks (e.g., M=3+), it is similarly assumed that each drive/SSD having a smaller number than maximum of segment errors has also fully recovered its segments, such that it is possible to recover associated cross-drive EC information, e.g., R, for each drive/SSD other than drive K, so as to recover each additional segment from available data.] Per numeral 1157, the host (or resource storing Q*) is notified of the error and is requested to rebuild QK from available information; if Q for the other drives (1-n, not including K) is not stored, a request is transmitted to the pertinent SSDs to regenerate EC information "Q" from the available/recovered segments, as was discussed above; this request optionally explicitly provides the pertinent index identifying the data stripe for which the EC information is sought, if not inherent in the request. QK is then calculated using the process detailed in function block 1159, i.e., with the compressed EC information Q* retrieved from memory, and with Q provided from all drives other than drive K, these pieces of EC information are linearly combined to losslessly recover QK, and QK is then transmitted to drive K (optionally once again with the pertinent index included). Per numeral 1161, drive K then uses its available segments (i.e., L–M=8 in this hypothetical) to recover each of the multiple M lost segments (e.g., two in this example). The result once again is that a drive is able to simultaneously recover multiple lost segments using one or more sets of externally-stored EC information (i.e., Q, R, S, etc.), where in this embodiment, each externally stored information set (e.g., Q) is compressed and stored as "superparity" as that term was defined earlier.

The embodiment described in reference to FIGS. 10A-11B permit a ANVM system, specifically including but not limited to a NAND flash memory system, via operation of any one or more of a memory controller, drive, host, storage aggregate, etc., to provide effective cross-drive error protection using (a) external transmission of redundancy information for writes of data within a given drive, and/or (b) computation of "superparity" (i.e., compressed or master EC information based on a combination of multiple EC values, where those values can include but are not limited to parity values), and/or (c) associated error recovery techniques. Applied in combination, these techniques provide for effective external storage of redundancy information and require a fraction of the storage space that might be otherwise required, e.g., as little as 1/N where the "superparity" is produced by combining EC information from N different drives.

VI. Conclusion

Reflecting on the foregoing, what has been described is a memory controller architecture that can facilitate efficient redundancy operations and delegated move/copy operations in a manner that does not create excessive bandwidth competition (e.g., by reducing the number of data transfers between the host and the drives, and having the drives themselves compute cross-drive parity) for host functions and that facilitates true redundancy across drives.

Many options and variations to the above are expressly contemplated by this disclosure. For example, while flash memory is used in a number of examples herein, the techniques described herein may readily be applied to other forms of ANVM. Also, while parity information is used as one example of EC Information, and an XOR operation identified as one "linear" error correction technique, the techniques described herein are applicable to any other types of EC Information as well, including BCH codes and other EC schemes. The disclosed techniques may also be applied to EC schemes based on non-linear combination/processing. Many types of EC algorithms may be used. Many analogous techniques and applications will occur to those having ordinary skill in the art. Also, while many embodiments introduced above call for error information to be provided to a host, in some contemplated embodiments, the memory controller instead directly transfers/forwards the error information to another drive (e.g., without sending the EC information to the host). This is to say, as noted earlier, some embodiments support transfer of error information (e.g., parity values or results of parity processing) directly via a peer-to-peer bus from a memory controller for one ANVM SSD to a memory controller on another drive; in some embodiments, the recipient drive has a memory controller that computes and stores master error information (e.g., superparity), permitting recovery of EC information (by a given drive or the host) should any drive become unavailable or corrupted. Also, while techniques for generating and matching EC data have been presented, all of the techniques described herein may be applied to recover EC information and/or lost data, i.e., via similar EC generation techniques and processing suitable for extracting lost information based on data and stored and/or generated EC information. While many examples focus on error protection robust to one or two storage resources becoming unavailable, there are error correction schemes robust to three or more resources becoming corrupted or unavailable (e.g., using the disclosed, for example, with extension to three or more EC algorithms); application of the techniques described herein is contemplated for all such schemes. In fact, the described techniques can be applied not only to provide for compression of "Q" information, as discussed above, but using lossless compression techniques to provide insurance against third, fourth, fifth, or additional independent random failures which might affect a given drive.

This disclosure also provides techniques for exposing memory geometry to a host, to permit improvement of host processes in interacting with that memory. In one example, a host and/or a user and/or a memory controller can provide for definition of zones or VDBs in a given SSD. A "zone" as used herein is a subset of ANVM in a single SSD, such that two or more logical and/or physical structures can be defined in a single SSD. A "VBD" or virtual block device as used herein corresponds to a block device described in commonly-owned U.S. Pat. No. 9,542,118, e.g., a region having boundaries which align to one or more integral arrays (or dies), providing for performance isolation, such that for example a memory controller managing such a structure can issue parallel requests to one VBD without regard to status of memory controller commands which are outstanding to a different VBD within the same drive or SSD. A "zone" as used herein does not necessarily have to have boundaries defined in this manner. In some embodiments discussed herein, the host participates with a memory controller for a given drive in defining zones and/or VBDs, providing for tailoring of storage needs to individual clients and/or applications, with the memory controller being programmable so as to manage and/or perform addressing in each zone on a different basis. In some embodiments, including those embodiments referenced earlier, a host can request a write of data to a zone or VBD, or it can specify a destination for an operation that moves data (e.g., garbage collection, or hot/cold data relocation) simply by identifying a zone or VBD of a given drive (e.g., "zone32"), with the memory controller for the destination resource then assigning an address (i.e., with the memory-controller-assigned address being used by the host in future read requests to identify the data in question); the memory-controller-assigned address can be, but does not have to be, a virtual address or a physical address. For example, as described in incorporated-by-reference U.S. Pat. No. 9,542,118, a level of abstraction can be used such that the host uses an "idealized address" (e.g., a specific type of virtual address) with the memory controller then performing some type of address translation or resolution to identify a specific physical location where requested data is stored. In other examples, instead of using zones per se, the host directly specifies an address (which might have been previously assigned by a memory controller and reported to the host, depending on embodiment), and the memory controller then directly applies and/or translates only a limited field or fields of the host-supplied address (e.g., it modifies/remaps an address subfield dedicated to a structural level such as channel, die, array, erase unit, plane, page/wordline, LUN, and so forth), to resolve a logical or physical structure in ANVM where data can be found. This operation and associated circuitry is also described in the incorporated-by-reference document U.S. Pat. Nos. 9,400,749 and/or 9,542,118. A design which provides for exposure of ANVM geometry to a host and/or provides for the use of zones and/or VBDs permits some embodiments to employ a number of different options introduced above. For example, a memory controller can compute EC information as it fills a zone (e.g., using a linear combination scheme), and can provide either intermittent or completed-zone-wide EC information to a host. As this statement implies, in various embodiments, EC information can be computed on the basis of any desired logical and/or physical structure, for example, on the basis of virtual storage units (e.g., a "virtual" erase unit or die, as described in the incorporated-by-reference documents), on the basis of an entire die, or on some other basis.

It should be noted that, as a step in their fabrication or other reification, the various circuits disclosed herein may be described using computer aided design tools and expressed (or represented) as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process. Any of the various methods and operational sequences herein may likewise be recorded as one or more sequences of instructions on a computer-readable medium and may be executed on a computing device to effectuate the disclosed method and/or operational sequence.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, device geometries and numbers of hierarchical structural elements (e.g., channels, dies, planes, erase units, pages, etc.), component circuits or devices and the like may be different from those described above in alternative embodiments. Additionally, links or other interconnections between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Device "programming" may include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

Any incorporation by reference of documents above is limited such that no subject matter is incorporated that is contrary to the explicit disclosure herein, and no definition from an incorporated-by-reference document modifies, supplants or appends to any definition set forth herein, i.e., definitions set forth in this document control. Any incorporation by reference of documents above is further limited such that no claims included in the documents are incorporated by reference herein.

While the invention has been described with reference to specific embodiments thereof, it will be evident that various modifications and changes may be made thereto without departing from the broader spirit and scope. For example, features or aspects of any of the embodiments may be applied in combination with any other of the embodiments disclosed herein and/or in materials incorporated by reference or in place of counterpart features or aspects thereof. Accordingly, the specification and drawings are to be regarded in an illustrative rather than a restrictive sense.

We claim:

1. A method of providing redundancy for a memory system, the memory system comprising three or more storage devices, the method comprising:
   with circuitry respective to at least two of the storage devices,
      computing, using data stored in the respective storage device, error information for the respective storage device,
      wherein the error information and the data stored in the respective storage device together permit the respective storage device to correct an error in at least one of the respective data and the respective error information, and
      providing the error information computed for the respective one of the at least two storage devices to another of the three or more storage devices;
   calculating a linear combination of the respective error information from the at least two storage devices, and storing the linear combination in another one of the three or more storage devices;
   detecting occurrence of the error in one of the at least two storage devices; and
   in response to the detected occurrence of the error, and using circuitry,
      retrieving the linear combination from the other one of the storage devices, obtaining the error information respective to each of the at least two storage devices, other than the given one, recovering the error information respective to the given one, by processing the linear combination using the error information respective to each of the at least two storage devices, other than the given one, and correcting the error using the recovered error information.

2. The method of claim 1, wherein each storage device of the at least two storage devices is a nonvolatile memory device, wherein the respective circuitry comprises a respective nonvolatile memory controller integrated circuit, and wherein recovering the error information comprises causing at least one nonvolatile memory controller integrated circuit to recover the error information.

3. The method of claim 1, wherein each of the at least two storage devices comprises memory dies, wherein the circuitry respective to each of the at least two storage devices comprises a memory controller, and wherein:
computing comprises, for each storage device of the at least two storage devices, using the respective memory controller to perform a linear combination of data stored in respective ones of the dies of the respective storage device, to generate the error information for the respective storage device; and
each one of the memory controllers is to transmit the error information for the respective storage device, once computed, without persistently storing the error information in the respective storage device.

4. The method of claim 3, wherein:
the error is a second error and the error information is second error information;
the method further comprises, for each storage device of the at least two storage devices,
computing, using the data stored in the respective storage device, first error information for the respective storage device,
wherein the first error information and the data for the respective storage device together permit the respective storage device to correct a first error in at least one of the respective data and the first error information,
storing the first error information in the respective storage device, and
detecting occurrence of the first error in the respective storage device and correcting the first error; and
detecting occurrence of the second error and correcting occurrence of the second error using the recovered error information are performed by the memory controller respective to a given one of the at least two storage devices, wherein said second error is an error that cannot be corrected by the memory controller respective to the given one using only
the first error information respective to the given one of the at least two storage devices, as retrieved from the given one of the at least two storage devices, and
the respective data stored by the given one of the at least two storage devices, as retrieved from the given one of the at least two storage devices.

5. The method of claim 1, wherein:
detecting the occurrence of the error is performed by the circuitry respective to a given one of the at least two storage devices;
the method further comprises causing the circuitry respective to the given one of the at least two storage devices to transmit a notification of said error detection to a host device; and the method further comprises causing the host device to control said retrieving, obtaining and recovering, to thereby obtain the recovered error information; and
the method further comprises transmitting the recovered error information to the circuitry respective to the given one of the at least two storage devices, and causing the circuitry respective to the given one of the at least two storage devices to perform said correcting.

6. The method of claim 1, wherein:
detecting the occurrence of the error is performed by the circuitry respective to a given one of the at least two storage devices;
the method further comprises causing the circuitry respective to the given one of the at least two storage devices to transmit a notification of said error detection to the other one of the storage devices; and
the method further comprises controlling the circuitry corresponding to at least one of the at least two storage devices to receive the linear combination from the other one of the storage devices and to recover the error information from the linear combination and from the error information respective to each storage device of the at least two storage devices, other than the given one.

7. The method of claim 1, wherein calculating the linear combination comprises retrieving an existing linear combination stored in the other one of the storage devices and combining error information transmitted from a storage device of the at least two storage devices with the existing linear combination, to obtain an updated linear combination, and storing the updated linear combination in the other one of the storage devices.

8. The method of claim 7, wherein:
each given one of the at least two storage devices is to, from time-to-time, receive a write command and accompanying write data;
said computing is performed responsive to receipt of the write data, and comprises performing a linear combination of the accompanying write data with preexisting data for a common address; and
the existing linear combination is specific to the common address.

9. The method of claim 8, wherein performing the linear combination of the write data with the preexisting data comprises, with circuitry of the given one of the at least two storage devices, performing an exclusive OR operation and, wherein combining comprises, with circuitry of the other one of the storage devices, performing an exclusive OR operation between the existing linear combination and the error information transmitted from the storage device.

10. The method of claim 1, wherein:
providing the error information comprises causing a first one of the at least two storage devices to transmit the error information computed for the first one of the at least two storage devices to a second one of the at least two storage devices;
as part of the providing and the calculating, the method further comprises causing the circuitry respective to the second one of the at least two storage devices to combine the error information computed for the second one of the at least two storage devices with the error information received from the first one of the at least two storage devices; and
the storing is performed by the other one of the more storage devices in response to receipt of combined information from at least one storage device of the three or more storage devices.

11. The method of claim 1, wherein each storage device of the at least two storage devices is a flash memory device, wherein the respective circuitry comprises a respective flash memory controller integrated circuit, and wherein recovering the error information comprises controlling at least one flash memory controller integrated circuit to recover the error information.

12. The method of claim 11, wherein each flash memory device comprises flash memory dies, and wherein:
computing comprises, for each flash memory device of the at least two storage devices, using the respective flash memory controller integrated circuit to perform a linear combination of data stored in respective ones of the dies of the storage device, to generate the error information for the respective flash memory device; and
each flash memory controller integrated circuit corresponding to the at least two storage devices is to transmit the error information for the respective flash memory device, once computed, without storing the error information in the respective flash memory device.

13. The method of claim 11, wherein the other one of the storage devices is also a flash memory device, and wherein storing comprises causing a flash memory controller integrated circuit for the other one of the storage devices to store the linear combination in flash memory.

14. A memory system, comprising:
at least two storage devices having respective circuitry to,
compute, using data stored in the respective storage device, error information for the respective storage device,
wherein the error information and the data stored in the respective storage device together permit the respective storage device to correct an error in at least one of the respective data and the respective error information, and
provide the error information computed for the respective one of the at least two storage devices to another storage device;
circuitry to
calculate a linear combination of the respective error information from the at least two storage devices, and store the linear combination in a third storage device,
detect occurrence of the error in one of the at least two storage devices, and
in response to the detected occurrence of the error,
retrieve the linear combination from the third storage device,
obtain the error information respective to each of the at least two storage devices, other than the given one,
recover the error information respective to the given one, by processing the linear combination using the error information respective to each of the at least two storage devices, other than the given one, and
correct the error using the recovered error information.

15. The memory system of claim 14, wherein each storage device of the at least two storage devices is a nonvolatile memory device, wherein the respective circuitry comprises a respective nonvolatile memory controller integrated circuit, and wherein at least one nonvolatile memory controller integrated circuit of said memory system is to recover the error information.

16. The memory system of claim 14, wherein each of the at least two storage devices comprises memory dies, wherein the circuitry respective to each of the at least two storage devices comprises a memory controller, and wherein:
for each storage device of the at least two storage devices, the respective memory controller is to perform a linear combination of data stored in respective ones of the dies of the respective storage device, to generate the error information for the respective storage device; and
each one of the memory controllers is to transmit the error information for the respective storage device, once computed, without persistently storing the error information in the respective storage device.

17. The memory system of claim 16, wherein:
the error is a second error and the error information is second error information;
each storage device of the at least two storage devices is to
compute, using the data stored in the respective storage device, first error information for the respective storage device,
wherein the first error information and the data for the respective storage device together permit the respective storage device to correct a first error in at least one of the respective data and the first error information,
store the first error information in the respective storage device, and
detect occurrence of the first error in the respective storage device and correct the first error; and
the memory controller respective to a given one of the at least two storage devices is to detect occurrence of the second error and correct occurrence of the second error using the recovered error information, wherein said second error is an error that cannot be corrected by the memory controller respective to the given one using only
the first error information respective to the given one of the at least two storage devices, as retrieved from the given one of the at least two storage devices, and
the respective data stored by the given one of the at least two storage devices, as retrieved from the given one of the at least two storage devices.

18. The memory system of claim 14, wherein:
detection of the occurrence of the error is performed by the circuitry respective to a given one of the at least two storage devices;
the circuitry respective to the given one of the at least two storage devices to transmit a notification of said error detection to a host device;
the host device is to control the retrieval, the obtainment and recovery, to thereby obtain the recovered error information, and transmission of the recovered error information to the circuitry respective to the given one of the at least two storage devices; and
the circuitry respective to the given one of the at least two storage devices is to perform said correction.

19. The memory system of claim 14, wherein:
the circuitry respective to a given one of the at least two storage devices is to detect the occurrence of the error;
the circuitry respective to the given one of the at least two storage devices is to transmit a notification of said error detection to the third storage device; and
the circuitry corresponding to at least one of the at least two storage devices is to receive the linear combination from the third storage device and is to recover the error information from the linear combination and from the error information respective to each storage device of the at least two storage devices, other than the given one.

20. The memory system of claim 14, wherein the memory system is to retrieve an existing linear combination stored in the third storage device, is to combine error information transmitted from a storage device of the at least two storage devices with the existing linear combination, is to obtain an updated linear combination, and is to store the updated linear combination in the third storage device.

21. The memory system of claim 20, wherein:
   each given one of the at least two storage devices is to, from time-to-time, receive a write command and accompanying write data, and is to, responsive to receipt of the write data, perform a linear combination of the accompanying write data with preexisting data for a common address, to thereby compute the error information for the given one of the storage devices; and
   the existing linear combination is specific to the common address.

22. The memory system of claim 21, wherein circuitry of the given one of the at least two storage devices is to perform an exclusive OR operation and, wherein circuitry of the third storage device is to perform an exclusive OR operation between the existing linear combination and the error information transmitted from the storage device.

23. The memory system of claim 14, wherein:
   a first one of the at least two storage devices is to transmit the error information computed for the first one of the at least two storage devices to a second one of the at least two storage devices;
   as part of the provision and calculation, the circuitry respective to the second one of the at least two storage devices is to combine the error information computed for the second one of the at least two storage devices with the error information received from the first one of the at least two storage devices; and
   the third storage device is to store the linear combination in response to receipt of combined information from at least one storage device of the three or more storage devices.

24. The memory system of claim 14, wherein each storage device of the at least two storage devices is a flash memory device, wherein the respective circuitry comprises a respective flash memory controller integrated circuit, and wherein at least one flash memory controller integrated circuit is to recover the error information.

25. The memory system of claim 24, wherein each flash memory device comprises flash memory dies, and wherein:
   each flash memory controller integrated circuit is to perform a linear combination of data stored in respective ones of the dies of the respective storage device, to generate the error information for the respective flash memory device; and
   each flash memory controller integrated circuit corresponding to the at least two storage devices is to transmit the error information for the respective flash memory device, once computed, without storing the error information in the respective flash memory device.

26. The memory system of claim 14, wherein the third storage device is also a flash memory device, and wherein a flash memory controller integrated circuit for the third storage device is to store the linear combination in flash memory.

* * * * *